(12) United States Patent
Kawasaki et al.

(10) Patent No.: US 12,544,862 B2
(45) Date of Patent: Feb. 10, 2026

(54) FLUX AND SOLDER PASTE

(71) Applicant: SENJU METAL INDUSTRY CO., LTD., Tokyo (JP)

(72) Inventors: Hiroyoshi Kawasaki, Tokyo (JP); Masato Shiratori, Tokyo (JP); Kazuhiro Minegishi, Tokyo (JP); Yuji Kawamata, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 784 days.

(21) Appl. No.: 17/798,286

(22) PCT Filed: Feb. 17, 2021

(86) PCT No.: PCT/JP2021/005971
§ 371 (c)(1),
(2) Date: Aug. 8, 2022

(87) PCT Pub. No.: WO2021/166967
PCT Pub. Date: Aug. 26, 2021

(65) Prior Publication Data
US 2023/0089879 A1    Mar. 23, 2023

(30) Foreign Application Priority Data
Feb. 18, 2020  (JP) .................... 2020-025678

(51) Int. Cl.
*B23K 35/36*    (2006.01)
*B23K 35/02*    (2006.01)
(Continued)

(52) U.S. Cl.
CPC ........ *B23K 35/3613* (2013.01); *B23K 35/025* (2013.01); *B23K 35/262* (2013.01);
(Continued)

(58) Field of Classification Search
CPC .......... B23K 35/3613; B23K 35/264; B23K 35/025; B23K 35/262; B23K 35/3618;
(Continued)

(56) References Cited

U.S. PATENT DOCUMENTS

| | | | |
|---|---|---|---|
| 5,907,007 A | 5/1999 | Ito et al. | |
| 2004/0069376 A1 | 4/2004 | Saikawa et al. | |
| 2019/0015937 A1* | 1/2019 | Nakaji | .................... C08L 93/04 |

FOREIGN PATENT DOCUMENTS

| | | |
|---|---|---|
| CN | 108500511 A | 9/2018 |
| CN | 109014652 A | 12/2018 |

(Continued)

OTHER PUBLICATIONS

International Search Report for Application No. PCT/JP2021/005971, mailed May 18, 2021, (6 pages).
(Continued)

*Primary Examiner* — Adil A. Siddiqui
(74) *Attorney, Agent, or Firm* — NIXON PEABODY LLP; Jeffrey L. Costellia

(57) ABSTRACT

A flux containing an organic acid, an acrylic resin, a rosin, a thixotropic agent, and a solvent, but not containing water is adopted. In this flux, the organic acid includes 1,2,3-propanetricarboxylic acid, and the content of the 1,2,3-propanetricarboxylic acid is 0.1% by mass or more and 15% by mass or less with respect to the total amount of the entire flux. According to this flux, the wettability of solder can be enhanced, temperature cycle reliability is excellent, and scattering due to heating during reflow can be suppressed.

19 Claims, 1 Drawing Sheet

(51) Int. Cl.
  *B23K 35/26* (2006.01)
  *B23K 35/362* (2006.01)
  *C22C 13/02* (2006.01)
(52) U.S. Cl.
  CPC ........ *B23K 35/264* (2013.01); *B23K 35/3618* (2013.01); *B23K 35/362* (2013.01); *B23K 35/3601* (2013.01); *C22C 13/02* (2013.01)
(58) Field of Classification Search
  CPC .... B23K 35/362; B23K 35/3601; C22C 13/02
  See application file for complete search history.

(56) References Cited

FOREIGN PATENT DOCUMENTS

| | | |
|---|---|---|
| JP | 09-253884 | 9/1997 |
| JP | 2013-066939 | 4/2013 |
| JP | 2013-082004 | 5/2013 |
| JP | 2019-18210 | 2/2019 |
| JP | 2019-081200 | 5/2019 |
| JP | 6521160 | 5/2019 |
| JP | 6575703 | 8/2019 |
| JP | 6575710 | 9/2019 |
| JP | 6649597 | 2/2020 |
| KR | 20050019087 A | 2/2005 |
| WO | WO-02/38328 | 5/2002 |
| WO | WO-2020/017154 | 1/2020 |

OTHER PUBLICATIONS

Japanese Notice of Reasons for Refusal, for Application No. 2020-025678, mailed Dec. 8, 2020, (3 pages).
Japanese Decision to Grant a Patent for Application No. 2020-025678, mailed Feb. 2, 2021, (4 pages).
Chinese Office Action for App. No. 202180014617.7, mailed Dec. 23, 2023 (8 pages) [Partial Translation—Search Report].
Korean Notice of Allowance for App. No. 10-2022-7030385, mailed Oct. 11, 2023 (5 pages).

\* cited by examiner

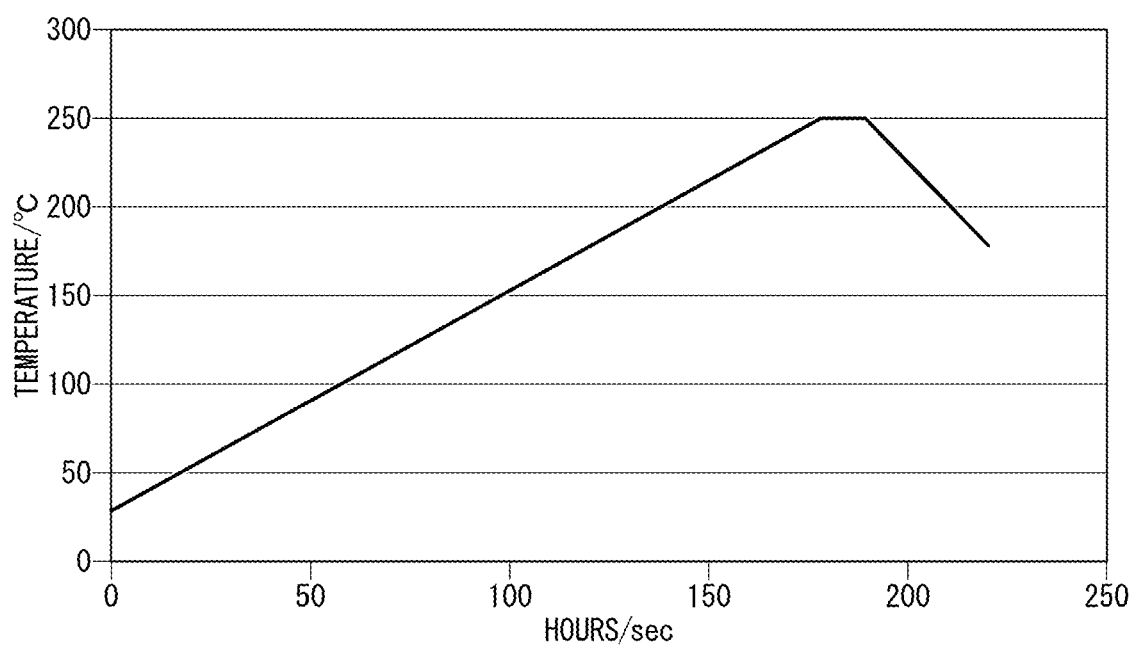

FLUX AND SOLDER PASTE

TECHNICAL FIELD

The present invention relates to a flux and a solder paste.

Priority is claimed on Japanese Patent Application No. 2020-025678, filed in Japan on Feb. 18, 2020, the content of which is incorporated herein by reference.

BACKGROUND ART

Generally, fluxes used for soldering have efficacy of chemically removing a metal oxide present between a solder and the metallic surface of an object to be joined, which is an object of soldering, and of enabling the movement of a metal element in the boundary between the solder and the object. Therefore, soldering using the flux allows the formation of an intermetallic compound between the solder and the metallic surface of the object to be joined, and strong joining can be obtained.

Conventionally, in order to impart wettability to solder, there has been a case where fluxes to which an inorganic acid has been added are used. However, fluxes containing an inorganic acid had a problem of corroding lead frames that support and fix semiconductor chips and a problem of generating a waste liquid of the inorganic acid.

In contrast, there has been a proposal of a flux for which a polyvalent carboxylic acid is used instead of inorganic acids. For example, Patent Document 1 proposes a flux containing a polyvalent carboxylic acid such as diglycolic acid and rosin. In addition, Patent Document 2 proposes a water-soluble flux containing a polyvalent carboxylic acid compound and water and capable of easily washing a residue.

CITATION LIST

Patent Documents

[Patent Document 1]
  Japanese Unexamined Patent Application, First Publication No. 2013-82004
[Patent Document 2]
  PCT International Publication No. WO 2002/038328

SUMMARY OF INVENTION

Technical Problem

However, regarding the flux described in Patent Document 1, there is a concern that, when the flux is applied onto a substrate and heated in a reflow furnace, a crack may be generated in a residue (the temperature cycle reliability is low). In addition, regarding the flux described in Patent Document 2, there is a concern that the flux may be scattered when heated.

Therefore, an object of the present invention is to provide a flux capable of enhancing the wettability of solder, having excellent temperature cycle reliability, and capable of suppressing scattering due to heating during reflow and a solder paste using the same.

Solution to Problem

In order to solve the above-described problems, the present invention adopted the following configurations.

That is, a first aspect of the present invention is a flux containing an organic acid, an acrylic resin, a rosin, a thixotropic agent, and a solvent, in which the flux does not contain water, the organic acid includes 1,2,3-propanetricarboxylic acid, and a content of the 1,2,3-propanetricarboxylic acid is 0.1% by mass or more and 15% by mass or less with respect to a total amount of the entire flux.

In the flux according to the first aspect, a content of the acrylic resin is preferably 5% by mass or more and 45% by mass or less with respect to the total amount of the entire flux.

In the flux according to the first aspect, a content of the rosin is preferably 5% by mass or more and 45% by mass or less with respect to the total amount of the entire flux.

In the flux according to the first aspect, a ratio (mass ratio) of a content of the rosin to a content of the acrylic resin is preferably 1 or more and 9 or less.

In addition, in the flux according to the first aspect, a total content of the organic acid is preferably 0.1% by mass or more and 15% by mass or less with respect to the total amount of the entire flux.

In addition, the flux according to the first aspect further contains azoles, in which a content of the azoles is preferably 0.1% by mass or more and 10% by mass or less with respect to the total amount of the entire flux.

In addition, in the flux according to the first aspect, a ratio (mass ratio) of the total content of the organic acid to the content of the azoles is preferably 0.6 or more and 100 or less.

In addition, the flux according to the first aspect further contains a resin other than the acrylic resin and the rosin, in which a content of the resin other than the acrylic resin and the rosin is preferably more than 0% by mass and 10% by mass or less with respect to the total amount of the entire flux.

In addition, the flux according to the first aspect further contains a halogen compound, in which a content of the halogen compound is preferably more than 0% by mass and 5% by mass or less with respect to the total amount of the entire flux. In addition, the flux according to the first aspect further contains an antioxidant, in which a content of the antioxidant is preferably more than 0% by mass and 5% by mass or less with respect to the total amount of the entire flux.

In addition, a second aspect of the present invention is a solder paste containing the flux according to the first aspect and a solder powder.

In addition, in the solder paste according to the second aspect, the solder powder is preferably composed of a solder alloy having an alloy composition containing As: 25 to 300 mass ppm, Pb: more than 0 mass ppm and 5100 mass ppm or less, at least one of Sb: more than 0 mass ppm and 3000 mass ppm or less and Bi: more than 0 mass ppm and 10000 mass ppm or less, and a balance of Sn and satisfying the following formula (1) and formula (2).

$$275 \leq 2As+Sb+Bi+Pb \tag{1}$$

$$0.01 \leq (2As+Sb)/(Bi+Pb) \leq 10.00 \tag{2}$$

In the formula (1) and the formula (2), As, Sb, Bi, and Pb each represent a content (mass ppm) in the alloy composition.

In addition, in the solder paste according to the second aspect, the alloy composition preferably further satisfies the following formula (1a).

$$275 \leq 2As+Sb+Bi+Pb \leq 25200 \tag{1a}$$

In the formula (1a), As, Sb, Bi, and Pb each represent the content (mass ppm) in the alloy composition.

In addition, in the solder paste according to the second aspect, the alloy composition preferably further satisfies the following formula (1b).

$$275 \le 2As+Sb+Bi+Pb \le 5300 \quad (1b)$$

In the formula (1b), As, Sb, Bi, and Pb each represent the content (mass ppm) in the alloy composition.

In addition, in the solder paste according to the second aspect, the alloy composition preferably further satisfies the following formula (2a).

$$0.31 \le (2As+Sb)/(Bi+Pb) \le 10.00 \quad (2a)$$

In the formula (2a), As, Sb, Bi, and Pb each represent the content (mass ppm) in the alloy composition.

In addition, in the solder paste according to the second aspect, the solder powder is preferably composed of a solder alloy having an alloy composition containing As: 10 mass ppm or more and less than 25 mass ppm, at least one of Bi: more than 0 mass ppm and 10000 mass ppm or less and Pb: more than 0 mass ppm and 5100 mass ppm or less, Sb: more than 0 mass ppm and 3000 mass ppm or less, and a balance of Sn and satisfying the following formula (3) and formula (4).

$$300 \le 3As+Sb+Bi+Pb \quad (3)$$

$$0.1 \le \{(3As+Sb)/(Bi+Pb)\} \times 100 \le 200 \quad (4)$$

In the formula (3) and the formula (4), As, Sb, Bi, and Pb each represent a content (mass ppm) in the alloy composition.

In addition, in the solder paste according to the second aspect, the alloy composition preferably further contains Ni: more than 0 mass ppm and 600 mass ppm or less.

In addition, in the solder paste according to the second aspect, the alloy composition preferably contains Fe: more than 0 mass ppm and 100 mass ppm or less.

In addition, in the solder paste according to the second aspect, the alloy composition preferably contains In: more than 0 mass ppm and 1200 mass ppm or less.

In addition, in the solder paste according to the second aspect, the alloy composition preferably further contains at least two of Ni: more than 0 mass ppm and 600 mass ppm or less, Fe: more than 0 mass ppm and 100 mass ppm or less and In: more than 0 mass ppm and 1200 mass ppm or less and satisfies the following formula (6).

$$0 < Ni+Fe \le 680 \quad (6)$$

In the formula (6), Ni and Fe each represent a content (mass ppm) in the alloy composition.

In addition, in the solder paste according to the second aspect, the alloy composition preferably further contains Ni: 0 mass ppm or more and 600 mass ppm or less and Fe: more than 0 mass ppm and 100 mass ppm or less and satisfies the following formula (5) and the following formula (6).

$$0 \le Ni/Fe \le 50 \quad (5)$$

$$0 < Ni+Fe \le 680 \quad (6)$$

In the formula (5) and the formula (6), Ni and Fe each represent a content (mass ppm) in the alloy composition.

In addition, in the solder paste according to the second aspect, the alloy composition preferably further satisfies the following formula (3a).

$$300 \le 3As+Sb+Bi+Pb \le 18214 \quad (3a)$$

In the formula (3a), As, Sb, Bi, and Pb each represent the content (mass ppm) in the alloy composition.

In addition, in the solder paste according to the second aspect, the alloy composition preferably further satisfies the following formula (4a).

$$0.1 \le \{(3As+Sb)/(Bi+Pb)\} \times 100 \le 158.5 \quad (4a)$$

In the formula (4a), As, Sb, Bi, and Pb each represent the content (mass ppm) in the alloy composition.

In addition, in the solder paste according to the second aspect, the alloy composition preferably further contains at least one selected from the group consisting of Ag: more than 0% by mass and 4% by mass or less and Cu: more than 0% by mass and 0.9% by mass or less.

In addition, a solder paste according to a third aspect is a solder paste containing a flux and a solder powder, in which the flux contains an organic acid, an acrylic resin, a rosin, a thixotropic agent, and a solvent, but does not contain water, the organic acid contains 1,2,3-propanetricarboxylic acid, a content of the 1,2,3-propanetricarboxylic acid is 0.1% by mass or more and 15% by mass or less with respect to a total amount of the entire flux, a content of the acrylic resin is 5% by mass or more and 45% by mass or less with respect to the total amount of the entire flux, a content of the rosin is 5% by mass or more and 45% by mass or less with respect to the total amount of the entire flux, and the solder powder is composed of a solder alloy having an alloy composition containing As: 10 mass ppm or more and less than 25 mass ppm, at least one of Bi: more than 0 mass ppm and 10000 mass ppm or less and Pb: more than 0 mass ppm and 5100 mass ppm or less, Sb: more than 0 mass ppm and 3000 mass ppm or less, and a balance of Sn and satisfying the following formula (3) and formula (4).

$$300 \le 3As+Sb+Bi+Pb \quad (3)$$

$$0.1 \le \{(3As+Sb)/(Bi+Pb)\} \times 100 \le 200 \quad (4)$$

In the formula (3) and the formula (4), As, Sb, Bi, and Pb each represent a content (mass ppm) in the alloy composition.

In addition, in the solder paste according to the third aspect, a ratio (mass ratio) of the content of the rosin to the content of the acrylic resin is preferably 1 or more and 9 or less.

In addition, in the solder paste according to the third aspect, a total content of the organic acid is preferably 0.1% by mass or more and 15% by mass or less with respect to the total amount of the entire flux.

In addition, the solder paste according to the third aspect further contains azoles, in which a content of the azoles is preferably 0.1% by mass or more and 10% by mass or less with respect to the total amount of the entire flux.

In addition, in the solder paste according to the third aspect, a ratio (mass ratio) of the total content of the organic acid to the content of the azoles is preferably 0.6 or more and 100 or less.

In addition, the solder paste according to the third aspect further contains a resin other than the acrylic resin and the rosin, in which a content of the resin other than the acrylic resin and the rosin is preferably more than 0% by mass and 10% by mass or less with respect to the total amount of the entire flux.

In addition, the solder paste according to the third aspect further contains a halogen compound, in which a content of the halogen compound is preferably more than 0% by mass and 5% by mass or less with respect to the total amount of the entire flux.

In addition, the solder paste according to the third aspect further contains an antioxidant, in which a content of the antioxidant is preferably more than 0% by mass and 5% by mass or less with respect to the total amount of the entire flux.

In addition, in the solder paste according to the third aspect, the alloy composition preferably further contains Ni: more than 0 mass ppm and 600 mass ppm or less.

In addition, in the solder paste according to the third aspect, the alloy composition preferably further contains Fe: more than 0 mass ppm and 100 mass ppm or less.

In addition, in the solder paste according to the third aspect, the alloy composition preferably further contains In: more than 0 mass ppm and 1200 mass ppm or less.

In addition, in the solder paste according to the third aspect, the alloy composition preferably further contains at least two of Ni: more than 0 mass ppm and 600 mass ppm or less, Fe: more than 0 mass ppm and 100 mass ppm or less and In: more than 0 mass ppm and 1200 mass ppm or less and satisfies the following formula (6).

$$0<Ni+Fe\leq 680 \tag{6}$$

In the formula (6), Ni and Fe each represent a content (mass ppm) in the alloy composition.

In addition, in the solder paste according to the third aspect, the alloy composition preferably further contains Ni: 0 mass ppm or more and 600 mass ppm or less and Fe: more than 0 mass ppm and 100 mass ppm or less and satisfies the following formula (5) and the following formula (6).

$$0\leq Ni/Fe\leq 50 \tag{5}$$

$$0<Ni+Fe\leq 680 \tag{6}$$

In the formula (5) and the formula (6), Ni and Fe each represent a content (mass ppm) in the alloy composition.

In addition, in the solder paste according to the third aspect, the alloy composition preferably further satisfies the following formula (3a).

$$300\leq 3As+Sb+Bi+Pb\leq 18214 \tag{3a}$$

In the formula (3a), As, Sb, Bi, and Pb each represent the content (mass ppm) in the alloy composition.

In addition, in the solder paste according to the third aspect, the alloy composition preferably further satisfies the following formula (4a).

$$0.1\leq \{(3As+Sb)/(Bi+Pb)\}\times 100\leq 158.5 \tag{4a}$$

In the formula (4a), As, Sb, Bi, and Pb each represent the content (mass ppm) in the alloy composition.

In addition, in the solder paste according to the third aspect, the alloy composition preferably further contains at least one of Ag: more than 0% by mass and 4% by mass or less and Cu: more than 0% by mass and 0.9% by mass or less.

Advantageous Effects of Invention

According to the present invention, it is possible to provide a flux capable of enhancing the wettability of solder, having excellent temperature cycle reliability, and capable of suppressing scattering due to heating during reflow and a solder paste using the same.

BRIEF DESCRIPTION OF DRAWING

FIG. 1 is a graph showing a schematic diagram of a reflow profile in evaluation of scattering suppression.

DESCRIPTION OF EMBODIMENTS

<Flux>

A flux of the present embodiment contains an organic acid, an acrylic resin, a rosin, a thixotropic agent, and a solvent, but does not contain water.

The organic acid includes 1,2,3-propanetricarboxylic acid. The content of the 1,2,3-propanetricarboxylic acid is preferably 0.05% by mass or more and 20% by mass or less, more preferably 0.1% by mass or more and 15% by mass or less, and still more preferably 0.5% by mass or more and 15% by mass or less with respect to the total amount of the entire flux.

(Organic Acid)

The flux of the present embodiment contains 1,2,3-propanetricarboxylic acid and is thereby capable of enhancing solder wettability (wetting speed).

The flux of the present embodiment may contain, in addition to the 1,2,3-propanetricarboxylic acid, other organic acids.

Examples of the other organic acids include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, malic acid, p-anisic acid, stearic acid, 12-hydroxystearic acid, oleic acid, linoleic acid, linolenic acid, a dimer acid, a trimer acid, a hydrogenated dimer acid, which is a hydrogenated substance obtained by adding hydrogen to a dimer acid, a hydrogenated trimer acid, which is a hydrogenated substance obtained by adding hydrogen to a trimer acid, and the like.

One organic acid may be used singly or two or more organic acids may be mixed and used.

The other organic acids are preferably one or more selected from the group consisting of sebacic acid, adipic acid, eicosanedioic acid, and a hydrogenated dimer acid.

The total content of the organic acid is preferably 0.1% by mass or more and 20% by mass or less and more preferably 0.1% by mass or more and 15% by mass or less with respect to the total amount of the entire flux.

The content of the 1,2,3-propanetricarboxylic acid is preferably 5% by mass or more, more preferably 20% by mass or more, still more preferably 30% by mass or more, and most preferably 50% by mass or more and may be 100% by mass with respect to the total content of the organic acid.

(Resin)

The flux of the present embodiment contains an acrylic resin and a rosin as resins.

The flux of the present embodiment may contain a resin other than the acrylic resin and the rosin (other resin).

(Acrylic Resin)

The flux of the present embodiment contains the acrylic resin and is thus capable of enhancing the temperature cycle reliability.

Examples of the acrylic resin include polymers of acrylic acid, polymers of an acrylic acid ester, polymers of acrylic acid and an acrylic acid ester, and the like for which acrylic acid, an acrylic acid ester, which is a reaction product of acrylic acid and an alcohol, methacrylic acid, or a methacrylic acid ester, which is a reaction product of methacrylic acid and an alcohol, is used as a monomer. In addition, examples thereof include polymers of methacrylic acid, polymers of a methacrylic acid ester, polymers of methacrylic acid and a methacrylic acid ester, and the like. Furthermore, examples thereof include polymers of acrylic acid and methacrylic acid, polymers of acrylic acid and a methacrylic acid ester, polymers of methacrylic acid and an acrylic acid ester, polymers of an acrylic acid ester and a methacrylic acid ester, polymers of acrylic acid, methacrylic acid, and an acrylic acid ester, polymers of acrylic acid, methacrylic acid, and a methacrylic acid ester, polymers of acrylic acid, methacrylic acid, an acrylic acid ester, and a methacrylic acid ester, polymers of acrylic acid, an acrylic acid ester, and a methacrylic acid ester, polymers of methacrylic acid, an acrylic acid ester, and a methacrylic acid ester, and the like. Examples of the acrylic acid ester include acrylic acid butyl ester, and examples of the acrylic resin for which the acrylic acid butyl ester is used as a monomer include polymers of acrylic acid butyl ester, polymers of an acrylic acid ester other than acrylic acid butyl ester and acrylic acid butyl ester, polymers of acrylic acid and acrylic acid butyl ester, polymers of acrylic acid, an acrylic acid ester other than acrylic acid butyl ester and acrylic acid butyl ester, and the like. In addition, examples of the methacrylic acid ester include methacrylic acid butyl ester, and examples of the acrylic resin for which the methacrylic acid butyl ester is used as a monomer include polymers of methacrylic acid butyl ester, polymers of a methacrylic acid ester other than methacrylic acid butyl ester and methacrylic acid butyl ester, polymers of methacrylic acid and methacrylic acid butyl ester, polymers of methacrylic acid, a methacrylic acid ester other than methacrylic acid butyl ester and methacrylic acid butyl ester, and the like. Furthermore, examples thereof include polymers of acrylic acid and methacrylic acid butyl ester, polymers of acrylic acid, a methacrylic acid ester other than methacrylic acid butyl ester, and a methacrylic acid butyl ester, polymers of methacrylic acid and acrylic acid butyl ester, polymers of methacrylic acid, an acrylic acid ester other than acrylic acid butyl ester, and acrylic acid butyl ester, polymers of acrylic acid butyl ester and methacrylic acid butyl ester, polymers of acrylic acid ester other than acrylic acid butyl ester and methacrylic acid butyl ester, polymers of acrylic acid butyl ester and a methacrylic acid ester other than methacrylic acid butyl ester, and the like. The polymerization reaction may be random copolymerization, block copolymerization, or the like. In addition, the alcohol is an alcohol in which the carbon chain is linear and the number of carbon atoms is 1 to 24 or an alcohol in which the carbon chain is branched and the number of carbon atoms is 3 to 24, and examples of the alcohol include methanol having 1 carbon atom, ethanol having 2 carbon atoms, 1-propanol having 3 carbon atoms, 2-propanol having 3 carbon atoms, ethylene glycol monomethyl ether having 3 carbon atoms, 1-butanol having 4 carbon atoms, 2-butanol having 4 carbon atoms, isobutanol having 4 carbon atoms, 1-hexanol having 6 carbon atoms, diethylene glycol monoethyl ether having 6 carbon atoms, benzyl alcohol having 7 carbon atoms, 1-octanol having 8 carbon atoms, 2-ethylhexanol having 8 carbon atoms, phenyl glycol having 8 carbon atoms, 1-decanol having 10 carbon atoms, lauryl alcohol having 12 carbon atoms, cetyl alcohol having 16 carbon atoms, stearyl alcohol having 18 carbon atoms, oleyl alcohol having 18 carbon atoms, behenyl alcohol having 22 carbon atoms, and the like.

As the molecular weight of the acrylic resin, the polystyrene-equivalent weight-average molecular weight (Mw) measured by gel permeation chromatography (GPC) is preferably 5000 to 30000, and the weight-average molecular weight (Mw) is more preferably 6000 to 15000.

Examples of such an acrylic resin include poly 2-ethylhexyl acrylate (Mw=8300), poly 2-ethylhexyl acrylate having a different molecular weight (Mw=11700), polylauryl methacrylate (Mw=10080), and the like. In addition, the acrylic resin may be a polymer of the acrylic resin and a different resin or may be, for example, a copolymer of each of the above-described acrylic resins and polyethylene. Examples of such an acrylic/polyethylene copolymer resin include poly 2-ethylhexyl acrylate-polyethylene (Mw=12300) and the like.

One acrylic resin may be used singly or two or more acrylic resins may be mixed and used.

The acrylic resin is preferably one or more selected from the group consisting of poly 2-ethylhexyl acrylate (Mw=8300), poly 2-ethylhexyl acrylate (Mw=11700), polylauryl methacrylate (Mw=10080), and poly 2-ethylhexyl acrylate-polyethylene (Mw=12300).

The total content of the acrylic resins is preferably 5% by mass or more and 60% by mass or less and more preferably 5% by mass or more and 45% by mass or less with respect to the total amount of the entire flux.

(Rosin)

Examples of the rosin that is used in the present embodiment include natural rosins, derivatives obtained from the natural rosins, and the like.

Examples of the natural rosins include gum rosin, wood rosin, tall oil rosin, and the like. Examples of the derivatives include purified rosins, modified rosins, and the like. Examples of the modified rosins include hydrogenated rosins, polymerized rosins, disproportionated rosins, acid-modified rosins, rosin esters, phenol-modified rosins, $\alpha,\beta$-unsaturated carboxylic acid-modified substances (acrylated rosins, maleated rosins, fumarated rosins, acrylic acid-modified hydrogenated rosins, and the like), the purified substances, hydrides, and disproportionated substances of the polymerized rosin, the purified substances, hydrides, and disproportionated substances of the $\alpha,\beta$-unsaturated carboxylic acid-modified substance, and the like.

One rosin may be used singly or two or more rosins may be mixed and used.

The rosin is preferably one or more selected from the group consisting of hydrogenated rosins, acrylic acid-modified hydrogenated rosins, polymerized rosins, and disproportionated rosins.

The total content of the rosins is preferably 5% by mass or more and 60% by mass or less and more preferably 5% by mass or more and 45% by mass or less with respect to the total amount of the entire flux.

The total content of the rosin and the acrylic resin is preferably 30% by mass or more and 60% by mass or less and more preferably 40% by mass or more and 50% by mass or less with respect to the total amount of the entire flux.

In the flux that is used in the present embodiment, the ratio (mass ratio) of the content of the rosin to the content of the acrylic resin is preferably 0.05 or more and 12 or less, more preferably 0.1 or more and 9 or less, and still more preferably 1 or more and 9 or less.

When the ratio of the content of the rosin to the content of the acrylic resin is within the above-described range, it is possible to enhance the temperature cycle reliability of the flux.

The flux that is used in the present embodiment may contain, for example, a polyethylene resin or the like as a resin other than the acrylic resin and the rosin (other resin).

The content of the resin other than the acrylic resin and the rosin is preferably 0% by mass or more and 15% by mass or less, more preferably 0% by mass or more and 10% by mass or less, and still more preferably more than 0% by mass and 10% by mass or less with respect to the total amount of the entire flux.

The total content of the rosin, the acrylic resin, and the other resin is preferably 30% by mass or more and 60% by mass or less and more preferably 40% by mass or more and 50% by mass or less with respect to the total amount of the entire flux.

(Thixotropic Agent)

Examples of the thixotropic agent include an amide compound, an ester compound, a sorbitol-based compound, and the like.

Examples of the amide compound, which is a thixotropic agent, include polyamides, bisamides, monoamides, and the like.

Examples of the monoamides include lauric acid amide, palmitic acid amide, stearic acid amide, behenic acid amide, hydroxystearic acid amide, saturated fatty acid amides, oleic acid amide, erucic acid amide, unsaturated fatty acid amides, p-toluamide, p-toluenemethane amide, aromatic amides, hexamethylene hydroxystearic acid amide, substituted amides, methylol stearic acid amide, methylol amide, fatty acid ester amides, and the like.

Examples of the bisamides include methylene bis(stearic acid amide), ethylene bis(lauric acid amide), ethylene bis(hydroxy fatty acid (the number of carbon atoms in the fatty acid: C6 to 24) amide), ethylene bis(hydroxystearic acid amide), saturated fatty acid bisamide, methylene bis(oleic acid amide), unsaturated fatty acid bisamide, m-xylylene bis(stearic acid amide), aromatic bisamide, and the like.

Examples of the polyamide include saturated fatty acid polyamides, unsaturated fatty acid polyamides, aromatic polyamides, tris 1,2,3-propanetricarboxylate (2-methylcyclohexylamide), cyclic amide oligomers, acyclic amide oligomers, and the like.

Examples of the cyclic amide oligomers include an amide oligomer in which a dicarboxylic acid and a diamine are polycondensed in a cyclic shape, an amide oligomer in which a tricarboxylic acid and a diamine are polycondensed in a cyclic shape, an amide oligomer in which a dicarboxylic acid and a triamine are polycondensed in a cyclic shape, an amide oligomer in which a tricarboxylic acid and a triamine are polycondensed in a cyclic shape, an amide oligomer in which a dicarboxylic acid, a tricarboxylic acid, and a diamine are polycondensed in a cyclic shape, an amide oligomer in which a dicarboxylic acid, a tricarboxylic acid, and a triamine are polycondensed in a cyclic shape, an amide oligomer in which a dicarboxylic acid, a diamine, and a triamine are polycondensed in a cyclic shape, an amide oligomer in which a tricarboxylic acid, a diamine, and a triamine are polycondensed in a cyclic shape, an amide oligomer in which a dicarboxylic acid, a tricarboxylic acid, a diamine, and a triamine are polycondensed in a cyclic shape, and the like.

In addition, examples of the acyclic amide oligomer include an amide oligomer in which a monocarboxylic acid and a diamine and/or a triamine are polycondensed in an acyclic shape, an amide oligomer in which a dicarboxylic acid and/or a tricarboxylic acid and a monoamine are polycondensed in an acyclic shape, and the like. When the acyclic amide oligomer is an amide oligomer containing a monocarboxylic acid or a monoamine, the monocarboxylic acid or the monoamine functions as a terminal molecule, and the acyclic amide oligomer has a reduced molecular weight.

In addition, in a case where the acyclic amide oligomer is an amide compound in which a dicarboxylic acid and/or a tricarboxylic acid and a diamine and/or a triamine are polycondensed in an acyclic shape, the acyclic amide oligomer becomes an acyclic polymer-based amide polymer. Furthermore, examples of the acyclic amide oligomer also include an amide oligomer in which a monocarboxylic acid and a monoamine are condensed in an acyclic shape.

Examples of the ester compound, which is the thixotropic agent, include hydrogenated castor oil and the like.

Examples of the sorbitol-based compound, which is the thixotropic agent, include dibenzylidene sorbitol, bis(4-methylbenzylidene) sorbitol, (D-)sorbitol, monobenzylidene (-D-)sorbitol, mono(4-methylbenzylidene)-(D-)sorbitol, and the like.

One thixotropic agent may be used singly or two or more thixotropic agents may be mixed and used.

The thixotropic agent is preferably one or more selected from the group consisting of an amide compound and an ester compound.

The thixotropic agent is preferably one or more selected from the group consisting of a polyamide, a bisamide, a monoamide, and hydrogenated castor oil.

The polyamide is preferably an aliphatic polyamide. The bisamide is preferably ethylene bis(hydroxystearic acid amide). The monoamide is preferably p-toluamide.

The total content of the thixotropic agents is preferably 2% by mass or more and 12% by mass or less and more preferably 3% by mass or more and 8.5% by mass or less with respect to the total amount of the entire flux.

The total content of the amide compounds is preferably 2% by mass or more and 12% by mass or less and more preferably 3% by mass or more and 8.5% by mass or less with respect to the total amount of the entire flux.

The content of the ester compound is preferably 0% by mass or more and 5% by mass or less and more preferably 0% by mass or more and 3% by mass or less with respect to the total amount of the entire flux.

(Solvent)

The flux of the present embodiment does not contain water. The flux of the present embodiment does not contain water and is thus capable of making the scattering suppression effect sufficient.

Examples of the solvent that is used in the present embodiment include an alcohol-based solvent, a glycol ether-based solvent, terpineols, and the like.

Examples of the alcohol-based solvent include isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis (methylene) bis(2-ethyl-1,3-propanediol), 2,2-bis(hydroxymethyl)-1,3-propanediol, 1,2,6-trihydroxyhexane, bis [2,2,2-tris(hydroxymethyl)ethyl]ether, 1-ethynyl-1-cyclohexanole, 1,4-cyclohexanediol, 1,4-cyclohexanedimethanol, erythritol, threitol, guaiacol glycerol ether, 3,6-dimethyl-4-octyne-3,6-diol, 2,4,7,9-tetramethyl-5-decyne-4,7-diol, and the like.

Examples of the glycol ether-based solvent include aliphatic glycol ether-based solvents such as hexyl glycol, hexyl diglycol, 2-ethyl hexyl glycol, 2-ethyl hexyl diglycol, dimethyl triglycol, dibutyl diglycol, 2-methylpentane-2,4-diol, triethylene glycol monobutyl ether, tetraethylene glycol monomethyl ether, and tetraethylene glycol dimethyl ether;

aromatic glycol ether-based solvents such as phenyl glycol, phenyl diglycol, benzyl glycol, and benzyl diglycol; and the like.

One solvent or two or more solvents can be used.

(Other Components)

The flux of the present embodiment may contain, for example, an amine, a halogen compound, an antioxidant, and the like as other components.

Examples of the amine include azoles, other amines (excluding azoles), and the like.

The flux of the present embodiment may contain azoles.

The "azoles" mentioned herein means compounds having a 5-membered heterocyclic structure having one or more nitrogen atoms and also include condensed rings of the 5-membered heterocyclic structure and a different ring structure.

When the flux contains the azoles, it is possible to improve the corrosion suppression property of the metallic surface (for example, a copper plate) of an object to be joined.

Examples of the azoles include imidazole, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, 5-phenyltetrazole, 1-cyanoethyl-2-undecylimidazolium trimellitate, 1-cyanoethyl phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 1-dodecyl-2-methyl-3-benzylimidazolium chloride, 2-methylimidazoline, 2-phenylimidazoline, 6-(2-benzotriazolyl)-4-tert-octyl-6'-tert-butyl-4'-methyl-2,2'-methylenebisphenol, and the like.

One azole may be used singly or two or more azoles may be mixed and used.

The azoles are preferably one or more selected from the group consisting of 2-phenylimidazole, 2-phenyl-4-methylimidazole, 2-heptadecylimidazole, benzimidazole, and 2-octylbenzimidazole.

In the flux of the present embodiment, the total content of the azoles is preferably 0.1% by mass or more and 15% by mass or less and more preferably 0.1% by mass or more and 10% by mass or less with respect to the total amount of the entire flux.

In the flux of the present embodiment, the ratio (mass ratio) of the total content of the organic acid to the content of the azoles is preferably 0.3 or more and 200 or less and more preferably 0.6 or more and 100 or less.

When the ratio (mass ratio) of the total content of the organic acid to the content of the azoles is within the above-described range, it is possible to make the corrosion suppression effect sufficient.

Examples of the other amines include monoethanolamine, ethylamine, triethylamine, cyclohexylamine, ethylenediamine, triethylenetetramine, 2,4-diamino vinyl-s-triazine, 2,4-diamino-6-vinyl-s-triazine isocyanuric acid adduct, 2,4-diamino-6-methacryloyloxyethyl-s-triazine, and the like.

The amine is preferably monoethanolamine.

Examples of the halogen compound include an amine hydrohalide and an organic halogen compound.

The amine hydrohalide is a compound obtained by reacting an amine and a hydrogen halide. Examples of the amine in the amine hydrohalide include ethylamine, ethylenediamine, triethylamine, diphenylguanidine, ditolylguanidine, methylimidazole, 2-ethyl-4-methylimidazole, and the like, and examples of the hydrogen halide include hydrides of chlorine, bromine, and iodine.

Examples of the organic halogen compound include trans-2,3-dibromo-2-butene-1,4-diol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, and the like.

The halogen compound is preferably one or more selected from the group consisting of diphenylguanidine/HBr or 2,3-dibromo-1,4-butanediol.

One halogen compound may be used singly or two or more halogen compounds may be mixed and used.

The total content of the halogen compounds is preferably 0% by mass or more and 8% by mass or less, more preferably 0% by mass or more and 5% by mass or less, and still more preferably more than 0% by mass and 5% by mass or less with respect to the total amount of the entire flux.

Examples of the antioxidant include a hindered phenolic antioxidant and the like.

The total content of the antioxidants is preferably 0% by mass or more and 8% by mass or less, more preferably 0% by mass or more and 5% by mass or less, and still more preferably more than 0% by mass and 5% by mass or less with respect to the total amount of the entire flux.

The flux of the present embodiment contains the organic acid, the acrylic resin, the rosin, the thixotropic agent, and the solvent, but does not contain water. The organic acid includes 1,2,3-propanetricarboxylic acid. When the content of the 1,2,3-propanetricarboxylic acid is 0.1% by mass or more and 15% by mass or less with respect to the total amount of the entire flux, it is possible to make the flux have sufficient solder wettability, temperature cycle reliability, and scattering suppression effect.

The flux of the present embodiment further contains the azoles, which makes it possible to make the flux have a sufficient corrosion suppression effect.

Examples of one embodiment of the flux include a flux containing an organic acid, an acrylic resin, a rosin, a thixotropic agent, a solvent, and other organic acids, but not containing water, in which the organic acid includes 1,2,3-propanetricarboxylic acid, the content of the 1,2,3-propanetricarboxylic acid is 0.1% by mass or more and 3% by mass or less with respect to the total amount of the entire flux, and the total content of the organic acid is 3% by mass or more and 15% by mass or less with respect to the total amount of the entire flux.

In addition, examples of one embodiment of the flux include a flux containing an organic acid, an acrylic resin, a rosin, a thixotropic agent, a solvent, and a halogen compound, but not containing water, in which the organic acid includes 1,2,3-propanetricarboxylic acid, the content of the 1,2,3-propanetricarboxylic acid is 0.1% by mass or more and 1% by mass or less with respect to the total amount of the entire flux, and the total content of the organic acid and the halogen compound is 1.1% by mass or more and 2% by mass or less with respect to the total amount of the entire flux.

<Example of Solder Paste of Present Embodiment>

A solder paste of the present embodiment contains the above-described flux and a solder powder.

The solder powder is composed of a powder of pure Sn solder, a Sn—Ag-based alloy, a Sn—Cu-based alloy, a Sn—Ag—Cu-based alloy, a Sn—Bi-based alloy, a Sn—In-based alloy, or a powder of a solder alloy obtained by adding Sb, Bi, In, Cu, Zn, As, Ag, Cd, Fe, Ni, Co, Au, Ge, P, or the like to the above-described alloy.

Content of Flux:

The content of the flux is preferably 5 to 95% by mass and more preferably 5 to 15% by mass with respect to the total mass of the solder paste.

When the content of the flux in the solder paste is within this range, a thickening suppression effect attributed to the solder powder is sufficiently exhibited.

Additionally, favorable wetting and spreading are exhibited even under conditions with a large heat load, and the wetting speed improves.

Solder Alloy (First Embodiment):

The solder alloy preferably has an alloy composition containing As: 25 mass ppm or more and 300 mass ppm or less, at least one of Sb: more than 0 mass ppm and 3000 mass ppm or less, Bi: more than 0 mass ppm and 10000 mass ppm or less, and Pb: more than 0 mass ppm and 5100 mass ppm or less, and a balance (Bal) of Sn. This solder alloy may further contain at least one of Ag: more than 0% by mass and 4% by mass or less and Cu: more than 0% by mass and 0.9% by mass or less.

As is an element capable of suppressing a change in the viscosity of the solder paste over time. It is presumed that As has low reactivity with the flux and is a noble element with respect to Sn and is thus capable of exhibiting a thickening suppression effect. The lower limit of the content of As is, for example, 25 mass ppm or more, preferably 50 mass ppm or more, and more preferably 100 mass ppm or more. On the other hand, when As is too large, the wettability of the solder alloy deteriorates. The upper limit of the content of As is, for example, 300 mass ppm or less, preferably 250 mass ppm or less, and more preferably 200 mass ppm or less.

Sb is an element having low reactivity with the flux and exhibiting a thickening suppression effect. In a case where the solder alloy contains Sb, the lower limit of the content of Sb is, for example, more than 0 mass ppm, preferably 25 mass ppm or more, more preferably 50 mass ppm or more, still more preferably 100 mass ppm or more, and particularly preferably 300 mass ppm or more. On the other hand, when the content of Sb is too large, since the wettability of the solder alloy deteriorates, there is a need for the solder alloy to have an appropriate content of Sb. The upper limit of the content of Sb is, for example, 3000 mass ppm or less, preferably 1150 mass ppm or less, and more preferably 500 mass ppm or less.

Similar to Sb, Bi and Pb are elements having low reactivity with the flux and exhibiting a thickening suppression effect. In addition, Bi and Pb decrease the liquidus temperature of the solder alloy and decrease the viscosity of molten solder and are thus elements capable of suppressing deterioration of the wettability of the solder alloy due to As.

As long as at least one element of Sb, Bi, and Pb is present, it is possible to suppress deterioration of the wettability of the solder alloy due to As. In a case where the solder alloy contains Bi, the lower limit of the content of Bi is, for example, more than 0 mass ppm, preferably 25 mass ppm or more, more preferably 50 mass ppm or more, still more preferably 75 mass ppm or more, particularly preferably 100 mass ppm or more, and most preferably 250 mass ppm or more. In a case where the solder alloy contains Pb, the lower limit of the content of Pb is, for example, more than 0 mass ppm, preferably 25 mass ppm or more, more preferably 50 mass ppm or more, still more preferably 75 mass ppm or more, particularly preferably 100 mass ppm or more, and most preferably 250 mass ppm or more.

On the other hand, when the contents of these elements are too large, since the solidus temperature significantly decreases, $\Delta T$, which is the temperature difference between the liquidus temperature and the solidus temperature, becomes too wide. When $\Delta T$ is too wide, since a high-melting point crystal phase having a small content of Bi or Pb is precipitated in a solidification process of the molten solder, the liquid phase Bi or Pb is concentrated. When the temperature of the molten solder further decreases after that, a low-melting point crystal phase having a high concentration of Bi or Pb is segregated. Therefore, the mechanical strength and the like of the solder alloy deteriorate, and the reliability deteriorates. Particularly, since the crystal phase having a high Bi concentration is hard and brittle, segregation of the crystal phase in the solder alloy significantly degrades the reliability.

From such a viewpoint, in a case where the solder alloy contains Bi, the upper limit of the content of Bi is, for example, 10000 mass ppm or less, preferably 1000 mass ppm or less, more preferably 600 mass ppm or less, and still more preferably 500 mass ppm or less. The upper limit of the content of Pb is, for example, 5100 mass ppm or less, preferably 5000 mass ppm or less, more preferably 1000 mass ppm or less, still more preferably 850 mass ppm or less, and particularly preferably 500 mass ppm or less.

The solder alloy preferably satisfies the following mathematical formula (1).

$$275 \leq 2As+Sb+Bi+Pb \tag{1}$$

In the mathematical formula (1), As, Sb, Bi, and Pb each represent the content (mass ppm) in the alloy composition.

As, Sb, Bi, and Pb are all elements exhibiting a thickening suppression effect. The total of these is preferably 275 mass ppm or more. In the mathematical formula (1), the reason for the content of As to be doubled is that As has a higher thickening suppression effect than Sb, Bi, or Pb.

The lower limit of the mathematical formula (1) is preferably 350 or more and more preferably 1200 or more. On the other hand, the upper limit of the mathematical formula (1) is not particularly limited from the viewpoint of the thickening suppression effect, but is preferably 25200 or less, more preferably 10200 or less, still more preferably 5300 or less, and particularly preferably 3800 or less from the viewpoint of setting $\Delta T$ in a suitable range.

The mathematical formula for which the upper limit and the lower limit are appropriately selected from the above-described preferable aspects is the following mathematical formula (1a) and mathematical formula (1b).

$$275 \leq 2As+Sb+Bi+Pb \leq 25200 \quad (1a)$$

$$275 \leq 2As+Sb+Bi+Pb \leq 5300 \quad (1b)$$

In the mathematical formula (1a) and the mathematical formula (1b), As, Sb, Bi, and Pb each represent the content (mass ppm) in the alloy composition.

In addition, the solder alloy preferably satisfies the following mathematical formula (2).

$$0.01 \leq (2As+Sb)/(Bi+Pb) \leq 10.00 \quad (2)$$

In the mathematical formula (2), As, Sb, Bi, and Pb each represent the content (mass ppm) in the alloy composition.

When the contents of As and Sb are large, the wettability of the solder alloy deteriorates. On the other hand, Bi and Pb suppress the deterioration of the wettability of the solder alloy due to As contained; however, when the contents thereof are too large, ΔT increases. Particularly, in an alloy composition containing Bi and Pb at the same time, ΔT is likely to increase. In consideration of these facts, when an attempt is made to excessively improve the wettability of the solder alloy by increasing the contents of Bi and Pb, ΔT becomes wide. On the other hand, when an attempt is made to improve the thickening suppression effect by increasing the content of As or Sb, the wettability of the solder alloy deteriorates. Therefore, in a case where the components are divided into a group of As and Sb and a group of Bi and Pb, and the total amount of both groups is within a predetermined appropriate range, all of the thickening suppression effect, narrowing of ΔT, and the wettability of the solder alloy are satisfied at the same time.

When the mathematical formula (2) is less than 0.01, since the total of the contents of Bi and Pb becomes relatively large compared with the total of the contents of As and Sb, ΔT becomes wide. The lower limit of the mathematical formula (2) is preferably 0.02 or more, more preferably 0.41 or more, still more preferably 0.90 or more, particularly preferably 1.00 or more, and most preferably 1.40 or more. On the other hand, when the mathematical formula (2) exceeds 10.00, since the total of the contents of As and Sb becomes relatively large compared with the total of the contents of Bi and Pb, the wettability of the solder alloy deteriorates. The upper limit of the mathematical formula (2) is preferably 5.33 or less, more preferably 4.50 or less, still more preferably 2.67 or less, and particularly preferably 2.30 or less.

The denominator of the mathematical formula (2) is "Bi+Pb", and, when these are not contained, the mathematical formula (2) is not established. Therefore, the solder alloy preferably contains at least one of Bi and Pb. As described above, the alloy composition containing neither Bi nor Pb is poor in the wettability of the solder alloy.

The mathematical formula for which the upper limit and the lower limit are appropriately selected from the above-described preferable aspects is the following mathematical formula (2a).

$$0.31 \leq (2As+Sb)/(Bi+Pb) \leq 10.00 \quad (2a)$$

In the mathematical formula (2a), As, Sb, Bi, and Pb each represent the content (mass ppm) in the alloy composition.

Solder Alloy (Second Embodiment):

In addition, the solder alloy may have an alloy composition containing As: 10 mass ppm or more and less than 25 mass ppm, at least one of Bi: 0 to 10000 mass ppm and Pb: 0 to 5100 mass ppm, Sb: more than 0 mass ppm and 3000 mass ppm or less, and a balance of Sn and satisfy the following formula (3) and formula (4). This solder alloy may further contain at least one of Ag: more than 0% by mass and 4% by mass or less and Cu: more than 0% by mass and 0.9% by mass or less.

$$300 \leq 3As+Sb+Bi+Pb \quad (3)$$

$$0.1 \leq \{(3As+Sb)/(Bi+Pb)\} \times 100 \leq 200 \quad (4)$$

In the formula (3) and the formula (4), As, Sb, Bi, and Pb each represent the content (mass ppm) in the alloy composition.

In a case where such a solder alloy is used, all of the thickening suppression effect, narrowing of ΔT, and the wettability of the solder alloy are satisfied at the same time.

In addition, the solder alloy may have an alloy composition containing As: 10 mass ppm or more and less than 25 mass ppm, at least one of Bi: more than 0 mass ppm and 10000 mass ppm or less and Pb: more than 0 mass ppm and 5100 mass ppm or less, Sb: more than 0 mass ppm and 3000 mass ppm or less, and a balance of Sn and satisfy the following formula (3) and formula (4).

In addition, the solder alloy may have an alloy composition containing As: 10 mass ppm or more and less than 25 mass ppm, at least one of Bi: 50 to 10000 mass ppm and Pb: more than 0 mass ppm and 5100 mass ppm or less, Sb: more than 0 mass ppm and 3000 mass ppm or less, and a balance of Sn and satisfy the following formula (3) and formula (4).

In addition, the solder alloy may have an alloy composition containing As: 10 mass ppm or more and less than 25 mass ppm, at least one of Bi: more than 0 mass ppm and 10000 mass ppm or less and Pb: 50 to 5100 mass ppm, Sb: more than 0 mass ppm and 3000 mass ppm or less, and a balance of Sn and satisfy the following formula (3) and formula (4).

In addition, the solder alloy may have an alloy composition containing As: 10 mass ppm or more and less than 25 mass ppm, at least one of Bi: more than 0 mass ppm and 10000 mass ppm or less and Pb: more than 0 mass ppm and 5100 mass ppm or less, Sb: 50 mass ppm to 3000 mass ppm, and a balance of Sn and satisfy the following formula (3) and formula (4).

In addition, the solder alloy may have an alloy composition containing As: 10 mass ppm or more and less than 25 mass ppm, at least one of Bi: 50 to 10000 mass ppm and Pb: 50 to 5100 mass ppm, Sb: more than 0 mass ppm and 3000 mass ppm or less, and a balance of Sn and satisfy the formula (3) and the formula (4).

In addition, the solder alloy may have an alloy composition containing As: 10 mass ppm or more and less than 25 mass ppm, at least one of Bi: more than 0 mass ppm and 10000 mass ppm or less and Pb: 50 to 5100 mass ppm, Sb: 50 to 3000 mass ppm, and a balance of Sn and satisfy the formula (3) and the formula (4).

In addition, the solder alloy may have an alloy composition containing As: 10 mass ppm or more and less than 25 mass ppm, at least one of Bi: 50 to 10000 mass ppm and Pb: more than 0 mass ppm and 5100 mass ppm or less, Sb: 50 to 3000 mass ppm, and a balance of Sn and satisfy the formula (3) and the formula (4).

In addition, the solder alloy may have an alloy composition containing As: 10 mass ppm or more and less than 25 mass ppm, at least one of Bi: 50 to 10000 mass ppm and Pb: 50 to 5100 mass ppm, Sb: 50 to 3000 mass ppm, and a balance of Sn and satisfy the formula (3) and the formula (4).

In addition, the solder alloy may further contain Ni: more than 0 mass ppm and 600 mass ppm or less.

In addition, the solder alloy may further contain Fe: more than 0 mass ppm and 100 mass ppm or less.

In addition, the solder alloy may further contain In: more than 0 mass ppm and 1200 mass ppm or less.

In addition, the solder alloy may further contain at least two of Ni: more than 0 mass ppm and 600 mass ppm or less, Fe: more than 0 mass ppm and 100 mass ppm or less and In: more than 0 mass ppm and 1200 mass ppm or less and satisfy the following formula (6).

$$0 < Ni + Fe \leq 680 \tag{6}$$

In the formula (6), Ni and Fe each represent the content (mass ppm) in the alloy composition.

In addition, the solder alloy may further contain Ni: 0 mass ppm or more and 600 mass ppm or less and Fe: more than 0 mass ppm and 100 mass ppm or less and satisfy the following formula (5) and the following formula (6).

$$0 \leq Ni/Fe \leq 50 \tag{5}$$

$$0 < Ni + Fe \leq 680 \tag{6}$$

In the formula (5) and the formula (6), Ni and Fe each represent the content (mass ppm) in the alloy composition.

In addition, the solder alloy may further satisfy the following formula (3a).

$$300 \leq 3As + Sb + Bi + Pb \leq 18214 \tag{3a}$$

In the formula (3a), As, Sb, Bi, and Pb each represent the content (mass ppm) in the alloy composition.

In addition, the solder alloy may further satisfy the following formula (4a).

$$0.1 \leq \{(3As + Sb)/(Bi + Pb)\} \times 100 \leq 158.5 \tag{4a}$$

In the formula (4a), As, Sb, Bi, and Pb each represent the content (mass ppm) in the alloy composition.

In addition, the above-described solder alloy may further contain at least one of Ag: more than 0% by mass and 4% by mass or less and Cu: more than 0% by mass and 0.9% by mass or less.

Ag is an optional element capable of forming $Ag_3Sn$ at crystal interfaces to improve the reliability of the solder alloy. In addition, Ag is a nobler element than Sn in terms of the ionization tendency, and, when coexisting with As, Pb and Bi, promotes the thickening suppression effect thereof. The content of Ag is preferably more than 0% by mass and 4% by mass or less, more preferably 0.5% by mass or more and 3.5% by mass or less, and still more preferably 1.0% by mass or more and 3.0% by mass or less.

Cu is an optional element capable of improving the joining strengths of solder joints. In addition, Cu is a nobler element than Sn in terms of the ionization tendency, and, when coexisting with As, Pb and Bi, promotes the thickening suppression effect thereof. The content of Cu is preferably more than 0% by mass and 0.9% by mass or less, more preferably 0.1% by mass or more and 0.8% by mass or less, and still more preferably 0.2% by mass or more and 0.7% by mass or less.

The balance (Bal) of the solder alloy is preferably Sn. The solder alloy may contain unavoidable impurities in addition to the above-described elements. Even in a case where unavoidable impurities are contained, the above-described effects are not affected. When the content of In is too large, since ΔT becomes wide, as long as the content is 1000 mass ppm or less, the above-described effects are not affected.

The solder paste containing the above-described flux and the solder powder is excellent in terms of solder wettability and scattering suppression. Additionally, the viscosity of the solder paste is less likely to increase over time.

EXAMPLES

Hereinafter, the present invention will be described with examples, but the present invention is not limited to the following examples.

Fluxes of examples and comparative examples were prepared according to compositions shown in Tables 1 to 12 below, solder pastes were prepared using these fluxes, and the solder wettability (wetting speed), the temperature cycle reliability of the fluxes, and the scattering suppression of the solder pastes were verified.

Composition fractions in Tables 1 to 12 are "% by mass" in a case where the total amount of the flux is set to 100, and vacant cells means "0% by mass".

In each table, an acrylic resin A is poly 2-ethylhexyl acrylate (Mw=8300). An acrylic resin B is poly 2-ethylhexyl acrylate having a different molecular weight (Mw=11700). An acrylic resin C is polylauryl methacrylate (Mw=10080). An acrylic resin D is poly 2-ethylhexyl acrylate-polyethylene (Mw=12300).

In each table, an aliphatic polyamide was used as a polyamide, hexamethylene bis(hydroxystearic acid amide) was used as a bisamide, and p-toluamide was used as a monoamide.

The solder pastes contained 11% by mass of the flux and 89% by mass of a solder powder. In addition, the solder powder in the solder paste was a Sn—Ag—Cu-based solder alloy containing 3.0% by mass of Ag, 0.5% by mass of Cu, and a balance of Sn.

In addition, the size of a metal powder in the solder paste is a size (particle size distribution) that satisfies the symbol 5 in the powder size classification (Table 2) in JIS Z 3284-1: 2004.

<Evaluation of Solder Wettability (Wetting Speed)>
(1) Verification Method

The wetting speed of the flux was evaluated as described below based on the method of the meniscograph test by performing an oxidation treatment on a copper plate having a width of 5 mm, a length of 25 mm, and a thickness of 0.5 mm at 150° C. for 1 hour to obtain a copper oxide plate as a test plate using Solder Checker SAT-5200 (manufactured by RHESCA Co., Ltd.) as a testing device and Sn-3Ag-0.5Cu (each numerical value is "mass %") as solder.

First, the test plate was immersed 5 mm in each of the fluxes of Examples 1 to 54 and Comparative Examples 1 to 4 weighed out into a beaker to apply the flux to the test plate. Subsequently, after the application of the flux, the test plate to which the flux had been applied was rapidly immersed in a solder bath to obtain zero cross time (sec). Subsequently, measurement was performed five times on each of the fluxes of Examples 1 to 54 and Comparative Examples 1 to 4, and the average value of the obtained 5 zero cross times (sec) was calculated. The test conditions were set as described below.

Immersion speed into solder bath: 5 mm/sec (JIS Z 3198-4: 2003)
Immersion depth into solder bath: 2 mm (JIS Z 3198-4: 2003)
Immersion time in solder bath: 10 sec (JIS Z 3198-4: 2003)
Solder bath temperature: 245° C. (JIS C 60068-2-69: 2019)

As the average value of the zero cross times (sec) become shorter, the wetting speed becomes faster, which means that the solder wettability is favorable.

(2) Determination Standards

◯: The average value of zero cross times (sec) is 6 seconds or shorter.

X: The average value of zero cross times (sec) exceeds 6 seconds.

<Evaluation of Temperature Cycle Reliability>

(1) Verification Method

In the evaluation of the temperature cycle reliability, each of the fluxes of Examples 1 to 54 and Comparative Examples 1 to 4 was applied onto a copper plate to form a residue on the copper plate. Subsequently, a treatment of holding the copper plate on which the residue was formed for 30 minutes at −30° C. and then at 110° C. was repeated 500 times. Subsequently, the presence or absence of cracks in the residue after the treatment was visually evaluated.

(2) Determination Standards

◯: The generation of cracks was not shown in the residue.

X: The generation of cracks was shown in the residue.

<Evaluation of Scattering Suppression>

(1) Verification Method

Each of solder paste compositions of the examples and the comparative examples was printed on a copper-clad laminate (sizes: 105 mm×105 mm, thickness: 1.0 mm) using a metal mask (mask thickness: 0.1 mm, one printing pattern with 6.5 mmφ), and then reflow was performed according to a profile in which scattering as shown in FIG. 1 was likely to occur (temperature rising rate: 1.3° C./s, peak temperature: 250° C.), thereby producing a test substrate. The test substrate was observed, and the number of times of the scattering of the solder paste on the entire test substrate was measured. The test was performed 3 times on each of the solder paste compositions of the examples and the comparative examples, and the average value of the numbers of times of the scattering of the solder paste was calculated.

(2) Determination Standards

◯: The number of times of the scattering of the solder pastes is less than 10.

X: The number of times of the scattering of the solder pastes is 10 or more.

<Comprehensive Evaluation>

◯: All of the solder wettability (wetting speed), the temperature cycle reliability, and the scattering suppression are ◯.

X: At least one of the solder wettability (wetting speed), the temperature cycle reliability, and the scattering suppression is X.

TABLE 1

| Material | | | Example 1 | Example 2 | Example 3 | Example 4 | Example 5 |
|---|---|---|---|---|---|---|---|
| Organic acids | Specific organic acid | 1,2,3-Propanetricarboxylic acid | 3 | 0.1 | 0.5 | 1 | 5 |
| | Other organic acids | Sebacic acid | | | | | |
| | | Adipic acid | | | | | |
| | | Eicosanedioic acid | | | | | |
| | | Hydrogenated dimer acid | | | | | |
| Resins | Rosin | Hydrogenated rosin | 25 | 25 | 25 | 25 | 25 |
| | | Acrylic acid-modified hydrogenated rosin | | | | | |
| | | Polymerized rosin | | | | | |
| | | Disproportionated rosin | | | | | |
| | Acrylic resin | Acrylic resin A | 25 | 25 | 25 | 25 | 25 |
| | | Acrylic resin B | | | | | |
| | | Acrylic resin C | | | | | |
| | | Acrylic resin D | | | | | |
| | Other resin | Polyethylene resin | | | | | |
| Amines | Azoles | 2-Phenylimidazole | 1 | 1 | 1 | 1 | 1 |
| | | 2-Phenyl-4-methylimidazole | | | | | |
| | | 2-Heptadecylimidazole | | | | | |
| | | Benzimidazole | | | | | |
| | | 2-Octylbenzimidazole | | | | | |
| | Other amine | Monoethanolamine | | | | | |
| Halogens | Amine hydrohalide | Diphenylguanidine/HBr | | | 0.5 | 0.5 | |
| | Organic halogen compound | 2,3-Dibromobutane-1,4-diol | | 1 | 0.5 | 0.5 | |
| | Antioxidant | Hindered phenolic antioxidant | | | | | |
| Thixotropic agents | Amide compound | Polyamide | 3 | 3 | 3 | 3 | 3 |
| | | Bisamide | | | | | |
| | | Monoamide | | | | | |
| | Ester compound | Hydrogenated castor oil | | | | | |
| Solvents | Water | Water | | | | | |
| | Other solvents | Tetraethylene glycol dimethyl ether | 43 | 44.9 | 44.5 | 44 | 41 |
| | | Hexyl diglycol | | | | | |
| Total | | | 100 | 100 | 100 | 100 | 100 |

TABLE 1-continued

| Material | Example 1 | Example 2 | Example 3 | Example 4 | Example 5 |
|---|---|---|---|---|---|
| Rosin total amount/acrylic resin total amount (mass ratio) | 1 | 1 | 1 | 1 | 1 |
| Solder wettability (wetting speed) | ○ | ○ | ○ | ○ | ○ |
| Temperature cycle reliability | ○ | ○ | ○ | ○ | ○ |
| Scattering suppression | ○ | ○ | ○ | ○ | ○ |
| Comprehensive evaluation | ○ | ○ | ○ | ○ | ○ |

TABLE 2

| | | Material | Example 6 | Example 7 | Example 8 | Example 9 | Example 10 |
|---|---|---|---|---|---|---|---|
| Organic acids | Specific organic acid | 1,2,3-Propanetricarboxylic acid | 7 | 10 | 15 | 3 | 3 |
| | Other organic acids | Sebacic acid | | | | | |
| | | Adipic acid | | | | | |
| | | Eicosanedioic acid | | | | | |
| | | Hydrogenated dimer acid | | | | | |
| Resins | Rosin | Hydrogenated rosin | 25 | 25 | 25 | 25 | 25 |
| | | Acrylic acid-modified hydrogenated rosin | | | | | |
| | | Polymerized rosin | | | | | |
| | | Disproportionated rosin | | | | | |
| | Acrylic resin | Acrylic resin A | 25 | 25 | 25 | 25 | 25 |
| | | Acrylic resin B | | | | | |
| | | Acrylic resin C | | | | | |
| | | Acrylic resin D | | | | | |
| | Other resin | Polyethylene resin | | | | | |
| Amines | Azoles | 2-Phenylimidazole | 1 | 1 | 1 | 1 | 1 |
| | | 2-Phenyl-4-methylimidazole | | | | | |
| | | 2-Heptadecylimidazole | | | | | |
| | | Benzimidazole | | | | | |
| | | 2-Octylbenzimidazole | | | | | |
| | Other amine | Monoethanolamine | | | | 5 | |
| Halogens | Amine hydrohalide | Diphenylguanidine/HBr | | | | | 3 |
| | Organic halogen compound | 2,3-Dibromobutane-1,4-diol | | | | | |
| | Antioxidant | Hindered phenolic antioxidant | | | | | |
| Thixotropic agents | Amide compound | Polyamide | 3 | 3 | 3 | 3 | 3 |
| | | Bisamide | | | | | |
| | | Monoamide | | | | | |
| | Ester compound | Hydrogenated castor oil | | | | | |
| Solvents | Water | Water | | | | | |
| | Other solvents | Tetraethylene glycol dimethyl ether | 39 | 36 | 31 | 38 | 40 |
| | | Hexyl diglycol | | | | | |
| | | Total | 100 | 100 | 100 | 100 | 100 |
| Rosin total amount/acrylic resin total amount (mass ratio) | | | 1 | 1 | 1 | 1 | 1 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 3

| | | Material | Example 11 | Example 12 | Example 13 | Example 14 | Example 15 |
|---|---|---|---|---|---|---|---|
| Organic acids | Specific organic acid | 1,2,3-Propanetricarboxylic acid | 3 | 3 | 3 | 3 | 3 |
| | Other organic acids | Sebacic acid | | | | | |
| | | Adipic acid | | | | | |
| | | Eicosanedioic acid | | | | | |
| | | Hydrogenated dimer acid | | | | | |

TABLE 3-continued

| | | Material | Example 11 | Example 12 | Example 13 | Example 14 | Example 15 |
|---|---|---|---|---|---|---|---|
| Resins | Rosin | Hydrogenated rosin | 25 | 25 | 25 | 25 | 25 |
| | | Acrylic acid-modified hydrogenated rosin | | | | | |
| | | Polymerized rosin | | | | | |
| | | Disproportionated rosin | | | | | |
| | Acrylic resin | Acrylic resin A | 25 | 25 | 25 | 25 | 25 |
| | | Acrylic resin B | | | | | |
| | | Acrylic resin C | | | | | |
| | | Acrylic resin D | | | | | |
| | Other resin | Polyethylene resin | | | | | |
| Amines | Azoles | 2-Phenylimidazole | 1 | 1 | 1 | 1 | 1 |
| | | 2-Phenyl-4-methylimidazole | | | | | |
| | | 2-Heptadecylimidazole | | | | | |
| | | Benzimidazole | | | | | |
| | | 2-Octylbenzimidazole | | | | | |
| | Other amine | Monoethanolamine | | | | | |
| Halogens | Amine hydrohalide | Diphenylguanidine/HBr | | | | 1 | 0.5 |
| | Organic halogen compound | 2,3-Dibromobutane-1,4-diol | 5 | | | | 0.5 |
| Antioxidant | | Hindered phenolic antioxidant | | | | 3 | 5 |
| Thixotropic agents | Amide compound | Polyamide | 3 | | | 1 | 1 |
| | | Bisamide | | 3 | | 1 | 1 |
| | | Monoamide | | | 3 | 1 | 1 |
| | Ester compound | Hydrogenated castor oil | | | | | 3 |
| Solvents | Water | Water | | | | | |
| | Other solvents | Tetraethylene glycol dimethyl ether | 38 | 43 | 43 | 39 | 34 |
| | | Hexyl diglycol | | | | | |
| Total | | | 100 | 100 | 100 | 100 | 100 |
| Rosin total amount/acrylic resin total amount (mass ratio) | | | 1 | 1 | 1 | 1 | 1 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 4

| | | Material | Example 16 | Example 17 | Example 18 | Example 19 | Example 20 |
|---|---|---|---|---|---|---|---|
| Organic acids | Specific organic acid | 1,2,3-Propanetricarboxylic acid | 3 | 3 | 3 | 3 | 3 |
| | Other organic acids | Sebacic acid | | | | | |
| | | Adipic acid | | | | | |
| | | Eicosanedioic acid | | 10 | | | |
| | | Hydrogenated dimer acid | | | 10 | | |
| Resins | Rosin | Hydrogenated rosin | 25 | 5 | 45 | 25 | 25 |
| | | Acrylic acid-modified hydrogenated rosin | | | | | |
| | | Polymerized rosin | | | | | |
| | | Disproportionated rosin | | | | | |
| | Acrylic resin | Acrylic resin A | 25 | 45 | 5 | | |
| | | Acrylic resin B | | | | 25 | |
| | | Acrylic resin C | | | | | 25 |
| | | Acrylic resin D | | | | | |
| | Other resin | Polyethylene resin | | | | | |
| Amines | Azoles | 2-Phenylimidazole | 1 | 1 | 1 | 1 | 1 |
| | | 2-Phenyl-4-methylimidazole | | | | | |
| | | 2-Heptadecylimidazole | | | | | |
| | | Benzimidazole | | | | | |
| | | 2-Octylbenzimidazole | | | | | |
| | Other amine | Monoethanolamine | | | | | |

TABLE 4-continued

| Material | | | Example 16 | Example 17 | Example 18 | Example 19 | Example 20 |
|---|---|---|---|---|---|---|---|
| Halogens | Amine hydrohalide | Diphenylguanidine/HBr | | | | | |
| | Organic halogen compound | 2,3-Dibromobutane-1,4-diol | | | | | |
| Antioxidant | | Hindered phenolic antioxidant | | | | | |
| Thixotropic agents | Amide compound | Polyamide | 1 | 3 | 3 | 3 | 3 |
| | | Bisamide | 1 | | | | |
| | | Monoamide | 1 | | | | |
| | Ester compound | Hydrogenated castor oil | 3 | | | | |
| Solvents | Water | Water | | | | | |
| | Other solvents | Tetraethylene glycol dimethyl ether | | 33 | 33 | 43 | 43 |
| | | Hexyl diglycol | 40 | | | | |
| Total | | | 100 | 100 | 100 | 100 | 100 |
| Rosin total amount/acrylic resin total amount (mass ratio) | | | 1 | 0.11 | 9 | 1 | 1 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 5

| Material | | | Example 21 | Example 22 | Example 23 | Example 24 | Example 25 |
|---|---|---|---|---|---|---|---|
| Organic acids | Specific organic acid | 1,2,3-Propanetricarboxylic acid | 3 | 3 | 3 | 3 | 3 |
| | Other organic acids | Sebacic acid | | | | | |
| | | Adipic acid | | | | | |
| | | Eicosanedioic acid | | | | | |
| | | Hydrogenated dimer acid | | | | | |
| Resins | Rosin | Hydrogenated rosin | 25 | 25 | 25 | 25 | 25 |
| | | Acrylic acid-modified hydrogenated rosin | | | | | |
| | | Polymerized rosin | | | | | |
| | | Disproportionated rosin | | | | | |
| | Acrylic resin | Acrylic resin A | | 10 | | | |
| | | Acrylic resin B | | 5 | 15 | | |
| | | Acrylic resin C | | 5 | 5 | 15 | |
| | | Acrylic resin D | 25 | 5 | | | 15 |
| | Other resin | Polyethylene resin | | | 10 | 10 | 10 |
| Amines | Azoles | 2-Phenylimidazole | 1 | 1 | 1 | 1 | 1 |
| | | 2-Phenyl-4-methylimidazole | | | | | |
| | | 2-Heptadecylimidazole | | | | | |
| | | Benzimidazole | | | | | |
| | | 2-Octylbenzimidazole | | | | | |
| | Other amine | Monoethanolamine | | | | | |
| Halogens | Amine hydrohalide | Diphenylguanidine/HBr | | | | | |
| | Organic halogen compound | 2,3-Dibromobutane-1,4-diol | | | | | |
| Antioxidant | | Hindered phenolic antioxidant | | | | | |
| Thixotropic agents | Amide compound | Polyamide | 3 | 3 | 3 | 3 | 3 |
| | | Bisamide | | | | | |
| | | Monoamide | | | | | |
| | Ester compound | Hydrogenated castor oil | | | | | |
| Solvents | Water | Water | | | | | |
| | Other solvents | Tetraethylene glycol dimethyl ether | 43 | 43 | 43 | 43 | 43 |
| | | Hexyl diglycol | | | | | |
| Total | | | 100 | 100 | 100 | 100 | 100 |
| Rosin total amount/acrylic resin total amount (mass ratio) | | | 1 | 1 | 1.67 | 1.67 | 1.67 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 6

| | Material | | Example 26 | Example 27 | Example 28 | Example 29 | Example 30 |
|---|---|---|---|---|---|---|---|
| Organic acids | Specific organic acid | 1,2,3-Propanetricarboxylic acid | 3 | 3 | 3 | 1 | 1 |
| | Other organic acids | Sebacic acid | | | | 2 | |
| | | Adipic acid | | | | | 2 |
| | | Eicosanedioic acid | | | | | |
| | | Hydrogenated dimer acid | | | | | |
| Resins | Rosin | Hydrogenated rosin | 25 | 25 | 25 | 25 | 25 |
| | | Acrylic acid-modified hydrogenated rosin | | | | | |
| | | Polymerized rosin | | | | | |
| | | Disproportionated rosin | | | | | |
| | Acrylic resin | Acrylic resin A | 5 | 25 | 25 | 25 | 25 |
| | | Acrylic resin B | 5 | | | | |
| | | Acrylic resin C | 5 | | | | |
| | | Acrylic resin D | 5 | | | | |
| | Other resin | Polyethylene resin | 5 | | | | |
| Amines | Azoles | 2-Phenylimidazole | 1 | 1 | 1 | 1 | 1 |
| | | 2-Phenyl-4-methylimidazole | | | | | |
| | | 2-Heptadecylimidazole | | | | | |
| | | Benzimidazole | | | | | |
| | | 2-Octylbenzimidazole | | | | | |
| | Other amine | Monoethanolamine | | | | | |
| Halogens | Amine hydrohalide | Diphenylguanidine/HBr | | | | | |
| | Organic halogen compound | 2,3-Dibromobutane-1,4-diol | | | | | |
| Antioxidant | | Hindered phenolic antioxidant | | | | | |
| Thixotropic agents | Amide compound | Polyamide | 3 | | | 3 | 3 |
| | | Bisamide | | | | | |
| | | Monoamide | | 6 | 8.5 | | |
| | Ester compound | Hydrogenated castor oil | | | | | |
| Solvents | Water | Water | | | | | |
| | Other solvents | Tetraethylene glycol dimethyl ether | 43 | 40 | 37.5 | 43 | 43 |
| | | Hexyl diglycol | | | | | |
| | Total | | 100 | 100 | 100 | 100 | 100 |
| Rosin total amount/acrylic resin total amount (mass ratio) | | | 1.25 | 1 | 1 | 1 | 1 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 7

| | Material | | Example 31 | Example 32 | Example 33 | Example 34 | Example 35 |
|---|---|---|---|---|---|---|---|
| Organic acids | Specific organic acid | 1,2,3-Propanetricarboxylic acid | 1 | 1 | 1 | 3 | 3 |
| | Other organic acids | Sebacic acid | | 0.5 | | 0.5 | 0.5 |
| | | Adipic acid | | 0.5 | | 0.5 | 0.5 |
| | | Eicosanedioic acid | 2 | 0.5 | | 0.5 | 0.5 |
| | | Hydrogenated dimer acid | | 0.5 | 10 | 0.5 | 0.5 |
| Resins | Rosin | Hydrogenated rosin | 25 | 25 | 25 | 10 | 10 |
| | | Acrylic acid-modified hydrogenated rosin | | | | 5 | 5 |
| | | Polymerized rosin | | | | 5 | 5 |
| | | Disproportionated rosin | | | | 5 | 5 |
| | Acrylic resin | Acrylic resin A | 25 | 25 | 25 | 5 | 4 |
| | | Acrylic resin B | | | | 5 | 4 |
| | | Acrylic resin C | | | | 5 | 4 |
| | | Acrylic resin D | | | | 5 | 4 |
| | Other resin | Polyethylene resin | | | | | 4 |
| Amines | Azoles | 2-Phenylimidazole | 1 | 1 | 1 | 1 | 1 |
| | | 2-Phenyl-4-methylimidazole | | | | | 1 |

TABLE 7-continued

| Material | | | Example 31 | Example 32 | Example 33 | Example 34 | Example 35 |
|---|---|---|---|---|---|---|---|
| | | 2-Heptadecylimidazole | | | | | 1 |
| | | Benzimidazole | | | | | 1 |
| | | 2-Octylbenzimidazole | | | | | 1 |
| | Other amine | Monoethanolamine | | | | | 1 |
| Halogens | Amine hydrohalide | Diphenylguanidine/HBr | | | | 2 | 1 |
| | Organic halogen compound | 2,3-Dibromobutane-1,4-diol | | | | 1 | 1 |
| Antioxidant | | Hindered phenolic antioxidant | | | | 2 | 2 |
| Thixotropic agents | Amide compound | Polyamide | 3 | 3 | 3 | 1 | 1 |
| | | Bisamide | | | | 1 | 1 |
| | | Monoamide | | | | 1 | 1 |
| | Ester compound | Hydrogenated castor oil | | | | 1 | 1 |
| Solvents | Water | Water | | | | | |
| | Other solvents | Tetraethylene glycol dimethyl ether | 43 | 43 | 35 | 20 | 18 |
| | | Hexyl diglycol | | | | 20 | 18 |
| Total | | | 100 | 100 | 100 | 100 | 100 |
| Rosin total amount/acrylic resin total amount (mass ratio) | | | 1 | 1 | 1 | 1.25 | 1.56 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 8

| Material | | | Example 36 | Example 37 | Example 38 | Example 39 | Example 40 |
|---|---|---|---|---|---|---|---|
| Organic acids | Specific organic acid | 1,2,3-Propanetricarboxylic acid | 3 | 3 | 0.5 | 3 | 3 |
| | Other organic acids | Sebacic acid | | | | | |
| | | Adipic acid | | 5 | | | |
| | | Eicosanedioic acid | | | 5 | | |
| | | Hydrogenated dimer acid | | | | 5 | |
| Resins | Rosin | Hydrogenated rosin | 25 | 25 | 25 | 25 | 25 |
| | | Acrylic acid-modified hydrogenated rosin | | | | | |
| | | Polymerized rosin | | | | | |
| | | Disproportionated rosin | | | | | |
| | Acrylic resin | Acrylic resin A | 25 | 25 | 20 | 25 | 25 |
| | | Acrylic resin B | | | | | |
| | | Acrylic resin C | | | | | |
| | | Acrylic resin D | | | | | |
| | Other resin | Polyethylene resin | | | | | |
| Amines | Azoles | 2-Phenylimidazole | 2 | 10 | 0.1 | | |
| | | 2-Phenyl-4-methylimidazole | | | | 2 | |
| | | 2-Heptadecylimidazole | | | | | 2 |
| | | Benzimidazole | | | | | |
| | | 2-Octylbenzimidazole | | | | | |
| | Other amine | Monoethanolamine | | | | | |
| Halogens | Amine hydrohalide | Diphenylguanidine/HBr | | | 1 | | |
| | Organic halogen compound | 2,3-Dibromobutane-1,4-diol | | | | | |
| Antioxidant | | Hindered phenolic antioxidant | | | | | |
| Thixotropic agents | Amide compound | Polyamide | 3 | 3 | 3 | 3 | 3 |
| | | Bisamide | | | | | |
| | | Monoamide | | | | | |
| | Ester compound | Hydrogenated castor oil | | | | | |

TABLE 8-continued

| | Material | | Example 36 | Example 37 | Example 38 | Example 39 | Example 40 |
|---|---|---|---|---|---|---|---|
| Solvents | Water | Water | 42 | 24 | 45.4 | 42 | 42 |
| | Other solvents | Tetraethylene glycol dimethyl ether | | | | | |
| | | Hexyl diglycol | | | | | |
| | Total | | 100 | 100 | 100 | 100 | 100 |
| Rosin total amount/acrylic resin total amount (mass ratio) | | | 1 | 1 | 1.25 | 1 | 1 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 9

| | Material | | Example 41 | Example 42 | Example 43 | Example 44 | Example 45 |
|---|---|---|---|---|---|---|---|
| Organic acids | Specific organic acid | 1,2,3-Propanetricarboxylic acid | 3 | 3 | 3 | 3 | 3 |
| | Other organic acids | Sebacic acid | | | | | |
| | | Adipic acid | | | | | |
| | | Eicosanedioic acid | | | | | |
| | | Hydrogenated dimer acid | | | | | |
| Resins | Rosin | Hydrogenated rosin | 25 | 25 | 25 | 25 | 25 |
| | | Acrylic acid-modified hydrogenated rosin | | | | | |
| | | Polymerized rosin | | | | | |
| | | Disproportionated rosin | | | | | |
| | Acrylic resin | Acrylic resin A | 25 | 25 | 25 | 25 | 25 |
| | | Acrylic resin B | | | | | |
| | | Acrylic resin C | | | | | |
| | | Acrylic resin D | | | | | |
| | Other resin | Polyethylene resin | | | | | |
| Amines | Azoles | 2-Phenylimidazole | | | | 0.5 | 5 | 
| | | 2-Phenyl-4-methylimidazole | | | | 0.5 | | |
| | | 2-Heptadecylimidazole | | | | 0.5 | | |
| | | Benzimidazole | 2 | | | 0.5 | | |
| | | 2-Octylbenzimidazole | | | 2 | 0.5 | | |
| | Other amine | Monoethanolamine | | | | 0.5 | | |
| Halogens | Amine hydrohalide | Diphenylguanidine/HBr | | | | | |
| | Organic halogen compound | 2,3-Dibromobutane-1,4-diol | | | | | |
| | Antioxidant | Hindered phenolic antioxidant | | | | | |
| Thixotropic agents | Amide compound | Polyamide | 3 | 3 | 3 | 3 | 3 |
| | | Bisamide | | | | | |
| | | Monoamide | | | | | |
| | Ester compound | Hydrogenated castor oil | | | | | |
| Solvents | Water | Water | | | | | |
| | Other solvents | Tetraethylene glycol dimethyl ether | 42 | 42 | 41 | 39 | 41 |
| | | Hexyl diglycol | | | | | |
| | Total | | 100 | 100 | 100 | 100 | 100 |
| Rosin total amount/acrylic resin total amount (mass ratio) | | | 1 | 1 | 1 | 1 | 1 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 10

| | Material | | Example 46 | Example 47 | Example 48 | Example 49 | Example 50 |
|---|---|---|---|---|---|---|---|
| Organic acids | Specific organic acid | 1,2,3-Propanetricarboxylic acid | 3 | 3 | 3 | 1 | 1 |

TABLE 10-continued

| Material | | | Example 46 | Example 47 | Example 48 | Example 49 | Example 50 |
|---|---|---|---|---|---|---|---|
| | Other organic acids | Sebacic acid | | | | | 0.5 |
| | | Adipic acid | | | | | 0.5 |
| | | Eicosanedioic acid | | | | | 0.5 |
| | | Hydrogenated dimer acid | | 2 | 7 | 9 | 0.5 |
| Resins | Rosin | Hydrogenated rosin | 25 | 25 | 25 | 25 | 10 |
| | | Acrylic acid-modified hydrogenated rosin | | | | | 5 |
| | | Polymerized rosin | | | | | 5 |
| | | Disproportionated rosin | | | | | 5 |
| | Acrylic resin | Acrylic resin A | 25 | 25 | 25 | 25 | 5 |
| | | Acrylic resin B | | | | | 5 |
| | | Acrylic resin C | | | | | 5 |
| | | Acrylic resin D | | | | | 5 |
| | Other resin | Polyethylene resin | | | | | |
| Amines | Azoles | 2-Phenylimidazole | 1 | 1 | 1 | 0.1 | 1 |
| | | 2-Phenyl-4-methylimidazole | | | | | 0.5 |
| | | 2-Heptadecylimidazole | | | | | 0.5 |
| | | Benzimidazole | | | | | 0.5 |
| | | 2-Octylbenzimidazole | | | | | 0.5 |
| | Other amine | Monoethanolamine | | | | | |
| Halogens | Amine hydrohalide | Diphenylguanidine/HBr | | | | 1 | 2 |
| | Organic halogen compound | 2,3-Dibromobutane-1,4-diol | | | | | |
| Antioxidant | | Hindered phenolic antioxidant | | | | | |
| Thixotropic agents | Amide compound | Polyamide | 3 | 3 | 3 | 3 | 1 |
| | | Bisamide | | | | | 1 |
| | | Monoamide | | | | | 1 |
| | Ester compound | Hydrogenated castor oil | | | | | |
| Solvents | Water | Water | | | | | |
| | Other solvents | Tetraethylene glycol dimethyl ether | 43 | 41 | 36 | 35.9 | 44 |
| | | Hexyl diglycol | | | | | |
| Total | | | 100 | 100 | 100 | 100 | 100 |
| Rosin total amount/acrylic resin total amount (mass ratio) | | | 1 | 1 | 1 | 1 | 1.25 |
| Solder wettability (wetting speed) | | | ○ | ○ | ○ | ○ | ○ |
| Temperature cycle reliability | | | ○ | ○ | ○ | ○ | ○ |
| Scattering suppression | | | ○ | ○ | ○ | ○ | ○ |
| Comprehensive evaluation | | | ○ | ○ | ○ | ○ | ○ |

TABLE 11

| Material | | | Example 51 | Example 52 | Example 53 | Example 54 |
|---|---|---|---|---|---|---|
| Organic acids | Specific organic acid | 1,2,3-Propanetricarboxylic acid | 1 | 1 | 1 | 3 |
| | Other organic acids | Sebacic acid | 0.5 | 0.5 | 0.5 | |
| | | Adipic acid | 0.5 | 0.5 | 0.5 | |
| | | Eicosanedioic acid | 0.5 | 0.5 | 0.5 | |
| | | Hydrogenated dimer acid | 0.5 | 0.5 | 0.5 | |
| Resins | Rosin | Hydrogenated rosin | 10 | 10 | 10 | 21 |
| | | Acrylic acid-modified hydrogenated rosin | 5 | 5 | 5 | |
| | | Polymerized rosin | 5 | 5 | 5 | |
| | | Disproportionated rosin | 5 | 5 | 5 | |
| | Acrylic resin | Acrylic resin A | 4 | 5 | 4 | 21 |
| | | Acrylic resin B | 4 | 5 | 4 | |
| | | Acrylic resin C | 4 | 5 | 4 | |
| | | Acrylic resin D | 4 | 5 | 4 | |
| | Other resin | Polyethylene resin | 4 | | 4 | |
| Amines | Azoles | 2-Phenylimidazole | 1 | 0.5 | 0.5 | |
| | | 2-Phenyl-4-methylimidazole | 0.5 | 0.5 | 0.5 | |
| | | 2-Heptadecylimidazole | 0.5 | 0.5 | 0.5 | |
| | | Benzimidazole | 0.5 | 0.5 | 0.5 | |
| | | 2-Octylbenzimidazole | 0.5 | 0.5 | 0.5 | |
| | Other amine | Monoethanolamine | | 0.5 | 0.5 | |
| Halogens | Amine hydrohalide | Diphenylguanidine/HBr | | | | 1 |

TABLE 11-continued

| | Material | | Example 51 | Example 52 | Example 53 | Example 54 |
|---|---|---|---|---|---|---|
| | Organic halogen compound | 2,3-Dibromobutane-1,4-diol | 5 | | | |
| | Antioxidant | Hindered phenolic antioxidant | | | 3 | |
| Thixotropic agents | Amide compound | Polyamide | 1 | 1 | 1 | 3 |
| | | Bisamide | 1 | 1 | 1 | |
| | | Monoamide | 1 | 1 | 1 | |
| | Ester compound | Hydrogenated castor oil | 1 | | | |
| Solvents | Water | Water | | | | |
| | Other solvents | Tetraethylene glycol dimethyl ether | 40 | 43 | | 51 |
| | | Hexyl diglycol | | | 46 | |
| | Total | | 100 | 100 | 100 | 100 |
| Rosin total amount/acrylic resin total amount (mass ratio) | | | 1.56 | 1.25 | 1.56 | 1 |
| Solder wettability (wetting speed) | | | ○ | ○ | ○ | ○ |
| Temperature cycle reliability | | | ○ | ○ | ○ | ○ |
| Scattering suppression | | | ○ | ○ | ○ | ○ |
| Comprehensive evaluation | | | ○ | ○ | ○ | ○ |

TABLE 12

| | Material | | Comparative Example 1 | Comparative Example 2 | Comparative Example 3 | Comparative Example 4 |
|---|---|---|---|---|---|---|
| Organic acids | Specific organic acid | 1,2,3-Propanetricarboxylic acid | | | 3 | 3 |
| | Other organic acids | Sebacic acid | | | | |
| | | Adipic acid | | | | |
| | | Eicosanedioic acid | 5 | | | |
| | | Hydrogenated dimer acid | | 10 | | |
| Resins | Rosin | Hydrogenated rosin | 42 | 25 | 42 | 25 |
| | | Acrylic acid-modified hydrogenated rosin | | | | |
| | | Polymerized rosin | | | | |
| | | Disproportionated rosin | | | | |
| | Acrylic resin | Acrylic resin A | | 25 | | 25 |
| | | Acrylic resin B | | | | |
| | | Acrylic resin C | | | | |
| | | Acrylic resin D | | | | |
| | Other resin | Polyethylene resin | | | | |
| Amines | Azoles | 2-Phenylimidazole | | | | |
| | | 2-Phenyl-4-methylimidazole | | | | |
| | | 2-Heptadecylimidazole | | | | |
| | | Benzimidazole | | | | |
| | | 2-Octylbenzimidazole | | | | |
| | Other amine | Monoethanolamine | | | | |
| Halogens | Amine hydrohalide | Diphenylguanidine/HBr | | | 1 | |
| | Organic halogen compound | 2,3-Dibromobutane-1,4-diol | | | | |
| | Antioxidant | Hindered phenolic antioxidant | | | | |
| Thixotropic agents | Amide compound | Polyamide | 3 | 3 | 3 | 3 |
| | | Bisamide | | | | |
| | | Monoamide | | | | |
| | Ester compound | Hydrogenated castor oil | | | | |
| Solvents | Water | Water | | | | 10 |
| | Other solvents | Tetraethylene glycol dimethyl ether | 50 | 37 | 51 | 34 |
| | | Hexyl diglycol | | | | |
| | Total | | 100 | 100 | 100 | 100 |
| Rosin total amount/acrylic resin total amount (mass ratio) | | | — | 1 | — | 1 |
| Solder wettability (wetting speed) | | | X | X | ○ | ○ |
| Temperature cycle reliability | | | X | ○ | X | ○ |
| Scattering suppression | | | ○ | ○ | ○ | X |
| Comprehensive evaluation | | | X | X | X | X |

In the present invention, as shown in Example 1, when the flux contained 1,2,3-propanetricarboxylic acid as an organic acid, a hydrogenated rosin as a rosin, the acrylic resin A as an acrylic resin, 2-phenylimidazole as an azole, a polyamide as an amide compound, and tetraethylene glycol dimethyl ether as a solvent, the content of the 1,2,3-propanetricarboxylic acid was within the range specified in the present invention, and the flux did not contain water, it was possible to make the flux have sufficient solder wettability, temperature cycle reliability, and scattering suppression effect.

As described in Examples 2 to 4, when 1,2,3-propanetricarboxylic acid was contained within the range specified in the present invention, and a halogen compound was contained, it was possible to make the fluxes have sufficient solder wettability, temperature cycle reliability, and scattering suppression effect.

As described in Examples 5 to 8, even when the content of 1,2,3-propanetricarboxylic acid was changed within the range specified in the present invention, it was possible to make the fluxes have sufficient solder wettability, temperature cycle reliability, and scattering suppression effect.

As described in Example 9, when 1,2,3-propanetricarboxylic acid was contained within the range specified in the present invention, and an amine other than the azole (other amine) was contained, it was possible to make the flux have sufficient solder wettability, temperature cycle reliability, and scattering suppression effect.

As described in Examples 10 and 11, even when 1,2,3-propanetricarboxylic acid was contained within the range specified in the present invention, and the content of the halogen compound was changed, it was possible to make the fluxes have sufficient solder wettability, temperature cycle reliability, and scattering suppression effect.

As described in Examples 12 and 13, even when 1,2,3-propanetricarboxylic acid was contained within the range specified in the present invention, and the kind of the amide compound was changed, it was possible to make the fluxes have sufficient solder wettability, temperature cycle reliability, and scattering suppression effect.

As described in Example 14, when 1,2,3-propanetricarboxylic acid was contained within the range specified in the present invention, and a halogen compound, an antioxidant, and a plurality of kinds of amide compounds were contained, it was possible to make the flux have sufficient solder wettability, temperature cycle reliability, and scattering suppression effect.

As described in Example 15, when 1,2,3-propanetricarboxylic acid was contained within the range specified in the present invention, and a halogen compound, an antioxidant, a plurality of kinds of amide compounds, and an ester compound were contained, it was possible to make the flux have sufficient solder wettability, temperature cycle reliability, and scattering suppression effect.

As described in Example 16, even when 1,2,3-propanetricarboxylic acid was contained within the range specified in the present invention, and the kind of the solvent was changed, it was possible to make the flux have sufficient solder wettability, temperature cycle reliability, and scattering suppression effect.

As described in Example 17, when 1,2,3-propanetricarboxylic acid was contained within the range specified in the present invention, an organic acid other than 1,2,3-propanetricarboxylic acid (other organic acid) was contained, and the content of the acrylic resin was increased by decreasing the content of the rosin, it was possible to make the flux have sufficient solder wettability, temperature cycle reliability, and scattering suppression effect.

As described in Example 18, even when 1,2,3-propanetricarboxylic acid was contained within the range specified in the present invention, the kind of the other organic acid was changed, and the content of the acrylic resin was decreased by increasing the content of the rosin, it was possible to make the flux have sufficient solder wettability, temperature cycle reliability, and scattering suppression effect.

As described in Examples 19 to 21, even when 1,2,3-propanetricarboxylic acid was contained within the range specified in the present invention, and the kind of the acrylic resin was changed, it was possible to make the fluxes have sufficient solder wettability, temperature cycle reliability, and scattering suppression effect.

As described in Example 22, when 1,2,3-propanetricarboxylic acid was contained within the range specified in the present invention, and a plurality of kinds of acrylic resins were contained, it was possible to make the flux have sufficient solder wettability, temperature cycle reliability, and scattering suppression effect.

As described in Examples 23 to 25, when 1,2,3-propanetricarboxylic acid was contained within the range specified in the present invention, and a polyethylene resin other than the rosin and the acrylic resin (other resin) was contained, it was possible to make the fluxes have sufficient solder wettability, temperature cycle reliability, and scattering suppression effect.

As described in Example 26, when 1,2,3-propanetricarboxylic acid was contained within the range specified in the present invention, a plurality of kinds of acrylic resins were contained, and another resin was contained, it was possible to make the flux have sufficient solder wettability, temperature cycle reliability, and scattering suppression effect.

As described in Examples 27 and 28, even when 1,2,3-propanetricarboxylic acid was contained within the range specified in the present invention, the kind of the amide compound was changed, and the content of the amide compound was increased, it was possible to make the fluxes have sufficient solder wettability, temperature cycle reliability, and scattering suppression effect.

As described in Examples 29 to 31, even when 1,2,3-propanetricarboxylic acid was contained within the range specified in the present invention, and the kind of the other organic acid was changed, it was possible to make the fluxes have sufficient solder wettability, temperature cycle reliability, and scattering suppression effect.

As described in Example 32, when 1,2,3-propanetricarboxylic acid was contained within the range specified in the present invention, and a plurality of kinds of other organic acids were contained, it was possible to make the flux have sufficient solder wettability, temperature cycle reliability, and scattering suppression effect.

As described in Example 33, even when 1,2,3-propanetricarboxylic acid was contained within the range specified in the present invention, and the content of the other organic acid was increased, it was possible to make the flux have sufficient solder wettability, temperature cycle reliability, and scattering suppression effect.

As described in Example 34, when 1,2,3-propanetricarboxylic acid was contained within the range specified in the present invention, a plurality of kinds of other organic acids, a plurality of kinds of rosins, a plurality of kinds of acrylic resins, a halogen compound, an antioxidant, a plurality of kinds of amide compounds, an ester compound, and a plurality of kinds of solvents were contained, it was possible to make the flux have sufficient solder wettability, temperature cycle reliability, and scattering suppression effect.

As described in Example 35, when 1,2,3-propanetricarboxylic acid was contained within the range specified in the present invention, a plurality of kinds of other organic acids, a plurality of kinds of rosins, a plurality of kinds of acrylic resins, another resin, a plurality of kinds of azoles, another amine, a halogen compound, an antioxidant, a plurality of kinds of amide compounds, an ester compound, and a plurality of kinds of solvents were contained, it was possible to make the flux have sufficient solder wettability, temperature cycle reliability, and scattering suppression effect.

As described in Example 36, even when 1,2,3-propanetricarboxylic acid was contained within the range specified in the present invention, and the content of the azole was increased, it was possible to make the flux have sufficient solder wettability, temperature cycle reliability, and scattering suppression effect.

As described in Example 37, even when 1,2,3-propanetricarboxylic acid was contained within the range specified in the present invention, and the contents of the other organic acid and the azole were increased, it was possible to make the flux have sufficient solder wettability, temperature cycle reliability, and scattering suppression effect.

As described in Example 38, even when 1,2,3-propanetricarboxylic acid was contained within the range specified in the present invention, the content of the other organic acid was increased, the content of the azole was decreased, and a halogen compound was contained, it was possible to make the flux have sufficient solder wettability, temperature cycle reliability, and scattering suppression effect.

As described in Examples 39 to 42, even when 1,2,3-propanetricarboxylic acid was contained within the range specified in the present invention, and the kind of the azole was changed, it was possible to make the fluxes have sufficient solder wettability, temperature cycle reliability, and scattering suppression effect.

As described in Example 43, when 1,2,3-propanetricarboxylic acid was contained within the range specified in the present invention, a plurality of kinds of azoles were contained, and an amine other than the azoles (other amine) was contained, it was possible to make the flux have sufficient solder wettability, temperature cycle reliability, and scattering suppression effect.

As described in Examples 44 to 46, even when 1,2,3-propanetricarboxylic acid was contained within the range specified in the present invention, and the content of the azole was decreased, it was possible to make the fluxes have sufficient solder wettability, temperature cycle reliability, and scattering suppression effect.

As described in Examples 47 and 48, even when 1,2,3-propanetricarboxylic acid was contained within the range specified in the present invention, the content of the azole was decreased, and the content of the other organic acid was increased, it was possible to make the flux have sufficient solder wettability, temperature cycle reliability, and scattering suppression effect.

As described in Example 49, even when 1,2,3-propanetricarboxylic acid was contained within the range specified in the present invention, the content of the azole was decreased, the content of the other organic acid was increased, and a halogen compound was contained, it was possible to make the flux have sufficient solder wettability, temperature cycle reliability, and scattering suppression effect.

As described in Example 50, when 1,2,3-propanetricarboxylic acid was contained within the range specified in the present invention, the content of other organic acids was increased, a plurality of kinds of rosins were contained, a plurality of kinds of acrylic resins were contained, a plurality of kinds of azoles were contained, a halogen compound was contained, and a plurality of kinds of amide compounds were contained, it was possible to make the flux have sufficient solder wettability, temperature cycle reliability, and scattering suppression effect.

As described in Example 51, when 1,2,3-propanetricarboxylic acid was contained within the range specified in the present invention, a plurality of kinds of other organic acids were contained, a plurality of kinds of rosins were contained, a plurality of kinds of acrylic resins were contained, another resin was contained, a plurality of kinds of azoles were contained, a halogen compound was contained, a plurality of kinds of amide compounds were contained, and an ester compound was contained, it was possible to make the flux have sufficient solder wettability, temperature cycle reliability, and scattering suppression effect.

As described in Example 52, when 1,2,3-propanetricarboxylic acid was contained within the range specified in the present invention, a plurality of kinds of other organic acids were contained, a plurality of kinds of rosins were contained, a plurality of kinds of acrylic resins were contained, a plurality of kinds of azoles were contained, an antioxidant was contained, and a plurality of kinds of amide compounds were contained, it was possible to make the flux have sufficient solder wettability, temperature cycle reliability, and scattering suppression effect.

As described in Example 53, when 1,2,3-propanetricarboxylic acid was contained within the range specified in the present invention, a plurality of kinds of other organic acids were contained, a plurality of kinds of rosins were contained, a plurality of kinds of acrylic resins were contained, another resin was contained, a plurality of kinds of azoles were contained, and a plurality of kinds of amide compounds were contained, it was possible to make the flux have sufficient solder wettability, temperature cycle reliability, and scattering suppression effect.

As described in Example 54, when 1,2,3-propanetricarboxylic acid was contained within the range specified in the present invention, a rosin was contained, an acrylic resin was contained, and an amide compound was contained, it was possible to make the flux have sufficient solder wettability, temperature cycle reliability, and scattering suppression effect.

Examples 1 to 54 contained 1,2,3-propanetricarboxylic acid within the range specified in the present invention and had sufficient solder wettability.

In contrast, Comparative Examples 1 and 2 did not contain 1,2,3-propanetricarboxylic acid and had insufficient solder wettability.

From these results, it was clarified that, when 1,2,3-propanetricarboxylic acid is contained within the range specified in the present invention, it is possible to make fluxes have sufficient solder wettability.

Examples 1 to 54 contained an acrylic resin and had sufficient temperature cycle reliability.

In contrast, Comparative Examples 1 and 3 did not contain an acrylic resin and had insufficient temperature cycle reliability.

From these results, it was clarified that, when an acrylic resin is contained, it is possible to make fluxes have sufficient temperature cycle reliability.

In addition, in Examples 1 to 16 and 18 to 54, the ratio (mass ratio) of the content of the rosin to the content of the acrylic resin was 1 or more and 9 or less, and it was possible to make the fluxes have more sufficient temperature cycle reliability.

Examples 1 to 54 did not contain water and had a sufficient scattering suppression effect.

In contrast, Comparative Example 4 contained water and has an insufficient scattering suppression effect.

From these results, it was clarified that, when water was not contained, it is possible to make fluxes have a sufficient scattering suppression effect.

<Evaluation of Copper Plate Corrosion Suppression Capability>

(1) Verification Method

The copper plate corrosion suppression capability was evaluated by the following copper plate corrosion test based on JIS Z 3197: 2012 8.4.1.

Preparation of test copper plate: A 3 mm-deep indent was made with a steel ball having a diameter of 20 mm at the center of a phosphorous-deoxidized copper plate having dimensions of 50 mm×50 mm×0.5 mm to produce a test piece. The test piece was degreased with acetone and then immersed in sulfuric acid at 65° C. for 1 minute to remove an oxide film or the like on the surface. Next, the test piece was immersed in an ammonium persulfate solution at 20° C. for 1 minute, then, washed with purified water, and dried to produce a test copper plate.

The solid contents of the fluxes of Examples 44 to 53 and Comparative Examples 1 to 4 were measured by a method specified in JIS Z 3197: 2012 8.1.3, and the fluxes containing an appropriate amount (0.035 to 0.040 g) of the solid content were added to the indents at the centers of the test copper plates.

Next, the test copper plates were injected into a constant temperature and constant humidity bath set to humidification conditions of a temperature of 40° C. and a relative humidity of 90% and left to stand in the bath for 72 hours. For each flux of each example, two test copper plates were prepared, and one blank was added.

After being left to stand in the bath for 96 hours, the test copper plates were taken out from the constant temperature and constant humidity bath, and corrosion traces were compared with the blanks with a microscope at a magnification of 30 times. The copper plate corrosion suppression capability was evaluated based on determination standards shown below. The evaluation results are shown in Table 13.

(2) Determination Standards

O: There is no discoloration

X: There is discoloration

TABLE 13

| | Organic acid total amount/ azoles total amount (mass ratio) | Corrosion suppression effect |
|---|---|---|
| Example 44 | 0.6 | ○ |
| Example 45 | 1 | ○ |
| Example 46 | 3 | ○ |
| Example 47 | 5 | ○ |
| Example 48 | 10 | ○ |
| Example 49 | 100 | ○ |
| Example 50 | 1 | ○ |
| Example 51 | 1 | ○ |
| Example 52 | 1.2 | ○ |
| Example 53 | 1.2 | ○ |
| Comparative Example 1 | — | x |
| Comparative Example 2 | — | x |
| Comparative Example 3 | — | x |
| Comparative Example 4 | — | x |

As shown in Examples 44 to 53, the ratios (mass ratios) of the total content of the organic acid to the content of the azoles were 0.6 or more and 100 or less, and it was possible to make the fluxes have a sufficient corrosion suppression effect.

As shown in Comparative Examples 1 to 4, the ratios (mass ratios) of the total content of the organic acid to the content of the azoles were not 0.6 or more and 100 or less, and the corrosion suppression effects were not sufficient.

From these results, it was clarified that, when the ratio (mass ratios) of the total content of the organic acid to the content of the azoles is set to 0.6 or more and 100 or less, it is possible to make fluxes have a sufficient corrosion suppression effect.

<Evaluation of Thickening Suppression Effect of Solder Paste>

The thickening suppression effects of solder pastes formulated using the above-described flux of each example and a solder alloy having a composition shown in Table 14 below were also verified.

(1) Verification Method

For the obtained solder pastes, the viscosities were continuously measured for 12 hours according to a method specified in "4.2 Viscosity Characteristic Test" of JIS Z 3284-3: 2014 using a spiral viscometer (PCU-205, manufactured by Malcolm Company Limited) at a rotation speed of 10 rpm and a measurement temperature of 25° C. In addition, the initial viscosities (the viscosities after 30 minutes of stirring) and the viscosities after 12 hours were compared, and the thickening suppression effects were evaluated based on the following standards.

(2) Determination Standards

O: Viscosity after 12 hours≤Initial viscosity×1.2 An increase in the viscosity over time is small and favorable.

X: Viscosity after 12 hours>Initial viscosity×1.2 An increase in the viscosity over time is large and poor.

TABLE 14

| | Alloy composition (Ag, Cu: % by mass, As, Sb, Bi, Pb: mass ppm) | | | | | | | Mathematical formula (1) | Mathematical formula (2) | Thickening suppression effect of solder paste |
|---|---|---|---|---|---|---|---|---|---|---|
| | Sn | Ag | Cu | As | Sb | Bi | Pb | | | |
| Test Example A1 | Bal | 0 | 0 | 100 | 25 | 25 | 25 | 275 | 4.50 | ○ |
| Test Example A2 | Bal | 0 | 0 | 100 | 3000 | 300 | 300 | 3800 | 5.33 | ○ |
| Test Example B1 | Bal | 0 | 0 | 0 | 100 | 100 | 100 | 300 | 0.50 | X |
| Test Example B2 | Bal | 0 | 0 | 25 | 25 | 25 | 25 | 125 | 1.50 | X |
| Test Example A3 | Bal | 0 | 0.7 | 100 | 25 | 25 | 25 | 275 | 4.50 | ○ |
| Test Example A4 | Bal | 0 | 0.7 | 100 | 3000 | 300 | 300 | 3800 | 5.33 | ○ |
| Test Example B3 | Bal | 0 | 0.7 | 0 | 100 | 100 | 100 | 300 | 0.50 | X |
| Test Example B4 | Bal | 0 | 0.7 | 25 | 25 | 25 | 25 | 125 | 1.50 | X |
| Test Example A5 | Bal | 3 | 0.5 | 100 | 25 | 25 | 25 | 275 | 4.50 | ○ |

TABLE 14-continued

| | Alloy composition (Ag, Cu: % by mass, As, Sb, Bi, Pb: mass ppm) | | | | | | | Mathematical | Mathematical | Thickening suppression |
| --- | --- | --- | --- | --- | --- | --- | --- | --- | --- | --- |
| | Sn | Ag | Cu | As | Sb | Bi | Pb | formula (1) | formula (2) | effect of solder paste |
| Test Example A6 | Bal | 3 | 0.5 | 100 | 3000 | 300 | 300 | 3800 | 5.33 | ○ |
| Test Example B5 | Bal | 3 | 0.5 | 0 | 100 | 100 | 100 | 300 | 0.50 | X |
| Test Example B6 | Bal | 3 | 0.5 | 25 | 25 | 25 | 25 | 125 | 1.50 | X |

In the solder pastes for which the flux of each example shown in Table 1 to Table 12 and the solder alloy of each of Test Examples A1 to A6 shown in Table 14, which satisfied the following mathematical formula (1) and mathematical formula (2), sufficient effects were obtained in terms of not only solder wettability and scattering suppression but also the thickening suppression effect.

$$275 \leq 2As+Sb+Bi+Pb \quad (1)$$

$$0.01 \leq (2As+Sb)/(Bi+Pb) \leq 10.00 \quad (2)$$

In the formula (1) and the formula (2), As, Sb, Bi, and Pb each represent a content (mass ppm) in the alloy composition.

In contrast, in the solder pastes for which the flux of each example shown in Table 1 to Table 12 and the solder alloy of each of Test Examples B1 to B6 shown in Table 14, which did not satisfy the mathematical formula (1) and the mathematical formula (2), effects were obtained in terms of the wettability and scattering suppression of the solder pastes, but effects were not obtained in terms of the thickening suppression effect.

Furthermore, in the solder pastes for which the flux of each example shown in Table 1 to Table 12 and the solder alloy of each of Test Examples A1 to A6 that contained at least one of As: 25 to 300 mass ppm, Pb: more than 0 mass ppm and 5100 mass ppm or less, Sb: more than 0 mass ppm and 3000 mass ppm or less and Bi: more than 0% mass ppm and 10000 mass ppm or less, at least one of Ag: 0% by mass or more and 4% by mass or less and Cu: 0% by mass or more and 0.9% by mass or less, and a balance (Bal) of Sn and satisfied the mathematical formula (1) and the mathematical formula (2), solder wettability attributed to the 1,2,3-propanetricarboxylic acid contained, the temperature cycle reliability attributed to the acrylic resin contained, and the scattering suppression effect attributed to water not contained were not impaired, and sufficient effects were obtained in terms of the thickening suppression effect.

In addition, for the solder pastes for which the flux of each example shown in Table 1 to Table 12 and the solder alloy of each test example shown in Table 15 to Table 20 or each test example shown in Table 21 to Table 44 were used, the above-described <evaluation of thickening suppression effect (change over time) of solder paste> and the following <evaluation of solder wettability (wetting speed)> were performed. In addition, the liquidus temperatures and solidus temperatures of the solder powders were measured, and the following <evaluation of ΔT> was performed.

<Evaluation of ΔT>
(1) Verification Method

For the solder powders to be mixed with the flux, DSC measurement was performed using Model No.: EXSTAR DSC7020 manufactured by Seiko Instruments Inc. with a sample amount of approximately 30 mg at a temperature rising rate of 15° C./min, and the solidus temperatures and the liquidus temperatures were obtained. The solidus temperature was subtracted from the obtained liquidus temperature to obtain ΔT.

(2) Determination Standards
  O: ΔT is 10° C. or less.
  X: ΔT exceeds 10° C.

<Evaluation of Wettability>
(1) Verification Method

Each solder paste immediately after production was printed on a Cu plate, heated from 25° C. to 260° C. at a temperature rising rate of 1° C./s in a N₂ atmosphere in a reflow furnace, and then cooled to room temperature. The appearance of solder bumps after cooling was observed with an optical microscope, thereby evaluating wettability.

(2) Determination Standards
  O: A case where the solder powder that is not fully melted is not observed.
  X: A case where the solder powder that is not fully melted is observed.

<Comprehensive Evaluation>
  O: In Tables 15 to 44, the change over time, ΔT, and the wettability are all O in each evaluation.
  X: In Tables 15 to 44, at least one of the change over time, ΔT, and wettability is X in each evaluation.

TABLE 15

| | Alloy composition (mass ppm) | | | | | Formula | Formula | Evaluation items | | | |
| --- | --- | --- | --- | --- | --- | --- | --- | --- | --- | --- | --- |
| | | | | | | | | Change | | Wetta- | Comprehensive |
| | Sn | As | Sb | Bi | Pb | (1) | (2) | over time | ΔT | bility | evaluation |
| Test Example C1 | Bal | 100 | 25 | 25 | 25 | 275 | 4.50 | ○ | ○ | ○ | ○ |
| Test Example C2 | Bal | 100 | 50 | 25 | 0 | 275 | 10.00 | ○ | ○ | ○ | ○ |
| Test Example C3 | Bal | 100 | 0 | 75 | 0 | 275 | 2.67 | ○ | ○ | ○ | ○ |
| Test Example C4 | Bal | 100 | 0 | 0 | 75 | 275 | 2.67 | ○ | ○ | ○ | ○ |
| Test Example C5 | Bal | 100 | 50 | 50 | 50 | 350 | 2.50 | ○ | ○ | ○ | ○ |
| Test Example C6 | Bal | 50 | 100 | 100 | 50 | 350 | 1.33 | ○ | ○ | ○ | ○ |
| Test Example C7 | Bal | 300 | 0 | 300 | 300 | 1200 | 1.00 | ○ | ○ | ○ | ○ |
| Test Example C8 | Bal | 200 | 300 | 250 | 250 | 1200 | 1.40 | ○ | ○ | ○ | ○ |
| Test Example C9 | Bal | 100 | 500 | 250 | 250 | 1200 | 1.40 | ○ | ○ | ○ | ○ |
| Test Example C10 | Bal | 200 | 50 | 600 | 850 | 1900 | 0.31 | ○ | ○ | ○ | ○ |
| Test Example C11 | Bal | 200 | 500 | 500 | 500 | 1900 | 0.90 | ○ | ○ | ○ | ○ |
| Test Example C12 | Bal | 200 | 500 | 1000 | 0 | 1900 | 0.90 | ○ | ○ | ○ | ○ |

TABLE 15-continued

| | Alloy composition (mass ppm) | | | | | Formula (1) | Formula (2) | Evaluation items | | | |
|---|---|---|---|---|---|---|---|---|---|---|---|
| | Sn | As | Sb | Bi | Pb | | | Change over time | ΔT | Wetta-bility | Comprehensive evaluation |
| Test Example C13 | Bal | 200 | 500 | 0 | 1000 | 1900 | 0.90 | ○ | ○ | ○ | ○ |
| Test Example C14 | Bal | 25 | 500 | 350 | 1000 | 1900 | 0.41 | ○ | ○ | ○ | ○ |
| Test Example C15 | Bal | 100 | 3000 | 300 | 300 | 3800 | 5.33 | ○ | ○ | ○ | ○ |
| Test Example C16 | Bal | 100 | 0 | 0 | 5100 | 5300 | 0.04 | ○ | ○ | ○ | ○ |
| Test Example C17 | Bal | 100 | 0 | 10000 | 0 | 10200 | 0.02 | ○ | ○ | ○ | ○ |
| Test Example C18 | Bal | 100 | 0 | 10000 | 5000 | 15200 | 0.01 | ○ | ○ | ○ | ○ |
| Test Example C201 | Bal | 0 | 100 | 100 | 100 | 300 | 0.50 | X | ○ | ○ | X |
| Test Example C202 | Bal | 25 | 25 | 25 | 25 | 125 | 1.50 | X | ○ | ○ | X |
| Test Example C203 | Bal | 300 | 500 | 50 | 50 | 1200 | 11.00 | ○ | ○ | X | X |
| Test Example C204 | Bal | 350 | 1150 | 25 | 25 | 1900 | 37.00 | ○ | ○ | X | X |
| Test Example C205 | Bal | 800 | 800 | 100 | 100 | 2600 | 12.00 | ○ | ○ | X | X |
| Test Example C206 | Bal | 250 | 4800 | 1 | 0 | 5301 | 5300.00 | ○ | ○ | X | X |
| Test Example C207 | Bal | 800 | 3500 | 100 | 100 | 5300 | 25.50 | ○ | ○ | X | X |
| Test Example C208 | Bal | 100 | 10000 | 1 | 0 | 10201 | 10200.00 | ○ | ○ | X | X |
| Test Example C209 | Bal | 100 | 100 | 25000 | 25000 | 50300 | 0.01 | ○ | X | ○ | X |
| Test Example C210 | Bal | 100 | 100 | 50000 | 0 | 50300 | 0.01 | ○ | X | ○ | X |
| Test Example C211 | Bal | 100 | 100 | 0 | 50000 | 50300 | 0.01 | ○ | X | ○ | X |
| Test Example C212 | Bal | 300 | 3000 | 0 | 0 | 3600 | — | ○ | ○ | X | X |
| Test Example C213 | Bal | 100 | 0 | 100 | 25000 | 25300 | 0.01 | ○ | X | ○ | X |

Underlines indicate that the corresponding values are outside the scope of the present invention.

TABLE 16

| | Alloy composition (As, Bi, Pb: mass ppm, Cu: % by mass) | | | | | | Formula (1) | Formula (2) | Evaluation items | | | |
|---|---|---|---|---|---|---|---|---|---|---|---|---|
| | Sn | Cu | As | Sb | Bi | Pb | | | Change over time | ΔT | Wetta-bility | Comprehensive evaluation |
| Test Example C19 | Bal | 0.7 | 100 | 25 | 25 | 25 | 275 | 4.50 | ○ | ○ | ○ | ○ |
| Test Example C20 | Bal | 0.7 | 100 | 50 | 25 | 0 | 275 | 10.00 | ○ | ○ | ○ | ○ |
| Test Example C21 | Bal | 0.7 | 100 | 0 | 75 | 0 | 275 | 2.67 | ○ | ○ | ○ | ○ |
| Test Example C22 | Bal | 0.7 | 100 | 0 | 0 | 75 | 275 | 2.67 | ○ | ○ | ○ | ○ |
| Test Example C23 | Bal | 0.7 | 100 | 50 | 50 | 50 | 350 | 2.50 | ○ | ○ | ○ | ○ |
| Test Example C24 | Bal | 0.7 | 50 | 100 | 100 | 50 | 350 | 1.33 | ○ | ○ | ○ | ○ |
| Test Example C25 | Bal | 0.7 | 300 | 0 | 300 | 300 | 1200 | 1.00 | ○ | ○ | ○ | ○ |
| Test Example C26 | Bal | 0.7 | 200 | 300 | 250 | 250 | 1200 | 1.40 | ○ | ○ | ○ | ○ |
| Test Example C27 | Bal | 0.7 | 100 | 500 | 250 | 250 | 1200 | 1.40 | ○ | ○ | ○ | ○ |
| Test Example C28 | Bal | 0.7 | 200 | 50 | 600 | 850 | 1900 | 0.31 | ○ | ○ | ○ | ○ |
| Test Example C29 | Bal | 0.7 | 200 | 500 | 500 | 500 | 1900 | 0.90 | ○ | ○ | ○ | ○ |
| Test Example C30 | Bal | 0.7 | 200 | 500 | 1000 | 0 | 1900 | 0.90 | ○ | ○ | ○ | ○ |
| Test Example C31 | Bal | 0.7 | 200 | 500 | 0 | 1000 | 1900 | 0.90 | ○ | ○ | ○ | ○ |
| Test Example C32 | Bal | 0.7 | 25 | 500 | 350 | 1000 | 1900 | 0.41 | ○ | ○ | ○ | ○ |
| Test Example C33 | Bal | 0.7 | 100 | 3000 | 300 | 300 | 3800 | 5.33 | ○ | ○ | ○ | ○ |
| Test Example C34 | Bal | 0.7 | 100 | 0 | 0 | 5100 | 5300 | 0.04 | ○ | ○ | ○ | ○ |
| Test Example C35 | Bal | 0.7 | 100 | 0 | 10000 | 0 | 10200 | 0.02 | ○ | ○ | ○ | ○ |
| Test Example C36 | Bal | 0.7 | 100 | 0 | 10000 | 5000 | 15200 | 0.01 | ○ | ○ | ○ | ○ |
| Test Example C214 | Bal | 0.7 | 0 | 100 | 100 | 100 | 300 | 0.50 | X | ○ | ○ | X |
| Test Example C215 | Bal | 0.7 | 25 | 25 | 25 | 25 | 125 | 1.50 | X | ○ | ○ | X |
| Test Example C216 | Bal | 0.7 | 300 | 500 | 50 | 50 | 1200 | 11.00 | ○ | ○ | X | X |
| Test Example C217 | Bal | 0.7 | 350 | 1150 | 25 | 25 | 1900 | 37.00 | ○ | ○ | X | X |
| Test Example C218 | Bal | 0.7 | 800 | 800 | 100 | 100 | 2600 | 12.00 | ○ | ○ | X | X |
| Test Example C219 | Bal | 0.7 | 250 | 4800 | 1 | 0 | 5301 | 5300.00 | ○ | ○ | X | X |
| Test Example C220 | Bal | 0.7 | 800 | 3500 | 100 | 100 | 5300 | 25.50 | ○ | ○ | X | X |
| Test Example C221 | Bal | 0.7 | 100 | 10000 | 1 | 0 | 10201 | 10200.00 | ○ | ○ | X | X |
| Test Example C222 | Bal | 0.7 | 100 | 100 | 25000 | 25000 | 50300 | 0.01 | ○ | X | ○ | X |
| Test Example C223 | Bal | 0.7 | 100 | 100 | 50000 | 0 | 50300 | 0.01 | ○ | X | ○ | X |
| Test Example C224 | Bal | 0.7 | 100 | 100 | 0 | 50000 | 50300 | 0.01 | ○ | X | ○ | X |
| Test Example C225 | Bal | 0.7 | 300 | 3000 | 0 | 0 | 3600 | — | ○ | ○ | X | X |
| Test Example C226 | Bal | 0.7 | 100 | 0 | 100 | 25000 | 25300 | 0.01 | ○ | X | ○ | X |

Underlines indicate that the corresponding values are outside the scope of the present invention.

TABLE 17

| | Alloy composition (As, Sb, Bi, Pb: mass ppm, Ag, Cu: % by mass) | | | | | | | Formula (1) | Formula (2) | Evaluation items | | | |
|---|---|---|---|---|---|---|---|---|---|---|---|---|---|
| | Sn | Ag | Cu | As | Sb | Bi | Pb | | | Change over time | ΔT | Wetta-bility | Comprehensive evaluation |
| Test Example C37 | Bal | 1 | 0.5 | 100 | 25 | 25 | 25 | 275 | 4.50 | ○ | ○ | ○ | ○ |
| Test Example C38 | Bal | 1 | 0.5 | 100 | 50 | 25 | 0 | 275 | 10.00 | ○ | ○ | ○ | ○ |
| Test Example C39 | Bal | 1 | 0.5 | 100 | 0 | 75 | 0 | 275 | 2.67 | ○ | ○ | ○ | ○ |
| Test Example C40 | Bal | 1 | 0.5 | 100 | 0 | 0 | 75 | 275 | 2.67 | ○ | ○ | ○ | ○ |
| Test Example C41 | Bal | 1 | 0.5 | 100 | 50 | 50 | 50 | 350 | 2.50 | ○ | ○ | ○ | ○ |
| Test Example C42 | Bal | 1 | 0.5 | 50 | 100 | 100 | 50 | 350 | 1.33 | ○ | ○ | ○ | ○ |
| Test Example C43 | Bal | 1 | 0.5 | 300 | 0 | 300 | 300 | 1200 | 1.00 | ○ | ○ | ○ | ○ |
| Test Example C44 | Bal | 1 | 0.5 | 200 | 300 | 250 | 250 | 1200 | 1.40 | ○ | ○ | ○ | ○ |
| Test Example C45 | Bal | 1 | 0.5 | 100 | 500 | 250 | 250 | 1200 | 1.40 | ○ | ○ | ○ | ○ |
| Test Example C46 | Bal | 1 | 0.5 | 200 | 50 | 600 | 850 | 1900 | 0.31 | ○ | ○ | ○ | ○ |
| Test Example C47 | Bal | 1 | 0.5 | 200 | 500 | 500 | 500 | 1900 | 0.90 | ○ | ○ | ○ | ○ |
| Test Example C48 | Bal | 1 | 0.5 | 200 | 500 | 1000 | 0 | 1900 | 0.90 | ○ | ○ | ○ | ○ |
| Test Example C49 | Bal | 1 | 0.5 | 200 | 500 | 0 | 1000 | 1900 | 0.90 | ○ | ○ | ○ | ○ |
| Test Example C50 | Bal | 1 | 0.5 | 25 | 500 | 350 | 1000 | 1900 | 0.41 | ○ | ○ | ○ | ○ |
| Test Example C51 | Bal | 1 | 0.5 | 100 | 3000 | 300 | 300 | 3800 | 5.33 | ○ | ○ | ○ | ○ |
| Test Example C52 | Bal | 1 | 0.5 | 100 | 0 | 0 | 5100 | 5300 | 0.04 | ○ | ○ | ○ | ○ |
| Test Example C53 | Bal | 1 | 0.5 | 100 | 0 | 10000 | 0 | 10200 | 0.02 | ○ | ○ | ○ | ○ |
| Test Example C54 | Bal | 1 | 0.5 | 100 | 0 | 10000 | 5000 | 15200 | 0.01 | ○ | ○ | ○ | ○ |
| Test Example C227 | Bal | 1 | 0.5 | 0 | 100 | 100 | 100 | 300 | 0.50 | X | ○ | ○ | X |
| Test Example C228 | Bal | 1 | 0.5 | 25 | 25 | 25 | 25 | 125 | 1.50 | X | ○ | ○ | X |
| Test Example C229 | Bal | 1 | 0.5 | 300 | 500 | 50 | 50 | 1200 | 11.00 | ○ | ○ | X | X |
| Test Example C230 | Bal | 1 | 0.5 | 350 | 1150 | 25 | 25 | 1900 | 37.00 | ○ | ○ | X | X |
| Test Example C231 | Bal | 1 | 0.5 | 800 | 800 | 100 | 100 | 2600 | 12.00 | ○ | ○ | X | X |
| Test Example C232 | Bal | 1 | 0.5 | 250 | 4800 | 1 | 0 | 5301 | 5300.00 | ○ | ○ | X | X |
| Test Example C233 | Bal | 1 | 0.5 | 800 | 3500 | 100 | 100 | 5300 | 25.50 | ○ | ○ | X | X |
| Test Example C234 | Bal | 1 | 0.5 | 100 | 10000 | 1 | 0 | 10201 | 10200.00 | ○ | ○ | X | X |
| Test Example C235 | Bal | 1 | 0.5 | 100 | 100 | 25000 | 25000 | 50300 | 0.01 | ○ | X | ○ | X |
| Test Example C236 | Bal | 1 | 0.5 | 100 | 100 | 50000 | 0 | 50300 | 0.01 | ○ | X | ○ | X |
| Test Example C237 | Bal | 1 | 0.5 | 100 | 100 | 0 | 50000 | 50300 | 0.01 | ○ | X | ○ | X |
| Test Example C238 | Bal | 1 | 0.5 | 300 | 3000 | 0 | 0 | 3600 | — | ○ | ○ | X | X |
| Test Example C239 | Bal | 1 | 0.5 | 100 | 0 | 100 | 25000 | 25300 | 0.01 | ○ | X | ○ | X |

Underlines indicate that the corresponding values are outside the scope of the present invention.

TABLE 18

| | Alloy composition (As, Sb, Bi, Pb: mass ppm, Ag, Cu: % by mass) | | | | | | | Formula (1) | Formula (2) | Evaluation items | | | |
|---|---|---|---|---|---|---|---|---|---|---|---|---|---|
| | Sn | Ag | Cu | As | Sb | Bi | Pb | | | Change over time | ΔT | Wetta-bility | Comprehensive evaluation |
| Test Example C55 | Bal | 2 | 0.5 | 100 | 25 | 25 | 25 | 275 | 4.50 | ○ | ○ | ○ | ○ |
| Test Example C56 | Bal | 2 | 0.5 | 100 | 50 | 25 | 0 | 275 | 10.00 | ○ | ○ | ○ | ○ |
| Test Example C57 | Bal | 2 | 0.5 | 100 | 0 | 75 | 0 | 275 | 2.67 | ○ | ○ | ○ | ○ |
| Test Example C58 | Bal | 2 | 0.5 | 100 | 0 | 0 | 75 | 275 | 2.67 | ○ | ○ | ○ | ○ |
| Test Example C59 | Bal | 2 | 0.5 | 100 | 50 | 50 | 50 | 350 | 2.50 | ○ | ○ | ○ | ○ |
| Test Example C60 | Bal | 2 | 0.5 | 50 | 100 | 100 | 50 | 350 | 1.33 | ○ | ○ | ○ | ○ |
| Test Example C61 | Bal | 2 | 0.5 | 300 | 0 | 300 | 300 | 1200 | 1.00 | ○ | ○ | ○ | ○ |
| Test Example C62 | Bal | 2 | 0.5 | 200 | 300 | 250 | 250 | 1200 | 1.40 | ○ | ○ | ○ | ○ |
| Test Example C63 | Bal | 2 | 0.5 | 100 | 500 | 250 | 250 | 1200 | 1.40 | ○ | ○ | ○ | ○ |
| Test Example C64 | Bal | 2 | 0.5 | 200 | 50 | 600 | 850 | 1900 | 0.31 | ○ | ○ | ○ | ○ |
| Test Example C65 | Bal | 2 | 0.5 | 200 | 500 | 500 | 500 | 1900 | 0.90 | ○ | ○ | ○ | ○ |
| Test Example C66 | Bal | 2 | 0.5 | 200 | 500 | 1000 | 0 | 1900 | 0.90 | ○ | ○ | ○ | ○ |
| Test Example C67 | Bal | 2 | 0.5 | 200 | 500 | 0 | 1000 | 1900 | 0.90 | ○ | ○ | ○ | ○ |
| Test Example C68 | Bal | 2 | 0.5 | 25 | 500 | 350 | 1000 | 1900 | 0.41 | ○ | ○ | ○ | ○ |
| Test Example C69 | Bal | 2 | 0.5 | 100 | 3000 | 300 | 300 | 3800 | 5.33 | ○ | ○ | ○ | ○ |
| Test Example C70 | Bal | 2 | 0.5 | 100 | 0 | 0 | 5100 | 5300 | 0.04 | ○ | ○ | ○ | ○ |
| Test Example C71 | Bal | 2 | 0.5 | 100 | 0 | 10000 | 0 | 10200 | 0.02 | ○ | ○ | ○ | ○ |
| Test Example C72 | Bal | 2 | 0.5 | 100 | 0 | 10000 | 5000 | 15200 | 0.01 | ○ | ○ | ○ | ○ |
| Test Example C240 | Bal | 2 | 0.5 | 0 | 100 | 100 | 100 | 300 | 0.50 | X | ○ | ○ | X |
| Test Example C241 | Bal | 2 | 0.5 | 25 | 25 | 25 | 25 | 125 | 1.50 | X | ○ | ○ | X |
| Test Example C242 | Bal | 2 | 0.5 | 300 | 500 | 50 | 50 | 1200 | 11.00 | ○ | ○ | X | X |
| Test Example C243 | Bal | 2 | 0.5 | 350 | 1150 | 25 | 25 | 1900 | 37.00 | ○ | ○ | X | X |
| Test Example C244 | Bal | 2 | 0.5 | 800 | 800 | 100 | 100 | 2600 | 12.00 | ○ | ○ | X | X |
| Test Example C245 | Bal | 2 | 0.5 | 250 | 4800 | 1 | 0 | 5301 | 5300.00 | ○ | ○ | X | X |
| Test Example C246 | Bal | 2 | 0.5 | 800 | 3500 | 100 | 100 | 5300 | 25.50 | ○ | ○ | X | X |
| Test Example C247 | Bal | 2 | 0.5 | 100 | 10000 | 1 | 0 | 10201 | 10200.00 | ○ | ○ | X | X |
| Test Example C248 | Bal | 2 | 0.5 | 100 | 100 | 25000 | 25000 | 50300 | 0.01 | ○ | X | ○ | X |
| Test Example C249 | Bal | 2 | 0.5 | 100 | 100 | 50000 | 0 | 50300 | 0.01 | ○ | X | ○ | X |
| Test Example C250 | Bal | 2 | 0.5 | 100 | 100 | 0 | 50000 | 50300 | 0.01 | ○ | X | ○ | X |

TABLE 18-continued

| | Alloy composition (As, Sb, Bi, Pb: mass ppm, Ag, Cu: % by mass) | | | | | | | Formula (1) | Formula (2) | Evaluation items | | | |
|---|---|---|---|---|---|---|---|---|---|---|---|---|---|
| | Sn | Ag | Cu | As | Sb | Bi | Pb | | | Change over time | ΔT | Wetta-bility | Comprehensive evaluation |
| Test Example C251 | Bal | 2 | 0.5 | 300 | 3000 | 0 | 0 | 3600 | — | ○ | ○ | X | X |
| Test Example C252 | Bal | 2 | 0.5 | 100 | 0 | 100 | 25000 | 25300 | 0.01 | ○ | X | ○ | X |

Underlines indicate that the corresponding values are outside the scope of the present invention.

TABLE 19

| | Alloy composition (As, Sb, Bi, Pb: mass ppm, Ag, Cu: % by mass) | | | | | | | Formula (1) | Formula (2) | Evaluation items | | | |
|---|---|---|---|---|---|---|---|---|---|---|---|---|---|
| | Sn | Ag | Cu | As | Sb | Bi | Pb | | | Change over time | ΔT | Wetta-bility | Comprehensive evaluation |
| Test Example C73 | Bal | 3 | 0.5 | 100 | 25 | 25 | 25 | 275 | 4.50 | ○ | ○ | ○ | ○ |
| Test Example C74 | Bal | 3 | 0.5 | 100 | 50 | 25 | 0 | 275 | 10.00 | ○ | ○ | ○ | ○ |
| Test Example C75 | Bal | 3 | 0.5 | 100 | 0 | 75 | 0 | 275 | 2.67 | ○ | ○ | ○ | ○ |
| Test Example C76 | Bal | 3 | 0.5 | 100 | 0 | 0 | 75 | 275 | 2.67 | ○ | ○ | ○ | ○ |
| Test Example C77 | Bal | 3 | 0.5 | 100 | 50 | 50 | 50 | 350 | 2.50 | ○ | ○ | ○ | ○ |
| Test Example C78 | Bal | 3 | 0.5 | 50 | 100 | 100 | 50 | 350 | 1.33 | ○ | ○ | ○ | ○ |
| Test Example C79 | Bal | 3 | 0.5 | 300 | 0 | 300 | 300 | 1200 | 1.00 | ○ | ○ | ○ | ○ |
| Test Example C80 | Bal | 3 | 0.5 | 200 | 300 | 250 | 250 | 1200 | 1.40 | ○ | ○ | ○ | ○ |
| Test Example C81 | Bal | 3 | 0.5 | 100 | 500 | 250 | 250 | 1200 | 1.40 | ○ | ○ | ○ | ○ |
| Test Example C82 | Bal | 3 | 0.5 | 200 | 50 | 600 | 850 | 1900 | 0.31 | ○ | ○ | ○ | ○ |
| Test Example C83 | Bal | 3 | 0.5 | 200 | 500 | 500 | 500 | 1900 | 0.90 | ○ | ○ | ○ | ○ |
| Test Example C84 | Bal | 3 | 0.5 | 200 | 500 | 1000 | 0 | 1900 | 0.90 | ○ | ○ | ○ | ○ |
| Test Example C85 | Bal | 3 | 0.5 | 200 | 500 | 0 | 1000 | 1900 | 0.90 | ○ | ○ | ○ | ○ |
| Test Example C86 | Bal | 3 | 0.5 | 25 | 500 | 350 | 1000 | 1900 | 0.41 | ○ | ○ | ○ | ○ |
| Test Example C87 | Bal | 3 | 0.5 | 100 | 3000 | 300 | 300 | 3800 | 5.33 | ○ | ○ | ○ | ○ |
| Test Example C88 | Bal | 3 | 0.5 | 100 | 0 | 0 | 5100 | 5300 | 0.04 | ○ | ○ | ○ | ○ |
| Test Example C89 | Bal | 3 | 0.5 | 100 | 0 | 10000 | 0 | 10200 | 0.02 | ○ | ○ | ○ | ○ |
| Test Example C90 | Bal | 3 | 0.5 | 100 | 0 | 10000 | 5000 | 15200 | 0.01 | ○ | ○ | ○ | ○ |
| Test Example C253 | Bal | 3 | 0.5 | 0 | 100 | 100 | 100 | 300 | 0.50 | X | ○ | ○ | X |
| Test Example C254 | Bal | 3 | 0.5 | 25 | 25 | 25 | 25 | 125 | 1.50 | X | ○ | ○ | X |
| Test Example C255 | Bal | 3 | 0.5 | 300 | 500 | 50 | 50 | 1200 | 11.00 | ○ | ○ | X | X |
| Test Example C256 | Bal | 3 | 0.5 | 350 | 1150 | 25 | 25 | 1900 | 37.00 | ○ | ○ | X | X |
| Test Example C257 | Bal | 3 | 0.5 | 800 | 800 | 100 | 100 | 2600 | 12.00 | ○ | ○ | X | X |
| Test Example C258 | Bal | 3 | 0.5 | 250 | 4800 | 1 | 0 | 5301 | 5300.00 | ○ | ○ | X | X |
| Test Example C259 | Bal | 3 | 0.5 | 800 | 3500 | 100 | 100 | 5300 | 25.50 | ○ | ○ | X | X |
| Test Example C260 | Bal | 3 | 0.5 | 100 | 10000 | 1 | 0 | 10201 | 10200.00 | ○ | ○ | X | X |
| Test Example C261 | Bal | 3 | 0.5 | 100 | 100 | 25000 | 25000 | 50300 | 0.01 | ○ | X | ○ | X |
| Test Example C262 | Bal | 3 | 0.5 | 100 | 100 | 50000 | 0 | 50300 | 0.01 | ○ | X | ○ | X |
| Test Example C263 | Bal | 3 | 0.5 | 100 | 100 | 0 | 50000 | 50300 | 0.01 | ○ | X | ○ | X |
| Test Example C264 | Bal | 3 | 0.5 | 300 | 3000 | 0 | 0 | 3600 | — | ○ | ○ | X | X |
| Test Example C265 | Bal | 3 | 0.5 | 100 | 0 | 100 | 25000 | 25300 | 0.01 | ○ | X | ○ | X |

Underlines indicate that the corresponding values are outside the scope of the present invention.

TABLE 20

| | Alloy composition (As, Sb, Bi, Pb: mass ppm, Ag, Cu: % by mass) | | | | | | | Formula (1) | Formula (2) | Evaluation items | | | |
|---|---|---|---|---|---|---|---|---|---|---|---|---|---|
| | Sn | Ag | Cu | As | Sb | Bi | Pb | | | Change over time | ΔT | Wetta-bility | Comprehensive evaluation |
| Test Example C91 | Bal | 3.5 | 0.5 | 100 | 25 | 25 | 25 | 275 | 4.50 | ○ | ○ | ○ | ○ |
| Test Example C92 | Bal | 3.5 | 0.5 | 100 | 50 | 25 | 0 | 275 | 10.00 | ○ | ○ | ○ | ○ |
| Test Example C93 | Bal | 3.5 | 0.5 | 100 | 0 | 75 | 0 | 275 | 2.67 | ○ | ○ | ○ | ○ |
| Test Example C94 | Bal | 3.5 | 0.5 | 100 | 0 | 0 | 75 | 275 | 2.67 | ○ | ○ | ○ | ○ |
| Test Example C95 | Bal | 3.5 | 0.5 | 100 | 50 | 50 | 50 | 350 | 2.50 | ○ | ○ | ○ | ○ |
| Test Example C96 | Bal | 3.5 | 0.5 | 50 | 100 | 100 | 50 | 350 | 1.33 | ○ | ○ | ○ | ○ |
| Test Example C97 | Bal | 3.5 | 0.5 | 300 | 0 | 300 | 300 | 1200 | 1.00 | ○ | ○ | ○ | ○ |
| Test Example C98 | Bal | 3.5 | 0.5 | 200 | 300 | 250 | 250 | 1200 | 1.40 | ○ | ○ | ○ | ○ |
| Test Example C99 | Bal | 3.5 | 0.5 | 100 | 500 | 250 | 250 | 1200 | 1.40 | ○ | ○ | ○ | ○ |
| Test Example C100 | Bal | 3.5 | 0.5 | 200 | 50 | 600 | 850 | 1900 | 0.31 | ○ | ○ | ○ | ○ |
| Test Example C101 | Bal | 3.5 | 0.5 | 200 | 500 | 500 | 500 | 1900 | 0.90 | ○ | ○ | ○ | ○ |
| Test Example C102 | Bal | 3.5 | 0.5 | 200 | 500 | 1000 | 0 | 1900 | 0.90 | ○ | ○ | ○ | ○ |

TABLE 20-continued

| | Alloy composition (As, Sb, Bi, Pb: mass ppm, Ag, Cu: % by mass) | | | | | | | Formula (1) | Formula (2) | Evaluation items | | | |
|---|---|---|---|---|---|---|---|---|---|---|---|---|---|
| | Sn | Ag | Cu | As | Sb | Bi | Pb | | | Change over time | ΔT | Wetta-bility | Comprehensive evaluation |
| Test Example C103 | Bal | 3.5 | 0.5 | 200 | 500 | 0 | 1000 | 1900 | 0.90 | ○ | ○ | ○ | ○ |
| Test Example C104 | Bal | 3.5 | 0.5 | 25 | 500 | 350 | 1000 | 1900 | 0.41 | ○ | ○ | ○ | ○ |
| Test Example C105 | Bal | 3.5 | 0.5 | 100 | 3000 | 300 | 300 | 3800 | 5.33 | ○ | ○ | ○ | ○ |
| Test Example C106 | Bal | 3.5 | 0.5 | 100 | 0 | 0 | 5100 | 5300 | 0.04 | ○ | ○ | ○ | ○ |
| Test Example C107 | Bal | 3.5 | 0.5 | 100 | 0 | 10000 | 0 | 10200 | 0.02 | ○ | ○ | ○ | ○ |
| Test Example C108 | Bal | 3.5 | 0.5 | 100 | 0 | 10000 | 5000 | 15200 | 0.01 | ○ | ○ | ○ | ○ |
| Test Example C266 | Bal | 3.5 | 0.5 | 0 | 100 | 100 | 100 | 300 | 0.50 | X | ○ | ○ | X |
| Test Example C267 | Bal | 3.5 | 0.5 | 25 | 25 | 25 | 25 | 125 | 1.50 | X | ○ | ○ | X |
| Test Example C268 | Bal | 3.5 | 0.5 | 300 | 500 | 50 | 50 | 1200 | 11.00 | ○ | ○ | X | X |
| Test Example C269 | Bal | 3.5 | 0.5 | 350 | 1150 | 25 | 25 | 1900 | 37.00 | ○ | ○ | X | X |
| Test Example C270 | Bal | 3.5 | 0.5 | 800 | 800 | 100 | 100 | 2600 | 12.00 | ○ | ○ | X | X |
| Test Example C271 | Bal | 3.5 | 0.5 | 250 | 4800 | 1 | 0 | 5301 | 5300.00 | ○ | ○ | X | X |
| Test Example C272 | Bal | 3.5 | 0.5 | 800 | 3500 | 100 | 100 | 5300 | 25.50 | ○ | ○ | X | X |
| Test Example C273 | Bal | 3.5 | 0.5 | 100 | 10000 | 1 | 0 | 10201 | 10200.00 | ○ | ○ | X | X |
| Test Example C274 | Bal | 3.5 | 0.5 | 100 | 100 | 25000 | 25000 | 50300 | 0.01 | ○ | X | ○ | X |
| Test Example C275 | Bal | 3.5 | 0.5 | 100 | 100 | 50000 | 0 | 50300 | 0.01 | ○ | X | ○ | X |
| Test Example C276 | Bal | 3.5 | 0.5 | 100 | 100 | 0 | 50000 | 50300 | 0.01 | ○ | X | ○ | X |
| Test Example C277 | Bal | 3.5 | 0.5 | 300 | 3000 | 0 | 0 | 3600 | — | ○ | ○ | X | X |
| Test Example C278 | Bal | 3.5 | 0.5 | 100 | 0 | 100 | 25000 | 25300 | 0.01 | ○ | X | ○ | X |

Underlines indicate that the corresponding values are outside the scope of the present invention.

TABLE 21

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D1 | Bal. | | | 18 | 82 | 82 | 82 | | | | 300 | 82.9 | — | 0 | ○ | ○ | ○ | ○ |
| Test Example D2 | Bal. | | | 18 | 50 | 150 | 150 | | | | 404 | 102.0 | — | 0 | ○ | ○ | ○ | ○ |
| Test Example D3 | Bal. | | | 18 | 150 | 300 | 50 | | | | 554 | 23.1 | — | 0 | ○ | ○ | ○ | ○ |
| Test Example D4 | Bal. | | | 18 | 150 | 50 | 150 | | | | 404 | 102.0 | — | 0 | ○ | ○ | ○ | ○ |
| Test Example D5 | Bal. | | | 18 | 123 | 0 | 123 | | | | 300 | 143.9 | — | 0 | ○ | ○ | ○ | ○ |
| Test Example D6 | Bal. | | | 18 | 0 | 123 | 123 | | | | 300 | 143.9 | — | 0 | ○ | ○ | ○ | ○ |
| Test Example D7 | Bal. | | | 18 | 150 | 300 | 150 | | | | 654 | 45.3 | — | 0 | ○ | ○ | ○ | ○ |
| Test Example D8 | Bal. | | | 18 | 300 | 300 | 300 | | | | 954 | 59.0 | — | 0 | ○ | ○ | ○ | ○ |
| Test Example D9 | Bal. | | | 18 | 300 | 1000 | 1000 | | | | 2354 | 81.1 | — | 0 | ○ | ○ | ○ | ○ |
| Test Example D10 | Bal. | | | 18 | 1000 | 300 | 1000 | | | | 2354 | 81.1 | — | 0 | ○ | ○ | ○ | ○ |
| Test Example D11 | Bal. | | | 18 | 1000 | 1000 | 1000 | | | | 3054 | 52.7 | — | 0 | ○ | ○ | ○ | ○ |
| Test Example D12 | Bal. | | | 10 | 10000 | 5100 | 3000 | | | | 18130 | 20.1 | — | 0 | ○ | ○ | ○ | ○ |
| Test Example D13 | Bal. | | | 10 | 10000 | 5100 | 0 | | | | 15130 | 0.2 | — | 0 | ○ | ○ | ○ | ○ |
| Test Example D14 | Bal. | | | 10 | 10000 | 0 | 1000 | | | | 11030 | 10.3 | — | 0 | ○ | ○ | ○ | ○ |
| Test Example D15 | Bal. | | | 10 | 0 | 5100 | 1000 | | | | 6130 | 20.2 | — | 0 | ○ | ○ | ○ | ○ |
| Test Example D16 | Bal. | | | 10 | 150 | 300 | 150 | | | | 630 | 40.0 | — | 0 | ○ | ○ | ○ | ○ |
| Test Example D17 | Bal. | | | 14 | 86 | 86 | 86 | | | | 300 | 74.4 | — | 0 | ○ | ○ | ○ | ○ |
| Test Example D18 | Bal. | | | 14 | 50 | 150 | 150 | | | | 392 | 96.0 | — | 0 | ○ | ○ | ○ | ○ |

TABLE 21-continued

| | Alloy composition (As, Bi, Pb, Sb: mass ppm, Ag, Cu: % by mass) | | | | | | | | | Formula (3) | Formula (4) | Formula (5) | Formula (6) | Evaluation items | | | |
|---|---|---|---|---|---|---|---|---|---|---|---|---|---|---|---|---|---|
| | | | | | | | | | | | | | | Change over time | ΔT | Wetta-bility | Compre-hensive evaluation |
| | Sn | Ag | Cu | As | Bi | Pb | Sb | Ni | Fe | In | | | | | | | | |
| Test Example D19 | Bal. | | | 14 | 150 | 300 | 50 | | | | 542 | 20.4 | — | 0 | ○ | ○ | ○ | ○ |
| Test Example D20 | Bal. | | | 14 | 150 | 50 | 150 | | | | 392 | 96.0 | — | 0 | ○ | ○ | ○ | ○ |
| Test Example D21 | Bal. | | | 14 | 200 | 0 | 200 | | | | 442 | 121.0 | — | 0 | ○ | ○ | ○ | ○ |
| Test Example D22 | Bal. | | | 14 | 0 | 200 | 200 | | | | 442 | 121.0 | — | 0 | ○ | ○ | ○ | ○ |
| Test Example D23 | Bal. | | | 14 | 150 | 300 | 150 | | | | 642 | 42.7 | — | 0 | ○ | ○ | ○ | ○ |
| Test Example D24 | Bal. | | | 14 | 300 | 300 | 300 | | | | 942 | 57.0 | — | 0 | ○ | ○ | ○ | ○ |
| Test Example D25 | Bal. | | | 14 | 300 | 1000 | 1000 | | | | 2342 | 80.2 | — | 0 | ○ | ○ | ○ | ○ |

TABLE 22

| | Alloy composition (As, Bi, Pb, Sb: mass ppm, Ag, Cu: % by mass) | | | | | | | | | Formula (3) | Formula (4) | Formula (5) | Formula (6) | Evaluation items | | | |
|---|---|---|---|---|---|---|---|---|---|---|---|---|---|---|---|---|---|
| | | | | | | | | | | | | | | Change over time | ΔT | Wetta-bility | Compre-hensive evaluation |
| | Sn | Ag | Cu | As | Bi | Pb | Sb | Ni | Fe | In | | | | | | | | |
| Test Example D26 | Bal. | | | 14 | 1000 | 300 | 1000 | | | | 2342 | 80.2 | — | 0 | ○ | ○ | ○ | ○ |
| Test Example D27 | Bal. | | | 14 | 1000 | 1000 | 1000 | | | | 3042 | 52.1 | — | 0 | ○ | ○ | ○ | ○ |
| Test Example D28 | Bal. | | | 14 | 10000 | 5100 | 3000 | | | | 18142 | 20.1 | — | 0 | ○ | ○ | ○ | ○ |
| Test Example D29 | Bal. | | | 14 | 10000 | 5100 | <u>0</u> | | | | 15142 | 0.3 | — | 0 | ○ | ○ | ○ | ○ |
| Test Example D30 | Bal. | | | 14 | 10000 | 0 | 1000 | | | | 11042 | 10.4 | — | 0 | ○ | ○ | ○ | ○ |
| Test Example D31 | Bal. | | | 14 | 0 | 5100 | 1000 | | | | 6142 | 20.4 | — | 0 | ○ | ○ | ○ | ○ |
| Test Example D32 | Bal. | | | 14 | 150 | 300 | 150 | | | | 642 | 42.7 | — | 0 | ○ | ○ | ○ | ○ |
| Test Example D33 | Bal. | | | 24 | 82 | 82 | 82 | | | | 318 | 93.9 | — | 0 | ○ | ○ | ○ | ○ |
| Test Example D34 | Bal. | | | 24 | 50 | 150 | 150 | | | | 422 | 111.0 | — | 0 | ○ | ○ | ○ | ○ |
| Test Example D35 | Bal. | | | 24 | 150 | 300 | 50 | | | | 572 | 27.1 | — | 0 | ○ | ○ | ○ | ○ |
| Test Example D36 | Bal. | | | 24 | 150 | 50 | 150 | | | | 422 | 111.0 | — | 0 | ○ | ○ | ○ | ○ |
| Test Example D37 | Bal. | | | 24 | 123 | 0 | 123 | | | | 318 | 158.5 | — | 0 | ○ | ○ | ○ | ○ |
| Test Example D38 | Bal. | | | 24 | 0 | 123 | 123 | | | | 318 | 158.5 | — | 0 | ○ | ○ | ○ | ○ |
| Test Example D39 | Bal. | | | 24 | 150 | 300 | 150 | | | | 672 | 49.3 | — | 0 | ○ | ○ | ○ | ○ |
| Test Example D40 | Bal. | | | 24 | 300 | 300 | 300 | | | | 972 | 62.0 | — | 0 | ○ | ○ | ○ | ○ |
| Test Example D41 | Bal. | | | 24 | 300 | 1000 | 1000 | | | | 2372 | 82.5 | — | 0 | ○ | ○ | ○ | ○ |
| Test Example D42 | Bal. | | | 24 | 1000 | 300 | 1000 | | | | 2372 | 82.5 | — | 0 | ○ | ○ | ○ | ○ |
| Test Example D43 | Bal. | | | 24 | 1000 | 1000 | 1000 | | | | 3072 | 53.6 | — | 0 | ○ | ○ | ○ | ○ |
| Test Example D44 | Bal. | | | 24 | 10000 | 5100 | 3000 | | | | 18172 | 20.3 | — | 0 | ○ | ○ | ○ | ○ |
| Test Example D45 | Bal. | | | 24 | 10000 | 5100 | <u>0</u> | | | | 15172 | 0.5 | — | 0 | ○ | ○ | ○ | ○ |
| Test Example D46 | Bal. | | | 24 | 10000 | 0 | 1000 | | | | 11072 | 10.7 | — | 0 | ○ | ○ | ○ | ○ |
| Test Example D47 | Bal. | | | 24 | 0 | 5100 | 1000 | | | | 6172 | 21.0 | — | 0 | ○ | ○ | ○ | ○ |
| Test Example D48 | Bal. | | | 24 | 150 | 300 | 150 | | | | 672 | 49.3 | — | 0 | ○ | ○ | ○ | ○ |

TABLE 22-continued

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D49 | Bal. | | | <u>38</u> | 82 | 82 | 82 | | | | 360 | 119.5 | — | 0 | ○ | ○ | ○ | ○ |
| Test Example D50 | Bal. | | | <u>38</u> | 50 | 150 | 150 | | | | 464 | 132.0 | — | 0 | ○ | ○ | ○ | ○ |

TABLE 23

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D51 | Bal. | | | <u>38</u> | 150 | 300 | 50 | | | | 614 | 36.4 | — | 0 | ○ | ○ | ○ | ○ |
| Test Example D52 | Bal. | | | <u>38</u> | 150 | 50 | 150 | | | | 464 | 132.0 | — | 0 | ○ | ○ | ○ | ○ |
| Test Example D53 | Bal. | | | <u>38</u> | 123 | 0 | 123 | | | | 360 | 192.7 | — | 0 | ○ | ○ | ○ | ○ |
| Test Example D54 | Bal. | | | <u>38</u> | 0 | 123 | 123 | | | | 360 | 192.7 | — | 0 | ○ | ○ | ○ | ○ |
| Test Example D55 | Bal. | | | <u>38</u> | 150 | 300 | 150 | | | | 714 | 58.7 | — | 0 | ○ | ○ | ○ | ○ |
| Test Example D56 | Bal. | | | <u>38</u> | 300 | 300 | 300 | | | | 1014 | 69.0 | — | 0 | ○ | ○ | ○ | ○ |
| Test Example D57 | Bal. | | | <u>38</u> | 300 | 1000 | 1000 | | | | 2414 | 85.7 | — | 0 | ○ | ○ | ○ | ○ |
| Test Example D58 | Bal. | | | <u>38</u> | 1000 | 300 | 1000 | | | | 2414 | 85.7 | — | 0 | ○ | ○ | ○ | ○ |
| Test Example D59 | Bal. | | | <u>38</u> | 1000 | 1000 | 1000 | | | | 3114 | 55.7 | — | 0 | ○ | ○ | ○ | ○ |
| Test Example D60 | Bal. | | | <u>38</u> | 10000 | 5100 | 3000 | | | | 18214 | 20.6 | — | 0 | ○ | ○ | ○ | ○ |
| Test Example D61 | Bal. | | | <u>38</u> | 10000 | 5100 | <u>0</u> | | | | 15214 | 0.8 | — | 0 | ○ | ○ | ○ | ○ |
| Test Example D62 | Bal. | | | <u>38</u> | 10000 | 0 | 1000 | | | | 11114 | 11.1 | — | 0 | ○ | ○ | ○ | ○ |
| Test Example D63 | Bal. | | | <u>38</u> | 0 | 5100 | 1000 | | | | 6214 | 21.8 | — | 0 | ○ | ○ | ○ | ○ |
| Test Example D64 | Bal. | | | <u>38</u> | 150 | 300 | 150 | | | | 714 | 58.7 | — | 0 | ○ | ○ | ○ | ○ |
| Test Example D65 | Bal. | | | 18 | 150 | 300 | 150 | 40 | | | 654 | 45.3 | — | 40 | ○ | ○ | ○ | ○ |
| Test Example D66 | Bal. | | | 18 | 150 | 300 | 150 | 100 | | | 654 | 45.3 | — | 100 | ○ | ○ | ○ | ○ |
| Test Example D67 | Bal. | | | 18 | 150 | 300 | 150 | 500 | | | 654 | 45.3 | — | 500 | ○ | ○ | ○ | ○ |
| Test Example D68 | Bal. | | | 18 | 150 | 300 | 150 | 600 | | | 654 | 45.3 | — | 600 | ○ | ○ | ○ | ○ |
| Test Example D69 | Bal. | | | 18 | 150 | 300 | 150 | | 20 | | 654 | 45.3 | 0 | 20 | ○ | ○ | ○ | ○ |
| Test Example D70 | Bal. | | | 18 | 150 | 300 | 150 | | 100 | | 654 | 45.3 | 0 | 100 | ○ | ○ | ○ | ○ |
| Test Example D71 | Bal. | | | 18 | 150 | 300 | 150 | 40 | 20 | | 654 | 45.3 | 2 | 60 | ○ | ○ | ○ | ○ |
| Test Example D72 | Bal. | | | 18 | 150 | 300 | 150 | 40 | 10 | | 654 | 45.3 | 4 | 50 | ○ | ○ | ○ | ○ |
| Test Example D73 | Bal. | | | 18 | 150 | 300 | 150 | 80 | 10 | | 654 | 45.3 | 8 | 90 | ○ | ○ | ○ | ○ |
| Test Example D74 | Bal. | | | 18 | 150 | 300 | 150 | 500 | 10 | | 654 | 45.3 | 50 | 510 | ○ | ○ | ○ | ○ |
| Test Example D75 | Bal. | | | 18 | 150 | 300 | 150 | 10 | 100 | | 654 | 45.3 | 0.1 | 110 | ○ | ○ | ○ | ○ |

TABLE 24

| | | Alloy composition (As, Bi, Pb, Sb: mass ppm, Ag, Cu: % by mass) | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Comprehensive evaluation |
| Test Example D76 | Bal. | | | 18 | 150 | 300 | 150 | 100 | 100 | | 654 | 45.3 | 1 | 200 | ○ | ○ | ○ | ○ |
| Test Example D77 | Bal. | | | 18 | 150 | 300 | 150 | 600 | 80 | | 654 | 45.3 | 7.5 | 680 | ○ | ○ | ○ | ○ |
| Test Example D78 | Bal. | | | 18 | 150 | 300 | 150 | | | 20 | 654 | 45.3 | — | 0 | ○ | ○ | ○ | ○ |
| Test Example D79 | Bal. | | | 18 | 150 | 300 | 150 | | | 100 | 654 | 45.3 | — | 0 | ○ | ○ | ○ | ○ |
| Test Example D80 | Bal. | | | 18 | 150 | 300 | 150 | | | 1200 | 654 | 45.3 | — | 0 | ○ | ○ | ○ | ○ |
| Test Example D81 | Bal. | | | 18 | 150 | 300 | 150 | 40 | 20 | 20 | 654 | 45.3 | 2 | 60 | ○ | ○ | ○ | ○ |
| Test Example D82 | Bal. | | | 18 | 150 | 300 | 150 | 100 | 50 | 50 | 654 | 45.3 | 2 | 150 | ○ | ○ | ○ | ○ |
| Test Example D83 | Bal. | | | 18 | 150 | 300 | 150 | 500 | 50 | 30 | 654 | 45.3 | 10 | 550 | ○ | ○ | ○ | ○ |
| Test Example D84 | Bal. | | 0.7 | 18 | 82 | 82 | 82 | | | | 300 | 82.9 | — | 0 | ○ | ○ | ○ | ○ |
| Test Example D85 | Bal. | | 0.7 | 18 | 50 | 150 | 150 | | | | 404 | 102.0 | — | 0 | ○ | ○ | ○ | ○ |
| Test Example D86 | Bal. | | 0.7 | 18 | 150 | 300 | 50 | | | | 554 | 23.1 | — | 0 | ○ | ○ | ○ | ○ |
| Test Example D87 | Bal. | | 0.7 | 18 | 150 | 50 | 150 | | | | 404 | 102.0 | — | 0 | ○ | ○ | ○ | ○ |
| Test Example D88 | Bal. | | 0.7 | 18 | 123 | 0 | 123 | | | | 300 | 143.9 | — | 0 | ○ | ○ | ○ | ○ |
| Test Example D89 | Bal. | | 0.7 | 18 | 0 | 123 | 123 | | | | 300 | 143.9 | — | 0 | ○ | ○ | ○ | ○ |
| Test Example D90 | Bal. | | 0.7 | 18 | 150 | 300 | 150 | | | | 654 | 45.3 | — | 0 | ○ | ○ | ○ | ○ |
| Test Example D91 | Bal. | | 0.7 | 18 | 300 | 300 | 300 | | | | 954 | 59.0 | — | 0 | ○ | ○ | ○ | ○ |
| Test Example D92 | Bal. | | 0.7 | 18 | 300 | 1000 | 1000 | | | | 2354 | 81.1 | — | 0 | ○ | ○ | ○ | ○ |
| Test Example D93 | Bal. | | 0.7 | 18 | 1000 | 300 | 1000 | | | | 2354 | 81.1 | — | 0 | ○ | ○ | ○ | ○ |
| Test Example D94 | Bal. | | 0.7 | 18 | 1000 | 1000 | 1000 | | | | 3054 | 52.7 | — | 0 | ○ | ○ | ○ | ○ |
| Test Example D95 | Bal. | | 0.7 | 10 | 10000 | 5100 | 3000 | | | | 18130 | 20.1 | — | 0 | ○ | ○ | ○ | ○ |
| Test Example D96 | Bal. | | 0.7 | 10 | 10000 | 5100 | 0 | | | | 15130 | 0.2 | — | 0 | ○ | ○ | ○ | ○ |
| Test Example D97 | Bal. | | 0.7 | 10 | 10000 | 0 | 1000 | | | | 11030 | 10.3 | — | 0 | ○ | ○ | ○ | ○ |
| Test Example D98 | Bal. | | 0.7 | 10 | 0 | 5100 | 1000 | | | | 6130 | 20.2 | — | 0 | ○ | ○ | ○ | ○ |
| Test Example D99 | Bal. | | 0.7 | 10 | 150 | 300 | 150 | | | | 630 | 40.0 | — | 0 | ○ | ○ | ○ | ○ |
| Test Example D100 | Bal. | | 0.7 | 14 | 86 | 86 | 86 | | | | 300 | 74.4 | — | 0 | ○ | ○ | ○ | ○ |

TABLE 25

| | | Alloy composition (As, Bi, Pb, Sb: mass ppm, Ag, Cu: % by mass) | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Comprehensive evaluation |
| Test Example D101 | Bal. | | 0.7 | 14 | 50 | 150 | 150 | | | | 392 | 96.0 | — | 0 | ○ | ○ | ○ | ○ |
| Test Example D102 | Bal. | | 0.7 | 14 | 150 | 300 | 50 | | | | 542 | 20.4 | — | 0 | ○ | ○ | ○ | ○ |
| Test Example D103 | Bal. | | 0.7 | 14 | 150 | 50 | 150 | | | | 392 | 96.0 | — | 0 | ○ | ○ | ○ | ○ |
| Test Example D104 | Bal. | | 0.7 | 14 | 200 | 0 | 200 | | | | 442 | 121.0 | — | 0 | ○ | ○ | ○ | ○ |
| Test Example D105 | Bal. | | 0.7 | 14 | 0 | 200 | 200 | | | | 442 | 121.0 | — | 0 | ○ | ○ | ○ | ○ |

TABLE 25-continued

|  | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
|  | Sn | Ag | Cu | As | Bi | Pb | Sb | Ni | Fe | In |  |  |  |  | Change over time | ΔT | Wetta-bility | Compre-hensive evaluation |
| Test Example D106 | Bal. | 0.7 | 14 | 150 | 300 | 150 |  |  |  |  | 642 | 42.7 | — | 0 | ○ | ○ | ○ | ○ |
| Test Example D107 | Bal. | 0.7 | 14 | 300 | 300 | 300 |  |  |  |  | 942 | 57.0 | — | 0 | ○ | ○ | ○ | ○ |
| Test Example D108 | Bal. | 0.7 | 14 | 300 | 1000 | 1000 |  |  |  |  | 2342 | 80.2 | — | 0 | ○ | ○ | ○ | ○ |
| Test Example D109 | Bal. | 0.7 | 14 | 1000 | 300 | 1000 |  |  |  |  | 2342 | 80.2 | — | 0 | ○ | ○ | ○ | ○ |
| Test Example D110 | Bal. | 0.7 | 14 | 1000 | 1000 | 1000 |  |  |  |  | 3042 | 52.1 | — | 0 | ○ | ○ | ○ | ○ |
| Test Example D111 | Bal. | 0.7 | 14 | 10000 | 5100 | 3000 |  |  |  |  | 18142 | 20.1 | — | 0 | ○ | ○ | ○ | ○ |
| Test Example D112 | Bal. | 0.7 | 14 | 10000 | 5100 | 0 |  |  |  |  | 15142 | 0.3 | — | 0 | ○ | ○ | ○ | ○ |
| Test Example D113 | Bal. | 0.7 | 14 | 10000 | 0 | 1000 |  |  |  |  | 11042 | 10.4 | — | 0 | ○ | ○ | ○ | ○ |
| Test Example D114 | Bal. | 0.7 | 14 | 0 | 5100 | 1000 |  |  |  |  | 6142 | 20.4 | — | 0 | ○ | ○ | ○ | ○ |
| Test Example D115 | Bal. | 0.7 | 14 | 150 | 300 | 150 |  |  |  |  | 642 | 42.7 | — | 0 | ○ | ○ | ○ | ○ |
| Test Example D116 | Bal. | 0.7 | 24 | 82 | 82 | 82 |  |  |  |  | 318 | 93.9 | — | 0 | ○ | ○ | ○ | ○ |
| Test Example D117 | Bal. | 0.7 | 24 | 50 | 150 | 150 |  |  |  |  | 422 | 111.0 | — | 0 | ○ | ○ | ○ | ○ |
| Test Example D118 | Bal. | 0.7 | 24 | 150 | 300 | 50 |  |  |  |  | 572 | 27.1 | — | 0 | ○ | ○ | ○ | ○ |
| Test Example D119 | Bal. | 0.7 | 24 | 150 | 50 | 150 |  |  |  |  | 422 | 111.0 | — | 0 | ○ | ○ | ○ | ○ |
| Test Example D120 | Bal. | 0.7 | 24 | 123 | 0 | 123 |  |  |  |  | 318 | 158.5 | — | 0 | ○ | ○ | ○ | ○ |
| Test Example D121 | Bal. | 0.7 | 24 | 0 | 123 | 123 |  |  |  |  | 318 | 158.5 | — | 0 | ○ | ○ | ○ | ○ |
| Test Example D122 | Bal. | 0.7 | 24 | 150 | 300 | 150 |  |  |  |  | 672 | 49.3 | — | 0 | ○ | ○ | ○ | ○ |
| Test Example D123 | Bal. | 0.7 | 24 | 300 | 300 | 300 |  |  |  |  | 972 | 62.0 | — | 0 | ○ | ○ | ○ | ○ |
| Test Example D124 | Bal. | 0.7 | 24 | 300 | 1000 | 1000 |  |  |  |  | 2372 | 82.5 | — | 0 | ○ | ○ | ○ | ○ |
| Test Example D125 | Bal. | 0.7 | 24 | 1000 | 300 | 1000 |  |  |  |  | 2372 | 82.5 | — | 0 | ○ | ○ | ○ | ○ |

TABLE 26

|  | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
|  | Sn | Ag | Cu | As | Bi | Pb | Sb | Ni | Fe | In |  |  |  |  | Change over time | ΔT | Wetta-bility | Compre-hensive evaluation |
| Test Example D126 | Bal. | 0.7 | 24 | 1000 | 1000 | 1000 |  |  |  |  | 3072 | 53.6 | — | 0 | ○ | ○ | ○ | ○ |
| Test Example D127 | Bal. | 0.7 | 24 | 10000 | 5100 | 3000 |  |  |  |  | 18172 | 20.3 | — | 0 | ○ | ○ | ○ | ○ |
| Test Example D128 | Bal. | 0.7 | 24 | 10000 | 5100 | 0 |  |  |  |  | 15172 | 0.5 | — | 0 | ○ | ○ | ○ | ○ |
| Test Example D129 | Bal. | 0.7 | 24 | 10000 | 0 | 1000 |  |  |  |  | 11072 | 10.7 | — | 0 | ○ | ○ | ○ | ○ |
| Test Example D130 | Bal. | 0.7 | 24 | 0 | 5100 | 1000 |  |  |  |  | 6172 | 21.0 | — | 0 | ○ | ○ | ○ | ○ |
| Test Example D131 | Bal. | 0.7 | 24 | 150 | 300 | 150 |  |  |  |  | 672 | 49.3 | — | 0 | ○ | ○ | ○ | ○ |
| Test Example D132 | Bal. | 0.7 | 38 | 82 | 82 | 82 |  |  |  |  | 360 | 119.5 | — | 0 | ○ | ○ | ○ | ○ |
| Test Example D133 | Bal. | 0.7 | 38 | 50 | 150 | 150 |  |  |  |  | 464 | 132.0 | — | 0 | ○ | ○ | ○ | ○ |
| Test Example D134 | Bal. | 0.7 | 38 | 150 | 300 | 50 |  |  |  |  | 614 | 36.4 | — | 0 | ○ | ○ | ○ | ○ |
| Test Example D135 | Bal. | 0.7 | 38 | 150 | 50 | 150 |  |  |  |  | 464 | 132.0 | — | 0 | ○ | ○ | ○ | ○ |

TABLE 26-continued

|  | Alloy composition (As, Bi, Pb, Sb: mass ppm, Ag, Cu: % by mass) | | | | | | | | | | For-mula (3) | For-mula (4) | For-mula (5) | For-mula (6) | Evaluation items | | | |
|---|---|---|---|---|---|---|---|---|---|---|---|---|---|---|---|---|---|---|
|  | Sn | Ag | Cu | As | Bi | Pb | Sb | Ni | Fe | In |  |  |  |  | Change over time | ΔT | Wetta-bility | Compre-hensive evaluation |
| Test Example D136 | Bal. | 0.7 | 38 | 123 | 0 | 123 |  |  |  |  | 360 | 192.7 | — | 0 | ○ | ○ | ○ | ○ |
| Test Example D137 | Bal. | 0.7 | 38 | 0 | 123 | 123 |  |  |  |  | 360 | 192.7 | — | 0 | ○ | ○ | ○ | ○ |
| Test Example D138 | Bal. | 0.7 | 38 | 150 | 300 | 150 |  |  |  |  | 714 | 58.7 | — | 0 | ○ | ○ | ○ | ○ |
| Test Example D139 | Bal. | 0.7 | 38 | 300 | 300 | 300 |  |  |  |  | 1014 | 69.0 | — | 0 | ○ | ○ | ○ | ○ |
| Test Example D140 | Bal. | 0.7 | 38 | 300 | 1000 | 1000 |  |  |  |  | 2414 | 85.7 | — | 0 | ○ | ○ | ○ | ○ |
| Test Example D141 | Bal. | 0.7 | 38 | 1000 | 300 | 1000 |  |  |  |  | 2414 | 85.7 | — | 0 | ○ | ○ | ○ | ○ |
| Test Example D142 | Bal. | 0.7 | 38 | 1000 | 1000 | 1000 |  |  |  |  | 3114 | 55.7 | — | 0 | ○ | ○ | ○ | ○ |
| Test Example D143 | Bal. | 0.7 | 38 | 10000 | 5100 | 3000 |  |  |  |  | 18214 | 20.6 | — | 0 | ○ | ○ | ○ | ○ |
| Test Example D144 | Bal. | 0.7 | 38 | 10000 | 5100 | 0 |  |  |  |  | 15214 | 0.8 | — | 0 | ○ | ○ | ○ | ○ |
| Test Example D145 | Bal. | 0.7 | 38 | 10000 | 0 | 1000 |  |  |  |  | 11114 | 11.1 | — | 0 | ○ | ○ | ○ | ○ |
| Test Example D146 | Bal. | 0.7 | 38 | 0 | 5100 | 1000 |  |  |  |  | 6214 | 21.8 | — | 0 | ○ | ○ | ○ | ○ |
| Test Example D147 | Bal. | 0.7 | 38 | 150 | 300 | 150 |  |  |  |  | 714 | 58.7 | — | 0 | ○ | ○ | ○ | ○ |
| Test Example D148 | Bal. | 0.7 | 18 | 150 | 300 | 150 |  |  |  | 40 | 654 | 45.3 | — | 40 | ○ | ○ | ○ | ○ |
| Test Example D149 | Bal. | 0.7 | 18 | 150 | 300 | 150 |  |  |  | 100 | 654 | 45.3 | — | 100 | ○ | ○ | ○ | ○ |
| Test Example D150 | Bal. | 0.7 | 18 | 150 | 300 | 150 |  |  |  | 500 | 654 | 45.3 | — | 500 | ○ | ○ | ○ | ○ |

TABLE 27

|  | Alloy composition (As, Bi, Pb, Sb: mass ppm, Ag, Cu: % by mass) | | | | | | | | | | For-mula (3) | For-mula (4) | For-mula (5) | For-mula (6) | Evaluation items | | | |
|---|---|---|---|---|---|---|---|---|---|---|---|---|---|---|---|---|---|---|
|  | Sn | Ag | Cu | As | Bi | Pb | Sb | Ni | Fe | In |  |  |  |  | Change over time | ΔT | Wetta-bility | Compre-hensive evaluation |
| Test Example D151 | Bal. | 0.7 | 18 | 150 | 300 | 150 |  | 600 |  |  | 654 | 45.3 | — | 600 | ○ | ○ | ○ | ○ |
| Test Example D152 | Bal. | 0.7 | 18 | 150 | 300 | 150 |  |  | 20 |  | 654 | 45.3 | 0 | 20 | ○ | ○ | ○ | ○ |
| Test Example D153 | Bal. | 0.7 | 18 | 150 | 300 | 150 |  |  | 100 |  | 654 | 45.3 | 0 | 100 | ○ | ○ | ○ | ○ |
| Test Example D154 | Bal. | 0.7 | 18 | 150 | 300 | 150 |  | 40 | 20 |  | 654 | 45.3 | 2 | 60 | ○ | ○ | ○ | ○ |
| Test Example D155 | Bal. | 0.7 | 18 | 150 | 300 | 150 |  | 40 | 10 |  | 654 | 45.3 | 4 | 50 | ○ | ○ | ○ | ○ |
| Test Example D156 | Bal. | 0.7 | 18 | 150 | 300 | 150 |  | 80 | 10 |  | 654 | 45.3 | 8 | 90 | ○ | ○ | ○ | ○ |
| Test Example D157 | Bal. | 0.7 | 18 | 150 | 300 | 150 |  | 500 | 10 |  | 654 | 45.3 | 50 | 510 | ○ | ○ | ○ | ○ |
| Test Example D158 | Bal. | 0.7 | 18 | 150 | 300 | 150 |  | 10 | 100 |  | 654 | 45.3 | 0.1 | 110 | ○ | ○ | ○ | ○ |
| Test Example D159 | Bal. | 0.7 | 18 | 150 | 300 | 150 |  | 100 | 100 |  | 654 | 45.3 | 1 | 200 | ○ | ○ | ○ | ○ |
| Test Example D160 | Bal. | 0.7 | 18 | 150 | 300 | 150 |  | 600 | 80 |  | 654 | 45.3 | 7.5 | 680 | ○ | ○ | ○ | ○ |
| Test Example D161 | Bal. | 0.7 | 18 | 150 | 300 | 150 |  |  |  | 20 | 654 | 45.3 | — | 0 | ○ | ○ | ○ | ○ |
| Test Example D162 | Bal. | 0.7 | 18 | 150 | 300 | 150 |  |  |  | 100 | 654 | 45.3 | — | 0 | ○ | ○ | ○ | ○ |
| Test Example D163 | Bal. | 0.7 | 18 | 150 | 300 | 150 |  |  |  | 1200 | 654 | 45.3 | — | 0 | ○ | ○ | ○ | ○ |
| Test Example D164 | Bal. | 0.7 | 18 | 150 | 300 | 150 |  | 40 | 20 | 20 | 654 | 45.3 | 2 | 60 | ○ | ○ | ○ | ○ |
| Test Example D165 | Bal. | 0.7 | 18 | 150 | 300 | 150 |  | 100 | 50 | 50 | 654 | 45.3 | 2 | 150 | ○ | ○ | ○ | ○ |

TABLE 27-continued

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D166 | Bal. | 0.7 | 18 | 150 | 300 | 150 | 500 | 50 | 30 | | 654 | 45.3 | 10 | 550 | ○ | ○ | ○ | ○ |
| Test Example D167 | Bal. | 1 | 0.5 | 18 | 82 | 82 | 82 | | | | 300 | 82.9 | — | 0 | ○ | ○ | ○ | ○ |
| Test Example D168 | Bal. | 1 | 0.5 | 18 | 50 | 150 | 150 | | | | 404 | 102.0 | — | 0 | ○ | ○ | ○ | ○ |
| Test Example D169 | Bal. | 1 | 0.5 | 18 | 150 | 300 | 50 | | | | 554 | 23.1 | — | 0 | ○ | ○ | ○ | ○ |
| Test Example D170 | Bal. | 1 | 0.5 | 18 | 150 | 50 | 150 | | | | 404 | 102.0 | — | 0 | ○ | ○ | ○ | ○ |
| Test Example D171 | Bal. | 1 | 0.5 | 18 | 123 | 0 | 123 | | | | 300 | 143.9 | — | 0 | ○ | ○ | ○ | ○ |
| Test Example D172 | Bal. | 1 | 0.5 | 18 | 0 | 123 | 123 | | | | 300 | 143.9 | — | 0 | ○ | ○ | ○ | ○ |
| Test Example D173 | Bal. | 1 | 0.5 | 18 | 150 | 300 | 150 | | | | 654 | 45.3 | — | 0 | ○ | ○ | ○ | ○ |
| Test Example D174 | Bal. | 1 | 0.5 | 18 | 300 | 300 | 300 | | | | 954 | 59.0 | — | 0 | ○ | ○ | ○ | ○ |
| Test Example D175 | Bal. | 1 | 0.5 | 18 | 300 | 1000 | 1000 | | | | 2354 | 81.1 | — | 0 | ○ | ○ | ○ | ○ |

TABLE 28

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D176 | Bal. | 1 | 0.5 | 18 | 1000 | 300 | 1000 | | | | 2354 | 81.1 | — | 0 | ○ | ○ | ○ | ○ |
| Test Example D177 | Bal. | 1 | 0.5 | 18 | 1000 | 1000 | 1000 | | | | 3054 | 52.7 | — | 0 | ○ | ○ | ○ | ○ |
| Test Example D178 | Bal. | 1 | 0.5 | 10 | 10000 | 5100 | 3000 | | | | 18130 | 20.1 | — | 0 | ○ | ○ | ○ | ○ |
| Test Example D179 | Bal. | 1 | 0.5 | 10 | 10000 | 5100 | 0 | | | | 15130 | 0.2 | — | 0 | ○ | ○ | ○ | ○ |
| Test Example D180 | Bal. | 1 | 0.5 | 10 | 10000 | 0 | 1000 | | | | 11030 | 10.3 | — | 0 | ○ | ○ | ○ | ○ |
| Test Example D181 | Bal. | 1 | 0.5 | 10 | 0 | 5100 | 1000 | | | | 6130 | 20.2 | — | 0 | ○ | ○ | ○ | ○ |
| Test Example D182 | Bal. | 1 | 0.5 | 10 | 150 | 300 | 150 | | | | 630 | 40.0 | — | 0 | ○ | ○ | ○ | ○ |
| Test Example D183 | Bal. | 1 | 0.5 | 14 | 86 | 86 | 86 | | | | 300 | 74.4 | — | 0 | ○ | ○ | ○ | ○ |
| Test Example D184 | Bal. | 1 | 0.5 | 14 | 50 | 150 | 150 | | | | 392 | 96.0 | — | 0 | ○ | ○ | ○ | ○ |
| Test Example D185 | Bal. | 1 | 0.5 | 14 | 150 | 300 | 50 | | | | 542 | 20.4 | — | 0 | ○ | ○ | ○ | ○ |
| Test Example D186 | Bal. | 1 | 0.5 | 14 | 150 | 50 | 150 | | | | 392 | 96.0 | — | 0 | ○ | ○ | ○ | ○ |
| Test Example D187 | Bal. | 1 | 0.5 | 14 | 200 | 0 | 200 | | | | 442 | 121.0 | — | 0 | ○ | ○ | ○ | ○ |
| Test Example D188 | Bal. | 1 | 0.5 | 14 | 0 | 200 | 200 | | | | 442 | 121.0 | — | 0 | ○ | ○ | ○ | ○ |
| Test Example D189 | Bal. | 1 | 0.5 | 14 | 150 | 300 | 150 | | | | 642 | 42.7 | — | 0 | ○ | ○ | ○ | ○ |
| Test Example D190 | Bal. | 1 | 0.5 | 14 | 300 | 300 | 300 | | | | 942 | 57.0 | — | 0 | ○ | ○ | ○ | ○ |
| Test Example D191 | Bal. | 1 | 0.5 | 14 | 300 | 1000 | 1000 | | | | 2342 | 80.2 | — | 0 | ○ | ○ | ○ | ○ |
| Test Example D192 | Bal. | 1 | 0.5 | 14 | 1000 | 300 | 1000 | | | | 2342 | 80.2 | — | 0 | ○ | ○ | ○ | ○ |
| Test Example D193 | Bal. | 1 | 0.5 | 14 | 1000 | 1000 | 1000 | | | | 3042 | 52.1 | — | 0 | ○ | ○ | ○ | ○ |
| Test Example D194 | Bal. | 1 | 0.5 | 14 | 10000 | 5100 | 3000 | | | | 18142 | 20.1 | — | 0 | ○ | ○ | ○ | ○ |
| Test Example D195 | Bal. | 1 | 0.5 | 14 | 10000 | 5100 | 0 | | | | 15142 | 0.3 | — | 0 | ○ | ○ | ○ | ○ |

TABLE 28-continued

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | | | | | | | | | | | | | | | Change over time | ΔT | Wetta-bility | Compre-hensive evaluation |
| | Sn | Ag | Cu | As | Bi | Pb | Sb | Ni | Fe | In | | | | | | | | |
| Test Example D196 | Bal. | 1 | 0.5 | 14 | 10000 | 0 | 1000 | | | | 11042 | 10.4 | — | 0 | ○ | ○ | ○ | ○ |
| Test Example D197 | Bal. | 1 | 0.5 | 14 | 0 | 5100 | 1000 | | | | 6142 | 20.4 | — | 0 | ○ | ○ | ○ | ○ |
| Test Example D198 | Bal. | 1 | 0.5 | 14 | 150 | 300 | 150 | | | | 642 | 42.7 | — | 0 | ○ | ○ | ○ | ○ |
| Test Example D199 | Bal. | 1 | 0.5 | 24 | 82 | 82 | 82 | | | | 318 | 93.9 | — | 0 | ○ | ○ | ○ | ○ |
| Test Example D200 | Bal. | 1 | 0.5 | 24 | 50 | 150 | 150 | | | | 422 | 111.0 | — | 0 | ○ | ○ | ○ | ○ |

TABLE 29

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | | | | | | | | | | | | | | | Change over time | ΔT | Wetta-bility | Compre-hensive evaluation |
| | Sn | Ag | Cu | As | Bi | Pb | Sb | Ni | Fe | In | | | | | | | | |
| Test Example D201 | Bal. | 1 | 0.5 | 24 | 150 | 300 | 50 | | | | 572 | 27.1 | — | 0 | ○ | ○ | ○ | ○ |
| Test Example D202 | Bal. | 1 | 0.5 | 24 | 150 | 50 | 150 | | | | 422 | 111.0 | — | 0 | ○ | ○ | ○ | ○ |
| Test Example D203 | Bal. | 1 | 0.5 | 24 | 123 | 0 | 123 | | | | 318 | 158.5 | — | 0 | ○ | ○ | ○ | ○ |
| Test Example D204 | Bal. | 1 | 0.5 | 24 | 0 | 123 | 123 | | | | 318 | 158.5 | — | 0 | ○ | ○ | ○ | ○ |
| Test Example D205 | Bal. | 1 | 0.5 | 24 | 150 | 300 | 150 | | | | 672 | 49.3 | — | 0 | ○ | ○ | ○ | ○ |
| Test Example D206 | Bal. | 1 | 0.5 | 24 | 300 | 300 | 300 | | | | 972 | 62.0 | — | 0 | ○ | ○ | ○ | ○ |
| Test Example D207 | Bal. | 1 | 0.5 | 24 | 300 | 1000 | 1000 | | | | 2372 | 82.5 | — | 0 | ○ | ○ | ○ | ○ |
| Test Example D208 | Bal. | 1 | 0.5 | 24 | 1000 | 300 | 1000 | | | | 2372 | 82.5 | — | 0 | ○ | ○ | ○ | ○ |
| Test Example D209 | Bal. | 1 | 0.5 | 24 | 1000 | 1000 | 1000 | | | | 3072 | 53.6 | — | 0 | ○ | ○ | ○ | ○ |
| Test Example D210 | Bal. | 1 | 0.5 | 24 | 10000 | 5100 | 3000 | | | | 18172 | 20.3 | — | 0 | ○ | ○ | ○ | ○ |
| Test Example D211 | Bal. | 1 | 0.5 | 24 | 10000 | 5100 | 0 | | | | 15172 | 0.5 | — | 0 | ○ | ○ | ○ | ○ |
| Test Example D212 | Bal. | 1 | 0.5 | 24 | 10000 | 0 | 1000 | | | | 11072 | 10.7 | — | 0 | ○ | ○ | ○ | ○ |
| Test Example D213 | Bal. | 1 | 0.5 | 24 | 0 | 5100 | 1000 | | | | 6172 | 21.0 | — | 0 | ○ | ○ | ○ | ○ |
| Test Example D214 | Bal. | 1 | 0.5 | 24 | 150 | 300 | 150 | | | | 672 | 49.3 | — | 0 | ○ | ○ | ○ | ○ |
| Test Example D215 | Bal. | 1 | 0.5 | 38 | 82 | 82 | 82 | | | | 360 | 119.5 | — | 0 | ○ | ○ | ○ | ○ |
| Test Example D216 | Bal. | 1 | 0.5 | 38 | 50 | 150 | 150 | | | | 464 | 132.0 | — | 0 | ○ | ○ | ○ | ○ |
| Test Example D217 | Bal. | 1 | 0.5 | 38 | 150 | 300 | 50 | | | | 614 | 36.4 | — | 0 | ○ | ○ | ○ | ○ |
| Test Example D218 | Bal. | 1 | 0.5 | 38 | 150 | 50 | 150 | | | | 464 | 132.0 | — | 0 | ○ | ○ | ○ | ○ |
| Test Example D219 | Bal. | 1 | 0.5 | 38 | 123 | 0 | 123 | | | | 360 | 192.7 | — | 0 | ○ | ○ | ○ | ○ |
| Test Example D220 | Bal. | 1 | 0.5 | 38 | 0 | 123 | 123 | | | | 360 | 192.7 | — | 0 | ○ | ○ | ○ | ○ |
| Test Example D221 | Bal. | 1 | 0.5 | 38 | 150 | 300 | 150 | | | | 714 | 58.7 | — | 0 | ○ | ○ | ○ | ○ |
| Test Example D222 | Bal. | 1 | 0.5 | 38 | 300 | 300 | 300 | | | | 1014 | 69.0 | — | 0 | ○ | ○ | ○ | ○ |

TABLE 29-continued

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D223 | Bal. | 1 | 0.5 | <u>38</u> | 300 | 1000 | 1000 | | | | 2414 | 85.7 | — | 0 | ○ | ○ | ○ | ○ |
| Test Example D224 | Bal. | 1 | 0.5 | <u>38</u> | 1000 | 300 | 1000 | | | | 2414 | 85.7 | — | 0 | ○ | ○ | ○ | ○ |
| Test Example D225 | Bal. | 1 | 0.5 | <u>38</u> | 1000 | 1000 | 1000 | | | | 3114 | 55.7 | — | 0 | ○ | ○ | ○ | ○ |

TABLE 30

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D226 | Bal. | 1 | 0.5 | <u>38</u> | 10000 | 5100 | 3000 | | | | 18214 | 20.6 | — | 0 | ○ | ○ | ○ | ○ |
| Test Example D227 | Bal. | 1 | 0.5 | <u>38</u> | 10000 | 5100 | <u>0</u> | | | | 15214 | 0.8 | — | 0 | ○ | ○ | ○ | ○ |
| Test Example D228 | Bal. | 1 | 0.5 | <u>38</u> | 10000 | 0 | 1000 | | | | 11114 | 11.1 | — | 0 | ○ | ○ | ○ | ○ |
| Test Example D229 | Bal. | 1 | 0.5 | <u>38</u> | 0 | 5100 | 1000 | | | | 6214 | 21.8 | — | 0 | ○ | ○ | ○ | ○ |
| Test Example D230 | Bal. | 1 | 0.5 | <u>38</u> | 150 | 300 | 150 | | | | 714 | 58.7 | — | 0 | ○ | ○ | ○ | ○ |
| Test Example D231 | Bal. | 1 | 0.5 | 18 | 150 | 300 | 150 | 40 | | | 654 | 45.3 | — | 40 | ○ | ○ | ○ | ○ |
| Test Example D232 | Bal. | 1 | 0.5 | 18 | 150 | 300 | 150 | 100 | | | 654 | 45.3 | — | 100 | ○ | ○ | ○ | ○ |
| Test Example D233 | Bal. | 1 | 0.5 | 18 | 150 | 300 | 150 | 500 | | | 654 | 45.3 | — | 500 | ○ | ○ | ○ | ○ |
| Test Example D234 | Bal. | 1 | 0.5 | 18 | 150 | 300 | 150 | 600 | | | 654 | 45.3 | — | 600 | ○ | ○ | ○ | ○ |
| Test Example D235 | Bal. | 1 | 0.5 | 18 | 150 | 300 | 150 | | 20 | | 654 | 45.3 | 0 | 20 | ○ | ○ | ○ | ○ |
| Test Example D236 | Bal. | 1 | 0.5 | 18 | 150 | 300 | 150 | | 100 | | 654 | 45.3 | 0 | 100 | ○ | ○ | ○ | ○ |
| Test Example D237 | Bal. | 1 | 0.5 | 18 | 150 | 300 | 150 | 40 | 20 | | 654 | 45.3 | 2 | 60 | ○ | ○ | ○ | ○ |
| Test Example D238 | Bal. | 1 | 0.5 | 18 | 150 | 300 | 150 | 40 | 10 | | 654 | 45.3 | 4 | 50 | ○ | ○ | ○ | ○ |
| Test Example D239 | Bal. | 1 | 0.5 | 18 | 150 | 300 | 150 | 80 | 10 | | 654 | 45.3 | 8 | 90 | ○ | ○ | ○ | ○ |
| Test Example D240 | Bal. | 1 | 0.5 | 18 | 150 | 300 | 150 | 500 | 10 | | 654 | 45.3 | 50 | 510 | ○ | ○ | ○ | ○ |
| Test Example D241 | Bal. | 1 | 0.5 | 18 | 150 | 300 | 150 | 10 | 100 | | 654 | 45.3 | 0.1 | 110 | ○ | ○ | ○ | ○ |
| Test Example D242 | Bal. | 1 | 0.5 | 18 | 150 | 300 | 150 | 100 | 100 | | 654 | 45.3 | 1 | 200 | ○ | ○ | ○ | ○ |
| Test Example D243 | Bal. | 1 | 0.5 | 18 | 150 | 300 | 150 | 600 | 80 | | 654 | 45.3 | 7.5 | 680 | ○ | ○ | ○ | ○ |
| Test Example D244 | Bal. | 1 | 0.5 | 18 | 150 | 300 | 150 | | | 20 | 654 | 45.3 | — | 0 | ○ | ○ | ○ | ○ |
| Test Example D245 | Bal. | 1 | 0.5 | 18 | 150 | 300 | 150 | | | 100 | 654 | 45.3 | — | 0 | ○ | ○ | ○ | ○ |
| Test Example D246 | Bal. | 1 | 0.5 | 18 | 150 | 300 | 150 | | | 1200 | 654 | 45.3 | — | 0 | ○ | ○ | ○ | ○ |
| Test Example D247 | Bal. | 1 | 0.5 | 18 | 150 | 300 | 150 | 40 | 20 | 20 | 654 | 45.3 | 2 | 60 | ○ | ○ | ○ | ○ |
| Test Example D248 | Bal. | 1 | 0.5 | 18 | 150 | 300 | 150 | 100 | 50 | 50 | 654 | 45.3 | 2 | 150 | ○ | ○ | ○ | ○ |
| Test Example D249 | Bal. | 1 | 0.5 | 18 | 150 | 300 | 150 | 500 | 50 | 30 | 654 | 45.3 | 10 | 550 | ○ | ○ | ○ | ○ |
| Test Example D250 | Bal. | 2 | 0.5 | 18 | 82 | 82 | 82 | | | | 300 | 82.9 | — | 0 | ○ | ○ | ○ | ○ |

TABLE 31

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D251 | Bal. | 2 | 0.5 | 18 | 50 | 150 | 150 | | | | 404 | 102.0 | — | 0 | ○ | ○ | ○ | ○ |
| Test Example D252 | Bal. | 2 | 0.5 | 18 | 150 | 300 | 50 | | | | 554 | 23.1 | — | 0 | ○ | ○ | ○ | ○ |
| Test Example D253 | Bal. | 2 | 0.5 | 18 | 150 | 50 | 150 | | | | 404 | 102.0 | — | 0 | ○ | ○ | ○ | ○ |
| Test Example D254 | Bal. | 2 | 0.5 | 18 | 123 | 0 | 123 | | | | 300 | 143.9 | — | 0 | ○ | ○ | ○ | ○ |
| Test Example D255 | Bal. | 2 | 0.5 | 18 | 0 | 123 | 123 | | | | 300 | 143.9 | — | 0 | ○ | ○ | ○ | ○ |
| Test Example D256 | Bal. | 2 | 0.5 | 18 | 150 | 300 | 150 | | | | 654 | 45.3 | — | 0 | ○ | ○ | ○ | ○ |
| Test Example D257 | Bal. | 2 | 0.5 | 18 | 300 | 300 | 300 | | | | 954 | 59.0 | — | 0 | ○ | ○ | ○ | ○ |
| Test Example D258 | Bal. | 2 | 0.5 | 18 | 300 | 1000 | 1000 | | | | 2354 | 81.1 | — | 0 | ○ | ○ | ○ | ○ |
| Test Example D259 | Bal. | 2 | 0.5 | 18 | 1000 | 300 | 1000 | | | | 2354 | 81.1 | — | 0 | ○ | ○ | ○ | ○ |
| Test Example D260 | Bal. | 2 | 0.5 | 18 | 1000 | 1000 | 1000 | | | | 3054 | 52.7 | — | 0 | ○ | ○ | ○ | ○ |
| Test Example D261 | Bal. | 2 | 0.5 | 10 | 10000 | 5100 | 3000 | | | | 18130 | 20.1 | — | 0 | ○ | ○ | ○ | ○ |
| Test Example D262 | Bal. | 2 | 0.5 | 10 | 10000 | 5100 | 0 | | | | 15130 | 0.2 | — | 0 | ○ | ○ | ○ | ○ |
| Test Example D263 | Bal. | 2 | 0.5 | 10 | 10000 | 0 | 1000 | | | | 11030 | 10.3 | — | 0 | ○ | ○ | ○ | ○ |
| Test Example D264 | Bal. | 2 | 0.5 | 10 | 0 | 5100 | 1000 | | | | 6130 | 20.2 | — | 0 | ○ | ○ | ○ | ○ |
| Test Example D265 | Bal. | 2 | 0.5 | 10 | 150 | 300 | 150 | | | | 630 | 40.0 | — | 0 | ○ | ○ | ○ | ○ |
| Test Example D266 | Bal. | 2 | 0.5 | 14 | 86 | 86 | 86 | | | | 300 | 74.4 | — | 0 | ○ | ○ | ○ | ○ |
| Test Example D267 | Bal. | 2 | 0.5 | 14 | 50 | 150 | 150 | | | | 392 | 96.0 | — | 0 | ○ | ○ | ○ | ○ |
| Test Example D268 | Bal. | 2 | 0.5 | 14 | 150 | 300 | 50 | | | | 542 | 20.4 | — | 0 | ○ | ○ | ○ | ○ |
| Test Example D269 | Bal. | 2 | 0.5 | 14 | 150 | 50 | 150 | | | | 392 | 96.0 | — | 0 | ○ | ○ | ○ | ○ |
| Test Example D270 | Bal. | 2 | 0.5 | 14 | 200 | 0 | 200 | | | | 442 | 121.0 | — | 0 | ○ | ○ | ○ | ○ |
| Test Example D271 | Bal. | 2 | 0.5 | 14 | 0 | 200 | 200 | | | | 442 | 121.0 | — | 0 | ○ | ○ | ○ | ○ |
| Test Example D272 | Bal. | 2 | 0.5 | 14 | 150 | 300 | 150 | | | | 642 | 42.7 | — | 0 | ○ | ○ | ○ | ○ |
| Test Example D273 | Bal. | 2 | 0.5 | 14 | 300 | 300 | 300 | | | | 942 | 57.0 | — | 0 | ○ | ○ | ○ | ○ |
| Test Example D274 | Bal. | 2 | 0.5 | 14 | 300 | 1000 | 1000 | | | | 2342 | 80.2 | — | 0 | ○ | ○ | ○ | ○ |
| Test Example D275 | Bal. | 2 | 0.5 | 14 | 1000 | 300 | 1000 | | | | 2342 | 80.2 | — | 0 | ○ | ○ | ○ | ○ |

TABLE 32

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D276 | Bal. | 2 | 0.5 | 14 | 1000 | 1000 | 1000 | | | | 3042 | 52.1 | — | 0 | ○ | ○ | ○ | ○ |
| Test Example D277 | Bal. | 2 | 0.5 | 14 | 10000 | 5100 | 3000 | | | | 18142 | 20.1 | — | 0 | ○ | ○ | ○ | ○ |
| Test Example D278 | Bal. | 2 | 0.5 | 14 | 10000 | 5100 | 0 | | | | 15142 | 0.3 | — | 0 | ○ | ○ | ○ | ○ |
| Test Example D279 | Bal. | 2 | 0.5 | 14 | 10000 | 0 | 1000 | | | | 11042 | 10.4 | — | 0 | ○ | ○ | ○ | ○ |
| Test Example D280 | Bal. | 2 | 0.5 | 14 | 0 | 5100 | 1000 | | | | 6142 | 20.4 | — | 0 | ○ | ○ | ○ | ○ |
| Test Example D281 | Bal. | 2 | 0.5 | 14 | 150 | 300 | 150 | | | | 642 | 42.7 | — | 0 | ○ | ○ | ○ | ○ |
| Test Example D282 | Bal. | 2 | 0.5 | 24 | 82 | 82 | 82 | | | | 318 | 93.9 | — | 0 | ○ | ○ | ○ | ○ |
| Test Example D283 | Bal. | 2 | 0.5 | 24 | 50 | 150 | 150 | | | | 422 | 111.0 | — | 0 | ○ | ○ | ○ | ○ |
| Test Example D284 | Bal. | 2 | 0.5 | 24 | 150 | 300 | 50 | | | | 572 | 27.1 | — | 0 | ○ | ○ | ○ | ○ |
| Test Example D285 | Bal. | 2 | 0.5 | 24 | 150 | 50 | 150 | | | | 422 | 111.0 | — | 0 | ○ | ○ | ○ | ○ |
| Test Example D286 | Bal. | 2 | 0.5 | 24 | 123 | 0 | 123 | | | | 318 | 158.5 | — | 0 | ○ | ○ | ○ | ○ |
| Test Example D287 | Bal. | 2 | 0.5 | 24 | 0 | 123 | 123 | | | | 318 | 158.5 | — | 0 | ○ | ○ | ○ | ○ |
| Test Example D288 | Bal. | 2 | 0.5 | 24 | 150 | 300 | 150 | | | | 672 | 49.3 | — | 0 | ○ | ○ | ○ | ○ |
| Test Example D289 | Bal. | 2 | 0.5 | 24 | 300 | 300 | 300 | | | | 972 | 62.0 | — | 0 | ○ | ○ | ○ | ○ |
| Test Example D290 | Bal. | 2 | 0.5 | 24 | 300 | 1000 | 1000 | | | | 2372 | 82.5 | — | 0 | ○ | ○ | ○ | ○ |
| Test Example D291 | Bal. | 2 | 0.5 | 24 | 1000 | 300 | 1000 | | | | 2372 | 82.5 | — | 0 | ○ | ○ | ○ | ○ |
| Test Example D292 | Bal. | 2 | 0.5 | 24 | 1000 | 1000 | 1000 | | | | 3072 | 53.6 | — | 0 | ○ | ○ | ○ | ○ |
| Test Example D293 | Bal. | 2 | 0.5 | 24 | 10000 | 5100 | 3000 | | | | 18172 | 20.3 | — | 0 | ○ | ○ | ○ | ○ |
| Test Example D294 | Bal. | 2 | 0.5 | 24 | 10000 | 5100 | 0 | | | | 15172 | 0.5 | — | 0 | ○ | ○ | ○ | ○ |
| Test Example D295 | Bal. | 2 | 0.5 | 24 | 10000 | 0 | 1000 | | | | 11072 | 10.7 | — | 0 | ○ | ○ | ○ | ○ |
| Test Example D296 | Bal. | 2 | 0.5 | 24 | 0 | 5100 | 1000 | | | | 6172 | 21.0 | — | 0 | ○ | ○ | ○ | ○ |
| Test Example D297 | Bal. | 2 | 0.5 | 24 | 150 | 300 | 150 | | | | 672 | 49.3 | — | 0 | ○ | ○ | ○ | ○ |
| Test Example D298 | Bal. | 2 | 0.5 | 38 | 82 | 82 | 82 | | | | 360 | 119.5 | — | 0 | ○ | ○ | ○ | ○ |
| Test Example D299 | Bal. | 2 | 0.5 | 38 | 50 | 150 | 150 | | | | 464 | 132.0 | — | 0 | ○ | ○ | ○ | ○ |
| Test Example D300 | Bal. | 2 | 0.5 | 38 | 150 | 300 | 50 | | | | 614 | 36.4 | — | 0 | ○ | ○ | ○ | ○ |

TABLE 33

| | Alloy composition (As, Bi, Pb, Sb: mass ppm, Ag, Cu: % by mass) | | | | | | | | | | Formula | Formula |
|---|---|---|---|---|---|---|---|---|---|---|---|---|
| | Sn | Ag | Cu | As | Bi | Pb | Sb | Ni | Fe | In | (3) | (4) |
| Test Example D301 | Bal. | 2 | 0.5 | 38 | 150 | 50 | 150 | | | | 464 | 132.0 |
| Test Example D302 | Bal. | 2 | 0.5 | 38 | 123 | 0 | 123 | | | | 360 | 192.7 |
| Test Example D303 | Bal. | 2 | 0.5 | 38 | 0 | 123 | 123 | | | | 360 | 192.7 |
| Test Example D304 | Bal. | 2 | 0.5 | 38 | 150 | 300 | 150 | | | | 714 | 58.7 |
| Test Example D305 | Bal. | 2 | 0.5 | 38 | 300 | 300 | 300 | | | | 1014 | 69.0 |
| Test Example D306 | Bal. | 2 | 0.5 | 38 | 300 | 1000 | 1000 | | | | 2414 | 85.7 |
| Test Example D307 | Bal. | 2 | 0.5 | 38 | 1000 | 300 | 1000 | | | | 2414 | 85.7 |
| Test Example D308 | Bal. | 2 | 0.5 | 38 | 1000 | 1000 | 1000 | | | | 3114 | 55.7 |
| Test Example D309 | Bal. | 2 | 0.5 | 38 | 10000 | 5100 | 3000 | | | | 18214 | 20.6 |
| Test Example D310 | Bal. | 2 | 0.5 | 38 | 10000 | 5100 | 0 | | | | 15214 | 0.8 |
| Test Example D311 | Bal. | 2 | 0.5 | 38 | 10000 | 0 | 1000 | | | | 11114 | 11.1 |
| Test Example D312 | Bal. | 2 | 0.5 | 38 | 0 | 5100 | 1000 | | | | 6214 | 21.8 |
| Test Example D313 | Bal. | 2 | 0.5 | 38 | 150 | 300 | 150 | | | | 714 | 58.7 |
| Test Example D314 | Bal. | 2 | 0.5 | 18 | 150 | 300 | 150 | 40 | | | 654 | 45.3 |
| Test Example D315 | Bal. | 2 | 0.5 | 18 | 150 | 300 | 150 | 100 | | | 654 | 45.3 |
| Test Example D316 | Bal. | 2 | 0.5 | 18 | 150 | 300 | 150 | 500 | | | 654 | 45.3 |
| Test Example D317 | Bal. | 2 | 0.5 | 18 | 150 | 300 | 150 | 600 | | | 654 | 45.3 |
| Test Example D318 | Bal. | 2 | 0.5 | 18 | 150 | 300 | 150 | | 20 | | 654 | 45.3 |
| Test Example D319 | Bal. | 2 | 0.5 | 18 | 150 | 300 | 150 | | 100 | | 654 | 45.3 |
| Test Example D320 | Bal. | 2 | 0.5 | 18 | 150 | 300 | 150 | 40 | 20 | | 654 | 45.3 |
| Test Example D321 | Bal. | 2 | 0.5 | 18 | 150 | 300 | 150 | 40 | 10 | | 654 | 45.3 |
| Test Example D322 | Bal. | 2 | 0.5 | 18 | 150 | 300 | 150 | 80 | 10 | | 654 | 45.3 |
| Test Example D323 | Bal. | 2 | 0.5 | 18 | 150 | 300 | 150 | 500 | 10 | | 654 | 45.3 |
| Test Example D324 | Bal. | 2 | 0.5 | 18 | 150 | 300 | 150 | 10 | 100 | | 654 | 45.3 |
| Test Example D325 | Bal. | 2 | 0.5 | 18 | 150 | 300 | 150 | 100 | 100 | | 654 | 45.3 |

| | Formula (5) | Formula (6) | Evaluation items | | | |
|---|---|---|---|---|---|---|
| | | | Change over time | ΔT | Wettability | Comprehensive evaluation |
| Test Example D301 | — | 0 | ○ | ○ | ○ | ○ |
| Test Example D302 | — | 0 | ○ | ○ | ○ | ○ |
| Test Example D303 | — | 0 | ○ | ○ | ○ | ○ |
| Test Example D304 | — | 0 | ○ | ○ | ○ | ○ |
| Test Example D305 | — | 0 | ○ | ○ | ○ | ○ |
| Test Example D306 | — | 0 | ○ | ○ | ○ | ○ |
| Test Example D307 | — | 0 | ○ | ○ | ○ | ○ |
| Test Example D308 | — | 0 | ○ | ○ | ○ | ○ |
| Test Example D309 | — | 0 | ○ | ○ | ○ | ○ |
| Test Example D310 | — | 0 | ○ | ○ | ○ | ○ |
| Test Example D311 | — | 0 | ○ | ○ | ○ | ○ |
| Test Example D312 | — | 0 | ○ | ○ | ○ | ○ |
| Test Example D313 | — | 0 | ○ | ○ | ○ | ○ |
| Test Example D314 | — | 40 | ○ | ○ | ○ | ○ |
| Test Example D315 | — | 100 | ○ | ○ | ○ | ○ |
| Test Example D316 | — | 500 | ○ | ○ | ○ | ○ |
| Test Example D317 | — | 600 | ○ | ○ | ○ | ○ |
| Test Example D318 | 0 | 20 | ○ | ○ | ○ | ○ |
| Test Example D319 | 0 | 100 | ○ | ○ | ○ | ○ |
| Test Example D320 | 2 | 60 | ○ | ○ | ○ | ○ |
| Test Example D321 | 4 | 50 | ○ | ○ | ○ | ○ |
| Test Example D322 | 8 | 90 | ○ | ○ | ○ | ○ |
| Test Example D323 | 50 | 510 | ○ | ○ | ○ | ○ |
| Test Example D324 | 0.1 | 110 | ○ | ○ | ○ | ○ |
| Test Example D325 | 1 | 200 | ○ | ○ | ○ | ○ |

TABLE 34

| | Alloy composition (As, Bi, Pb, Sb: mass ppm, Ag, Cu: % by mass) | | | | | | | | | | Formula | Formula |
|---|---|---|---|---|---|---|---|---|---|---|---|---|
| | Sn | Ag | Cu | As | Bi | Pb | Sb | Ni | Fe | In | (3) | (4) |
| Test Example D326 | Bal. | 2 | 0.5 | 18 | 150 | 300 | 150 | 600 | 80 | | 654 | 45.3 |
| Test Example D327 | Bal. | 2 | 0.5 | 18 | 150 | 300 | 150 | | | 20 | 654 | 45.3 |
| Test Example D328 | Bal. | 2 | 0.5 | 18 | 150 | 300 | 150 | | | 100 | 654 | 45.3 |
| Test Example D329 | Bal. | 2 | 0.5 | 18 | 150 | 300 | 150 | | | 1200 | 654 | 45.3 |
| Test Example D330 | Bal. | 2 | 0.5 | 18 | 150 | 300 | 150 | 40 | 20 | 20 | 654 | 45.3 |
| Test Example D331 | Bal. | 2 | 0.5 | 18 | 150 | 300 | 150 | 100 | 50 | 50 | 654 | 45.3 |
| Test Example D332 | Bal. | 2 | 0.5 | 18 | 150 | 300 | 150 | 500 | 50 | 30 | 654 | 45.3 |
| Test Example D333 | Bal. | 3 | 0.5 | 18 | 82 | 82 | 82 | | | | 300 | 82.9 |

TABLE 34-continued

| | | | | | | | | | | |
|---|---|---|---|---|---|---|---|---|---|---|
| Test Example D334 | Bal. | 3 | 0.5 | 18 | 50 | 150 | 150 | | 404 | 102.0 |
| Test Example D335 | Bal. | 3 | 0.5 | 18 | 150 | 300 | 50 | | 554 | 23.1 |
| Test Example D336 | Bal. | 3 | 0.5 | 18 | 150 | 50 | 150 | | 404 | 102.0 |
| Test Example D337 | Bal. | 3 | 0.5 | 18 | 123 | 0 | 123 | | 300 | 143.9 |
| Test Example D338 | Bal. | 3 | 0.5 | 18 | 0 | 123 | 123 | | 300 | 143.9 |
| Test Example D339 | Bal. | 3 | 0.5 | 18 | 150 | 300 | 150 | | 654 | 45.3 |
| Test Example D340 | Bal. | 3 | 0.5 | 18 | 300 | 300 | 300 | | 954 | 59.0 |
| Test Example D341 | Bal. | 3 | 0.5 | 18 | 300 | 1000 | 1000 | | 2354 | 81.1 |
| Test Example D342 | Bal. | 3 | 0.5 | 18 | 1000 | 300 | 1000 | | 2354 | 81.1 |
| Test Example D343 | Bal. | 3 | 0.5 | 18 | 1000 | 1000 | 1000 | | 3054 | 52.7 |
| Test Example D344 | Bal. | 3 | 0.5 | 10 | 10000 | 5100 | 3000 | | 18130 | 20.1 |
| Test Example D345 | Bal. | 3 | 0.5 | 10 | 10000 | 5100 | 0 | | 15130 | 0.2 |
| Test Example D346 | Bal. | 3 | 0.5 | 10 | 10000 | 0 | 1000 | | 11030 | 10.3 |
| Test Example D347 | Bal. | 3 | 0.5 | 10 | 0 | 5100 | 1000 | | 6130 | 20.2 |
| Test Example D348 | Bal. | 3 | 0.5 | 10 | 150 | 300 | 150 | | 630 | 40.0 |
| Test Example D349 | Bal. | 3 | 0.5 | 14 | 86 | 86 | 86 | | 300 | 74.4 |
| Test Example D350 | Bal. | 3 | 0.5 | 14 | 50 | 150 | 150 | | 392 | 96.0 |

| | Formula (5) | Formula (6) | Evaluation items | | | |
|---|---|---|---|---|---|---|
| | | | Change over time | ΔT | Wettability | Comprehensive evaluation |
| Test Example D326 | 7.5 | 680 | ○ | ○ | ○ | ○ |
| Test Example D327 | — | 0 | ○ | ○ | ○ | ○ |
| Test Example D328 | — | 0 | ○ | ○ | ○ | ○ |
| Test Example D329 | — | 0 | ○ | ○ | ○ | ○ |
| Test Example D330 | 2 | 60 | ○ | ○ | ○ | ○ |
| Test Example D331 | 2 | 150 | ○ | ○ | ○ | ○ |
| Test Example D332 | 10 | 550 | ○ | ○ | ○ | ○ |
| Test Example D333 | — | 0 | ○ | ○ | ○ | ○ |
| Test Example D334 | — | 0 | ○ | ○ | ○ | ○ |
| Test Example D335 | — | 0 | ○ | ○ | ○ | ○ |
| Test Example D336 | — | 0 | ○ | ○ | ○ | ○ |
| Test Example D337 | — | 0 | ○ | ○ | ○ | ○ |
| Test Example D338 | — | 0 | ○ | ○ | ○ | ○ |
| Test Example D339 | — | 0 | ○ | ○ | ○ | ○ |
| Test Example D340 | — | 0 | ○ | ○ | ○ | ○ |
| Test Example D341 | — | 0 | ○ | ○ | ○ | ○ |
| Test Example D342 | — | 0 | ○ | ○ | ○ | ○ |
| Test Example D343 | — | 0 | ○ | ○ | ○ | ○ |
| Test Example D344 | — | 0 | ○ | ○ | ○ | ○ |
| Test Example D345 | — | 0 | ○ | ○ | ○ | ○ |
| Test Example D346 | — | 0 | ○ | ○ | ○ | ○ |
| Test Example D347 | — | 0 | ○ | ○ | ○ | ○ |
| Test Example D348 | — | 0 | ○ | ○ | ○ | ○ |
| Test Example D349 | — | 0 | ○ | ○ | ○ | ○ |
| Test Example D350 | — | 0 | ○ | ○ | ○ | ○ |

TABLE 35

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D351 | Bal. | 3 | 0.5 | 14 | 150 | 300 | 50 | | | | 542 | 20.4 | — | 0 | ○ | ○ | ○ | ○ |
| Test Example D352 | Bal. | 3 | 0.5 | 14 | 150 | 50 | 150 | | | | 392 | 96.0 | — | 0 | ○ | ○ | ○ | ○ |
| Test Example D353 | Bal. | 3 | 0.5 | 14 | 200 | 0 | 200 | | | | 442 | 121.0 | — | 0 | ○ | ○ | ○ | ○ |
| Test Example D354 | Bal. | 3 | 0.5 | 14 | 0 | 200 | 200 | | | | 442 | 121.0 | — | 0 | ○ | ○ | ○ | ○ |
| Test Example D355 | Bal. | 3 | 0.5 | 14 | 150 | 300 | 150 | | | | 642 | 42.7 | — | 0 | ○ | ○ | ○ | ○ |
| Test Example D356 | Bal. | 3 | 0.5 | 14 | 300 | 300 | 300 | | | | 942 | 57.0 | — | 0 | ○ | ○ | ○ | ○ |
| Test Example D357 | Bal. | 3 | 0.5 | 14 | 300 | 1000 | 1000 | | | | 2342 | 80.2 | — | 0 | ○ | ○ | ○ | ○ |
| Test Example D358 | Bal. | 3 | 0.5 | 14 | 1000 | 300 | 1000 | | | | 2342 | 80.2 | — | 0 | ○ | ○ | ○ | ○ |
| Test Example D359 | Bal. | 3 | 0.5 | 14 | 1000 | 1000 | 1000 | | | | 3042 | 52.1 | — | 0 | ○ | ○ | ○ | ○ |
| Test Example D360 | Bal. | 3 | 0.5 | 14 | 10000 | 5100 | 3000 | | | | 18142 | 20.1 | — | 0 | ○ | ○ | ○ | ○ |
| Test Example D361 | Bal. | 3 | 0.5 | 14 | 10000 | 5100 | 0 | | | | 15142 | 0.3 | — | 0 | ○ | ○ | ○ | ○ |
| Test Example D362 | Bal. | 3 | 0.5 | 14 | 10000 | 0 | 1000 | | | | 11042 | 10.4 | — | 0 | ○ | ○ | ○ | ○ |
| Test Example D363 | Bal. | 3 | 0.5 | 14 | 0 | 5100 | 1000 | | | | 6142 | 20.4 | — | 0 | ○ | ○ | ○ | ○ |
| Test Example D364 | Bal. | 3 | 0.5 | 14 | 150 | 300 | 150 | | | | 642 | 42.7 | — | 0 | ○ | ○ | ○ | ○ |
| Test Example D365 | Bal. | 3 | 0.5 | 24 | 82 | 82 | 82 | | | | 318 | 93.9 | — | 0 | ○ | ○ | ○ | ○ |
| Test Example D366 | Bal. | 3 | 0.5 | 24 | 50 | 150 | 150 | | | | 422 | 111.0 | — | 0 | ○ | ○ | ○ | ○ |
| Test Example D367 | Bal. | 3 | 0.5 | 24 | 150 | 300 | 50 | | | | 572 | 27.1 | — | 0 | ○ | ○ | ○ | ○ |
| Test Example D368 | Bal. | 3 | 0.5 | 24 | 150 | 50 | 150 | | | | 422 | 111.0 | — | 0 | ○ | ○ | ○ | ○ |

TABLE 35-continued

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D369 | Bal. | 3 | 0.5 | 24 | 123 | 0 | 123 | | | | 318 | 158.5 | — | 0 | ○ | ○ | ○ | ○ |
| Test Example D370 | Bal. | 3 | 0.5 | 24 | 0 | 123 | 123 | | | | 318 | 158.5 | — | 0 | ○ | ○ | ○ | ○ |
| Test Example D371 | Bal. | 3 | 0.5 | 24 | 150 | 300 | 150 | | | | 672 | 49.3 | — | 0 | ○ | ○ | ○ | ○ |
| Test Example D372 | Bal. | 3 | 0.5 | 24 | 300 | 300 | 300 | | | | 972 | 62.0 | — | 0 | ○ | ○ | ○ | ○ |
| Test Example D373 | Bal. | 3 | 0.5 | 24 | 300 | 1000 | 1000 | | | | 2372 | 82.5 | — | 0 | ○ | ○ | ○ | ○ |
| Test Example D374 | Bal. | 3 | 0.5 | 24 | 1000 | 300 | 1000 | | | | 2372 | 82.5 | — | 0 | ○ | ○ | ○ | ○ |
| Test Example D375 | Bal. | 3 | 0.5 | 24 | 1000 | 1000 | 1000 | | | | 3072 | 53.6 | — | 0 | ○ | ○ | ○ | ○ |

TABLE 36

| | Alloy composition (As, Bi, Pb, Sb: mass ppm, Ag, Cu: % by mass) | | | | | | | | | | Formula (3) | Formula (4) | Formula (5) | Formula (6) | Evaluation items | | |
|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wettability | Comprehensive evaluation |
| Test Example D376 | Bal. | 3 | 0.5 | 24 | 10000 | 5100 | 3000 | | | | 18172 | 20.3 | — | 0 | ○ | ○ | ○ | ○ |
| Test Example D377 | Bal. | 3 | 0.5 | 24 | 10000 | 5100 | 0 | | | | 15172 | 0.5 | — | 0 | ○ | ○ | ○ | ○ |
| Test Example D378 | Bal. | 3 | 0.5 | 24 | 10000 | 0 | 1000 | | | | 11072 | 10.7 | — | 0 | ○ | ○ | ○ | ○ |
| Test Example D379 | Bal. | 3 | 0.5 | 24 | 0 | 5100 | 1000 | | | | 6172 | 21.0 | — | 0 | ○ | ○ | ○ | ○ |
| Test Example D380 | Bal. | 3 | 0.5 | 24 | 150 | 300 | 150 | | | | 672 | 49.3 | — | 0 | ○ | ○ | ○ | ○ |
| Test Example D381 | Bal. | 3 | 0.5 | 38 | 82 | 82 | 82 | | | | 360 | 119.5 | — | 0 | ○ | ○ | ○ | ○ |
| Test Example D382 | Bal. | 3 | 0.5 | 38 | 50 | 150 | 150 | | | | 464 | 132.0 | — | 0 | ○ | ○ | ○ | ○ |
| Test Example D383 | Bal. | 3 | 0.5 | 38 | 150 | 300 | 50 | | | | 614 | 36.4 | — | 0 | ○ | ○ | ○ | ○ |
| Test Example D384 | Bal. | 3 | 0.5 | 38 | 150 | 50 | 150 | | | | 464 | 132.0 | — | 0 | ○ | ○ | ○ | ○ |
| Test Example D385 | Bal. | 3 | 0.5 | 38 | 123 | 0 | 123 | | | | 360 | 192.7 | — | 0 | ○ | ○ | ○ | ○ |
| Test Example D386 | Bal. | 3 | 0.5 | 38 | 0 | 123 | 123 | | | | 360 | 192.7 | — | 0 | ○ | ○ | ○ | ○ |
| Test Example D387 | Bal. | 3 | 0.5 | 38 | 150 | 300 | 150 | | | | 714 | 58.7 | — | 0 | ○ | ○ | ○ | ○ |
| Test Example D388 | Bal. | 3 | 0.5 | 38 | 300 | 300 | 300 | | | | 1014 | 69.0 | — | 0 | ○ | ○ | ○ | ○ |
| Test Example D389 | Bal. | 3 | 0.5 | 38 | 300 | 1000 | 1000 | | | | 2414 | 85.7 | — | 0 | ○ | ○ | ○ | ○ |
| Test Example D390 | Bal. | 3 | 0.5 | 38 | 1000 | 300 | 1000 | | | | 2414 | 85.7 | — | 0 | ○ | ○ | ○ | ○ |
| Test Example D391 | Bal. | 3 | 0.5 | 38 | 1000 | 1000 | 1000 | | | | 3114 | 55.7 | — | 0 | ○ | ○ | ○ | ○ |
| Test Example D392 | Bal. | 3 | 0.5 | 38 | 10000 | 5100 | 3000 | | | | 18214 | 20.6 | — | 0 | ○ | ○ | ○ | ○ |
| Test Example D393 | Bal. | 3 | 0.5 | 38 | 10000 | 5100 | 0 | | | | 15214 | 0.8 | — | 0 | ○ | ○ | ○ | ○ |
| Test Example D394 | Bal. | 3 | 0.5 | 38 | 10000 | 0 | 1000 | | | | 11114 | 11.1 | — | 0 | ○ | ○ | ○ | ○ |
| Test Example D395 | Bal. | 3 | 0.5 | 38 | 0 | 5100 | 1000 | | | | 6214 | 21.8 | — | 0 | | | | |
| Test Example D396 | Bal. | 3 | 0.5 | 38 | 150 | 300 | 150 | | | | 714 | 58.7 | — | 0 | | | | |
| Test Example D397 | Bal. | 3 | 0.5 | 18 | 150 | 300 | 150 | 40 | | | 654 | 45.3 | — | 0 | | | | |
| Test Example D398 | Bal. | 3 | 0.5 | 18 | 150 | 300 | 150 | 100 | | | 654 | 45.3 | — | 0 | | | | |
| Test Example D399 | Bal. | 3 | 0.5 | 18 | 150 | 300 | 150 | 500 | | | 654 | 45.3 | — | 0 | | | | |
| Test Example D400 | Bal. | 3 | 0.5 | 18 | 150 | 300 | 150 | 600 | | | 654 | 45.3 | — | 0 | | | | |

TABLE 36-continued

| | | | | | | |
|---|---|---|---|---|---|---|
| Test Example D395 | — | 0 | ○ | ○ | ○ | ○ |
| Test Example D396 | — | 0 | ○ | ○ | ○ | ○ |
| Test Example D397 | — | 40 | ○ | ○ | ○ | ○ |
| Test Example D398 | — | 100 | ○ | ○ | ○ | ○ |
| Test Example D399 | — | 500 | ○ | ○ | ○ | ○ |
| Test Example D400 | — | 600 | ○ | ○ | ○ | ○ |

TABLE 37

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D401 | Bal. | 3 | 0.5 | 18 | 150 | 300 | 150 | | | 20 | 654 | 45.3 | 0 | 20 | ○ | ○ | ○ | ○ |
| Test Example D402 | Bal. | 3 | 0.5 | 18 | 150 | 300 | 150 | | | 100 | 654 | 45.3 | 0 | 100 | ○ | ○ | ○ | ○ |
| Test Example D403 | Bal. | 3 | 0.5 | 18 | 150 | 300 | 150 | 40 | | 20 | 654 | 45.3 | 2 | 60 | ○ | ○ | ○ | ○ |
| Test Example D404 | Bal. | 3 | 0.5 | 18 | 150 | 300 | 150 | 40 | | 10 | 654 | 45.3 | 4 | 50 | ○ | ○ | ○ | ○ |
| Test Example D405 | Bal. | 3 | 0.5 | 18 | 150 | 300 | 150 | 80 | | 10 | 654 | 45.3 | 8 | 90 | ○ | ○ | ○ | ○ |
| Test Example D406 | Bal. | 3 | 0.5 | 18 | 150 | 300 | 150 | 500 | | 10 | 654 | 45.3 | 50 | 510 | ○ | ○ | ○ | ○ |
| Test Example D407 | Bal. | 3 | 0.5 | 18 | 150 | 300 | 150 | 10 | | 100 | 654 | 45.3 | 0.1 | 110 | ○ | ○ | ○ | ○ |
| Test Example D408 | Bal. | 3 | 0.5 | 18 | 150 | 300 | 150 | 100 | | 100 | 654 | 45.3 | 1 | 200 | ○ | ○ | ○ | ○ |
| Test Example D409 | Bal. | 3 | 0.5 | 18 | 150 | 300 | 150 | 600 | | 80 | 654 | 45.3 | 7.5 | 680 | ○ | ○ | ○ | ○ |
| Test Example D410 | Bal. | 3 | 0.5 | 18 | 150 | 300 | 150 | | | 20 | 654 | 45.3 | — | 0 | ○ | ○ | ○ | ○ |
| Test Example D411 | Bal. | 3 | 0.5 | 18 | 150 | 300 | 150 | | | 100 | 654 | 45.3 | — | 0 | ○ | ○ | ○ | ○ |
| Test Example D412 | Bal. | 3 | 0.5 | 18 | 150 | 300 | 150 | | | 1200 | 654 | 45.3 | — | 0 | ○ | ○ | ○ | ○ |
| Test Example D413 | Bal. | 3 | 0.5 | 18 | 150 | 300 | 150 | 40 | 20 | 20 | 654 | 45.3 | 2 | 60 | ○ | ○ | ○ | ○ |
| Test Example D414 | Bal. | 3 | 0.5 | 18 | 150 | 300 | 150 | 100 | 50 | 50 | 654 | 45.3 | 2 | 150 | ○ | ○ | ○ | ○ |
| Test Example D415 | Bal. | 3 | 0.5 | 18 | 150 | 300 | 150 | 500 | 50 | 30 | 654 | 45.3 | 10 | 550 | ○ | ○ | ○ | ○ |
| Test Example D416 | Bal. | 3.5 | 0.5 | 18 | 82 | 82 | 82 | | | | 300 | 82.9 | — | 0 | ○ | ○ | ○ | ○ |
| Test Example D417 | Bal. | 3.5 | 0.5 | 18 | 50 | 150 | 150 | | | | 404 | 102.0 | — | 0 | ○ | ○ | ○ | ○ |
| Test Example D418 | Bal. | 3.5 | 0.5 | 18 | 150 | 300 | 50 | | | | 554 | 23.1 | — | 0 | ○ | ○ | ○ | ○ |
| Test Example D419 | Bal. | 3.5 | 0.5 | 18 | 150 | 50 | 150 | | | | 404 | 102.0 | — | 0 | ○ | ○ | ○ | ○ |
| Test Example D420 | Bal. | 3.5 | 0.5 | 18 | 123 | 0 | 123 | | | | 300 | 143.9 | — | 0 | ○ | ○ | ○ | ○ |
| Test Example D421 | Bal. | 3.5 | 0.5 | 18 | 0 | 123 | 123 | | | | 300 | 143.9 | — | 0 | ○ | ○ | ○ | ○ |
| Test Example D422 | Bal. | 3.5 | 0.5 | 18 | 150 | 300 | 150 | | | | 654 | 45.3 | — | 0 | ○ | ○ | ○ | ○ |
| Test Example D423 | Bal. | 3.5 | 0.5 | 18 | 300 | 300 | 300 | | | | 954 | 59.0 | — | 0 | ○ | ○ | ○ | ○ |
| Test Example D424 | Bal. | 3.5 | 0.5 | 18 | 300 | 1000 | 1000 | | | | 2354 | 81.1 | — | 0 | ○ | ○ | ○ | ○ |
| Test Example D425 | Bal. | 3.5 | 0.5 | 18 | 1000 | 300 | 1000 | | | | 2354 | 81.1 | — | 0 | ○ | ○ | ○ | ○ |

TABLE 38

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D426 | Bal. | 3.5 | 0.5 | 18 | 1000 | 1000 | 1000 | | | | 3054 | 52.7 | — | 0 | ○ | ○ | ○ | ○ |
| Test Example D427 | Bal. | 3.5 | 0.5 | 10 | 10000 | 5100 | 3000 | | | | 18130 | 20.1 | — | 0 | ○ | ○ | ○ | ○ |
| Test Example D428 | Bal. | 3.5 | 0.5 | 10 | 10000 | 5100 | 0 | | | | 15130 | 0.2 | — | 0 | ○ | ○ | ○ | ○ |
| Test Example D429 | Bal. | 3.5 | 0.5 | 10 | 10000 | 0 | 1000 | | | | 11030 | 10.3 | — | 0 | ○ | ○ | ○ | ○ |
| Test Example D430 | Bal. | 3.5 | 0.5 | 10 | 0 | 5100 | 1000 | | | | 6130 | 20.2 | — | 0 | ○ | ○ | ○ | ○ |
| Test Example D431 | Bal. | 3.5 | 0.5 | 10 | 150 | 300 | 150 | | | | 630 | 40.0 | — | 0 | ○ | ○ | ○ | ○ |
| Test Example D432 | Bal. | 3.5 | 0.5 | 14 | 86 | 86 | 86 | | | | 300 | 74.4 | — | 0 | ○ | ○ | ○ | ○ |
| Test Example D433 | Bal. | 3.5 | 0.5 | 14 | 50 | 150 | 150 | | | | 392 | 96.0 | — | 0 | ○ | ○ | ○ | ○ |
| Test Example D434 | Bal. | 3.5 | 0.5 | 14 | 150 | 300 | 50 | | | | 542 | 20.4 | — | 0 | ○ | ○ | ○ | ○ |
| Test Example D435 | Bal. | 3.5 | 0.5 | 14 | 150 | 50 | 150 | | | | 392 | 96.0 | — | 0 | ○ | ○ | ○ | ○ |
| Test Example D436 | Bal. | 3.5 | 0.5 | 14 | 200 | 0 | 200 | | | | 442 | 121.0 | — | 0 | ○ | ○ | ○ | ○ |
| Test Example D437 | Bal. | 3.5 | 0.5 | 14 | 0 | 200 | 200 | | | | 442 | 121.0 | — | 0 | ○ | ○ | ○ | ○ |
| Test Example D438 | Bal. | 3.5 | 0.5 | 14 | 150 | 300 | 150 | | | | 642 | 42.7 | — | 0 | ○ | ○ | ○ | ○ |
| Test Example D439 | Bal. | 3.5 | 0.5 | 14 | 300 | 300 | 300 | | | | 942 | 57.0 | — | 0 | ○ | ○ | ○ | ○ |
| Test Example D440 | Bal. | 3.5 | 0.5 | 14 | 300 | 1000 | 1000 | | | | 2342 | 80.2 | — | 0 | ○ | ○ | ○ | ○ |
| Test Example D441 | Bal. | 3.5 | 0.5 | 14 | 1000 | 300 | 1000 | | | | 2342 | 80.2 | — | 0 | ○ | ○ | ○ | ○ |
| Test Example D442 | Bal. | 3.5 | 0.5 | 14 | 1000 | 1000 | 1000 | | | | 3042 | 52.1 | — | 0 | ○ | ○ | ○ | ○ |
| Test Example D443 | Bal. | 3.5 | 0.5 | 14 | 10000 | 5100 | 3000 | | | | 18142 | 20.1 | — | 0 | ○ | ○ | ○ | ○ |
| Test Example D444 | Bal. | 3.5 | 0.5 | 14 | 10000 | 5100 | 0 | | | | 15142 | 0.3 | — | 0 | ○ | ○ | ○ | ○ |
| Test Example D445 | Bal. | 3.5 | 0.5 | 14 | 10000 | 0 | 1000 | | | | 11042 | 10.4 | — | 0 | ○ | ○ | ○ | ○ |

TABLE 38-continued

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D446 | Bal. | 3.5 | 0.5 | 14 | 0 | 5100 | 1000 | | | | 6142 | 20.4 | — | 0 | ○ | ○ | ○ | ○ |
| Test Example D447 | Bal. | 3.5 | 0.5 | 14 | 150 | 300 | 150 | | | | 642 | 42.7 | — | 0 | ○ | ○ | ○ | ○ |
| Test Example D448 | Bal. | 3.5 | 0.5 | 24 | 82 | 82 | 82 | | | | 318 | 93.9 | — | 0 | ○ | ○ | ○ | ○ |
| Test Example D449 | Bal. | 3.5 | 0.5 | 24 | 50 | 150 | 150 | | | | 422 | 111.0 | — | 0 | ○ | ○ | ○ | ○ |
| Test Example D450 | Bal. | 3.5 | 0.5 | 24 | 150 | 300 | 50 | | | | 572 | 27.1 | — | 0 | ○ | ○ | ○ | ○ |

TABLE 39

| | Alloy composition (As, Bi, Pb, Sb: mass ppm, Ag, Cu: % by mass) | | | | | | | | | | Formula (3) | Formula (4) | Formula (5) | Formula (6) | Evaluation items | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Compre-hensive evaluation |
| Test Example D451 | Bal. | 3.5 | 0.5 | 24 | 150 | 50 | 150 | | | | 422 | 111.0 | — | 0 | ○ | ○ | ○ | ○ |
| Test Example D452 | Bal. | 3.5 | 0.5 | 24 | 123 | 0 | 123 | | | | 318 | 158.5 | — | 0 | ○ | ○ | ○ | ○ |
| Test Example D453 | Bal. | 3.5 | 0.5 | 24 | 0 | 123 | 123 | | | | 318 | 158.5 | — | 0 | ○ | ○ | ○ | ○ |
| Test Example D454 | Bal. | 3.5 | 0.5 | 24 | 150 | 300 | 150 | | | | 672 | 49.3 | — | 0 | ○ | ○ | ○ | ○ |
| Test Example D455 | Bal. | 3.5 | 0.5 | 24 | 300 | 300 | 300 | | | | 972 | 62.0 | — | 0 | ○ | ○ | ○ | ○ |
| Test Example D456 | Bal. | 3.5 | 0.5 | 24 | 300 | 1000 | 1000 | | | | 2372 | 82.5 | — | 0 | ○ | ○ | ○ | ○ |
| Test Example D457 | Bal. | 3.5 | 0.5 | 24 | 1000 | 300 | 1000 | | | | 2372 | 82.5 | — | 0 | ○ | ○ | ○ | ○ |
| Test Example D458 | Bal. | 3.5 | 0.5 | 24 | 1000 | 1000 | 1000 | | | | 3072 | 53.6 | — | 0 | ○ | ○ | ○ | ○ |
| Test Example D459 | Bal. | 3.5 | 0.5 | 24 | 10000 | 5100 | 3000 | | | | 18172 | 20.3 | — | 0 | ○ | ○ | ○ | ○ |
| Test Example D460 | Bal. | 3.5 | 0.5 | 24 | 10000 | 5100 | 0 | | | | 15172 | 0.5 | — | 0 | ○ | ○ | ○ | ○ |
| Test Example D461 | Bal. | 3.5 | 0.5 | 24 | 10000 | 0 | 1000 | | | | 11072 | 10.7 | — | 0 | ○ | ○ | ○ | ○ |
| Test Example D462 | Bal. | 3.5 | 0.5 | 24 | 0 | 5100 | 1000 | | | | 6172 | 21.0 | — | 0 | ○ | ○ | ○ | ○ |
| Test Example D463 | Bal. | 3.5 | 0.5 | 24 | 150 | 300 | 150 | | | | 672 | 49.3 | — | 0 | ○ | ○ | ○ | ○ |
| Test Example D464 | Bal. | 3.5 | 0.5 | 38 | 82 | 82 | 82 | | | | 360 | 119.5 | — | 0 | ○ | ○ | ○ | ○ |
| Test Example D465 | Bal. | 3.5 | 0.5 | 38 | 50 | 150 | 150 | | | | 464 | 132.0 | — | 0 | ○ | ○ | ○ | ○ |
| Test Example D466 | Bal. | 3.5 | 0.5 | 38 | 150 | 300 | 50 | | | | 614 | 36.4 | — | 0 | ○ | ○ | ○ | ○ |
| Test Example D467 | Bal. | 3.5 | 0.5 | 38 | 150 | 50 | 150 | | | | 464 | 132.0 | — | 0 | ○ | ○ | ○ | ○ |
| Test Example D468 | Bal. | 3.5 | 0.5 | 38 | 123 | 0 | 123 | | | | 360 | 192.7 | — | 0 | ○ | ○ | ○ | ○ |
| Test Example D469 | Bal. | 3.5 | 0.5 | 38 | 0 | 123 | 123 | | | | 360 | 192.7 | — | 0 | ○ | ○ | ○ | ○ |
| Test Example D470 | Bal. | 3.5 | 0.5 | 38 | 150 | 300 | 150 | | | | 714 | 58.7 | — | 0 | ○ | ○ | ○ | ○ |
| Test Example D471 | Bal. | 3.5 | 0.5 | 38 | 300 | 300 | 300 | | | | 1014 | 69.0 | — | 0 | ○ | ○ | ○ | ○ |
| Test Example D472 | Bal. | 3.5 | 0.5 | 38 | 300 | 1000 | 1000 | | | | 2414 | 85.7 | — | 0 | ○ | ○ | ○ | ○ |
| Test Example D473 | Bal. | 3.5 | 0.5 | 38 | 1000 | 300 | 1000 | | | | 2414 | 85.7 | — | 0 | ○ | ○ | ○ | ○ |
| Test Example D474 | Bal. | 3.5 | 0.5 | 38 | 1000 | 1000 | 1000 | | | | 3114 | 55.7 | — | 0 | ○ | ○ | ○ | ○ |
| Test Example D475 | Bal. | 3.5 | 0.5 | 38 | 10000 | 5100 | 3000 | | | | 18214 | 20.6 | — | 0 | ○ | ○ | ○ | ○ |

TABLE 40

| | Alloy composition (As, Bi, Pb, Sb: mass ppm, Ag, Cu: % by mass) | | | | | | | | | | Formula (3) | Formula (4) |
|---|---|---|---|---|---|---|---|---|---|---|---|---|
| | Sn | Ag | Cu | As | Bi | Pb | Sb | Ni | Fe | In | | |
| Test Example D476 | Bal. | 3.5 | 0.5 | 38 | 10000 | 5100 | 0 | | | | 15214 | 0.8 |
| Test Example D477 | Bal. | 3.5 | 0.5 | 38 | 10000 | 0 | 1000 | | | | 11114 | 11.1 |
| Test Example D478 | Bal. | 3.5 | 0.5 | 38 | 0 | 5100 | 1000 | | | | 6214 | 21.8 |
| Test Example D479 | Bal. | 3.5 | 0.5 | 38 | 150 | 300 | 150 | | | | 714 | 58.7 |
| Test Example D480 | Bal. | 3.5 | 0.5 | 18 | 150 | 300 | 150 | 40 | | | 654 | 45.3 |
| Test Example D481 | Bal. | 3.5 | 0.5 | 18 | 150 | 300 | 150 | 100 | | | 654 | 45.3 |
| Test Example D482 | Bal. | 3.5 | 0.5 | 18 | 150 | 300 | 150 | 500 | | | 654 | 45.3 |
| Test Example D483 | Bal. | 3.5 | 0.5 | 18 | 150 | 300 | 150 | 600 | | | 654 | 45.3 |
| Test Example D484 | Bal. | 3.5 | 0.5 | 18 | 150 | 300 | 150 | | 20 | | 654 | 45.3 |
| Test Example D485 | Bal. | 3.5 | 0.5 | 18 | 150 | 300 | 150 | | 100 | | 654 | 45.3 |
| Test Example D486 | Bal. | 3.5 | 0.5 | 18 | 150 | 300 | 150 | 40 | 20 | | 654 | 45.3 |
| Test Example D487 | Bal. | 3.5 | 0.5 | 18 | 150 | 300 | 150 | 40 | 10 | | 654 | 45.3 |
| Test Example D488 | Bal. | 3.5 | 0.5 | 18 | 150 | 300 | 150 | 80 | 10 | | 654 | 45.3 |
| Test Example D489 | Bal. | 3.5 | 0.5 | 18 | 150 | 300 | 150 | 500 | 10 | | 654 | 45.3 |
| Test Example D490 | Bal. | 3.5 | 0.5 | 18 | 150 | 300 | 150 | 10 | 100 | | 654 | 45.3 |
| Test Example D491 | Bal. | 3.5 | 0.5 | 18 | 150 | 300 | 150 | 100 | 100 | | 654 | 45.3 |
| Test Example D492 | Bal. | 3.5 | 0.5 | 18 | 150 | 300 | 150 | 600 | 80 | | 654 | 45.3 |
| Test Example D493 | Bal. | 3.5 | 0.5 | 18 | 150 | 300 | 150 | | | 20 | 654 | 45.3 |

TABLE 40-continued

| | | | | | | | | | | | | |
|---|---|---|---|---|---|---|---|---|---|---|---|---|
| Test Example D494 | Bal. | 3.5 | 0.5 | 18 | 150 | 300 | 150 | | | 100 | 654 | 45.3 |
| Test Example D495 | Bal. | 3.5 | 0.5 | 18 | 150 | 300 | 150 | | | 1200 | 654 | 45.3 |
| Test Example D496 | Bal. | 3.5 | 0.5 | 18 | 150 | 300 | 150 | 40 | 20 | 20 | 654 | 45.3 |
| Test Example D497 | Bal. | 3.5 | 0.5 | 18 | 150 | 300 | 150 | 100 | 50 | 50 | 654 | 45.3 |
| Test Example D498 | Bal. | 3.5 | 0.5 | 18 | 150 | 300 | 150 | 500 | 50 | 30 | 654 | 45.3 |

| | | | Evaluation items | | | |
|---|---|---|---|---|---|---|
| | Formula (5) | Formula (6) | Change over time | ΔT | Wettability | Comprehensive evaluation |
| Test Example D476 | — | 0 | ○ | ○ | ○ | ○ |
| Test Example D477 | — | 0 | ○ | ○ | ○ | ○ |
| Test Example D478 | — | 0 | ○ | ○ | ○ | ○ |
| Test Example D479 | — | 0 | ○ | ○ | ○ | ○ |
| Test Example D480 | — | 40 | ○ | ○ | ○ | ○ |
| Test Example D481 | — | 100 | ○ | ○ | ○ | ○ |
| Test Example D482 | — | 500 | ○ | ○ | ○ | ○ |
| Test Example D483 | — | 600 | ○ | ○ | ○ | ○ |
| Test Example D484 | 0 | 20 | ○ | ○ | ○ | ○ |
| Test Example D485 | 0 | 100 | ○ | ○ | ○ | ○ |
| Test Example D486 | 2 | 60 | ○ | ○ | ○ | ○ |
| Test Example D487 | 4 | 50 | ○ | ○ | ○ | ○ |
| Test Example D488 | 8 | 90 | ○ | ○ | ○ | ○ |
| Test Example D489 | 50 | 510 | ○ | ○ | ○ | ○ |
| Test Example D490 | 0.1 | 110 | ○ | ○ | ○ | ○ |
| Test Example D491 | 1 | 200 | ○ | ○ | ○ | ○ |
| Test Example D492 | 7.5 | 680 | ○ | ○ | ○ | ○ |
| Test Example D493 | — | 0 | ○ | ○ | ○ | ○ |
| Test Example D494 | — | 0 | ○ | ○ | ○ | ○ |
| Test Example D495 | — | 0 | ○ | ○ | ○ | ○ |
| Test Example D496 | 2 | 60 | ○ | ○ | ○ | ○ |
| Test Example D497 | 2 | 150 | ○ | ○ | ○ | ○ |
| Test Example D498 | 10 | 550 | ○ | ○ | ○ | ○ |

TABLE 41

| | Alloy composition (As, Bi, Pb, Sb: mass ppm, Ag, Cu: % by mass) | | | | | | | | | Formula (3) | Formula (4) |
|---|---|---|---|---|---|---|---|---|---|---|---|
| | Sn | Ag | Cu | As | Bi | Pb | Sb | Ni | Fe | In | | |
| Test Example D501 | Bal. | | | 0 | 100 | 100 | 100 | | | | 300 | 50.0 |
| Test Example D502 | Bal. | | | 18 | 25 | 25 | 25 | | | | 129 | 158.0 |
| Test Example D503 | Bal. | | | 300 | 50 | 50 | 500 | | | | 1500 | 1400.0 |
| Test Example D504 | Bal. | | | 350 | 25 | 25 | 1150 | | | | 2250 | 4400.0 |
| Test Example D505 | Bal. | | | 800 | 100 | 100 | 800 | | | | 3400 | 1600.0 |
| Test Example D506 | Bal. | | | 250 | 1 | 0 | 4800 | | | | 5551 | 555000.0 |
| Test Example D507 | Bal. | | | 800 | 100 | 100 | 3500 | | | | 6100 | 2950.0 |
| Test Example D508 | Bal. | | | 18 | 1 | 0 | 10000 | | | | 10055 | 1005400.0 |
| Test Example D509 | Bal. | | | 18 | 25000 | 25000 | 100 | | | | 50154 | 0.3 |
| Test Example D510 | Bal. | | | 18 | 50000 | 0 | 100 | | | | 50154 | 0.3 |
| Test Example D511 | Bal. | | | 18 | 0 | 50000 | 100 | | | | 50154 | 0.3 |
| Test Example D512 | Bal. | | | 300 | 0 | 0 | 3000 | | | | 3900 | — |
| Test Example D513 | Bal. | | | 100 | 100 | 25000 | 0 | | | | 25400 | 1.2 |
| Test Example D514 | Bal. | | 0.7 | 0 | 100 | 100 | 100 | | | | 300 | 50.0 |
| Test Example D515 | Bal. | | 0.7 | 18 | 25 | 25 | 25 | | | | 129 | 158.0 |
| Test Example D516 | Bal. | | 0.7 | 300 | 50 | 50 | 500 | | | | 1500 | 1400.0 |
| Test Example D517 | Bal. | | 0.7 | 350 | 25 | 25 | 1150 | | | | 2250 | 4400.0 |
| Test Example D518 | Bal. | | 0.7 | 800 | 100 | 100 | 800 | | | | 3400 | 1600.0 |
| Test Example D519 | Bal. | | 0.7 | 250 | 1 | 0 | 4800 | | | | 5551 | 555000.0 |
| Test Example D520 | Bal. | | 0.7 | 800 | 100 | 100 | 3500 | | | | 6100 | 2950.0 |
| Test Example D521 | Bal. | | 0.7 | 18 | 1 | 0 | 10000 | | | | 10055 | 1005400.0 |
| Test Example D522 | Bal. | | 0.7 | 18 | 25000 | 25000 | 100 | | | | 50154 | 0.3 |
| Test Example D523 | Bal. | | 0.7 | 18 | 50000 | 0 | 100 | | | | 50154 | 0.3 |
| Test Example D524 | Bal. | | 0.7 | 18 | 0 | 50000 | 100 | | | | 50154 | 0.3 |
| Test Example D525 | Bal. | | 0.7 | 300 | 0 | 0 | 3000 | | | | 3900 | — |

| | | | Evaluation items | | | |
|---|---|---|---|---|---|---|
| | Formula (5) | Formula (6) | Change over time | ΔT | Wettability | Comprehensive evaluation |
| Test Example D501 | — | 0 | X | ○ | ○ | X |
| Test Example D502 | — | 0 | X | ○ | ○ | X |
| Test Example D503 | — | 0 | ○ | ○ | X | X |
| Test Example D504 | — | 0 | ○ | ○ | X | X |

TABLE 41-continued

| Test Example | | | | | | | |
|---|---|---|---|---|---|---|---|
| Test Example D505 | — | 0 | ○ | ○ | X | X | |
| Test Example D506 | — | 0 | ○ | ○ | X | X | |
| Test Example D507 | — | 0 | ○ | ○ | X | X | |
| Test Example D508 | — | 0 | ○ | ○ | X | X | |
| Test Example D509 | — | 0 | ○ | X | ○ | X | |
| Test Example D510 | — | 0 | ○ | X | ○ | X | |
| Test Example D511 | — | 0 | ○ | X | ○ | X | |
| Test Example D512 | — | 0 | ○ | ○ | X | X | |
| Test Example D513 | — | 0 | ○ | X | ○ | X | |
| Test Example D514 | — | 0 | X | ○ | ○ | X | |
| Test Example D515 | — | 0 | X | ○ | ○ | X | |
| Test Example D516 | — | 0 | ○ | ○ | X | X | |
| Test Example D517 | — | 0 | ○ | ○ | X | X | |
| Test Example D518 | — | 0 | ○ | ○ | X | X | |
| Test Example D519 | — | 0 | ○ | ○ | X | X | |
| Test Example D520 | — | 0 | ○ | ○ | X | X | |
| Test Example D521 | — | 0 | ○ | ○ | X | X | |
| Test Example D522 | — | 0 | ○ | X | ○ | X | |
| Test Example D523 | — | 0 | ○ | X | ○ | X | |
| Test Example D524 | — | 0 | ○ | X | ○ | X | |
| Test Example D525 | — | 0 | ○ | ○ | X | X | |

TABLE 42

| | Alloy composition (As, Bi, Pb, Sb: mass ppm, Ag, Cu: % by mass) | | | | | | | | | | Formula (3) | Formula (4) |
|---|---|---|---|---|---|---|---|---|---|---|---|---|
| | Sn | Ag | Cu | As | Bi | Pb | Sb | Ni | Fe | In | | |
| Test Example D526 | Bal. | | 0.7 | <u>100</u> | 100 | 25000 | 0 | | | | 25400 | 1.2 |
| Test Example D527 | Bal. | 1 | 0.5 | <u>0</u> | 100 | 100 | 100 | | | | 300 | 50.0 |
| Test Example D528 | Bal. | 1 | 0.5 | <u>18</u> | 25 | 25 | 25 | | | | <u>129</u> | 158.0 |
| Test Example D529 | Bal. | 1 | 0.5 | 300 | 50 | 50 | 500 | | | | <u>1500</u> | 1400.0 |
| Test Example D530 | Bal. | 1 | 0.5 | <u>350</u> | 25 | 25 | 1150 | | | | 2250 | <u>4400.0</u> |
| Test Example D531 | Bal. | 1 | 0.5 | <u>800</u> | 100 | 100 | 800 | | | | 3400 | <u>1600.0</u> |
| Test Example D532 | Bal. | 1 | 0.5 | <u>250</u> | 1 | 0 | 4800 | | | | 5551 | <u>555000.0</u> |
| Test Example D533 | Bal. | 1 | 0.5 | <u>800</u> | 100 | 100 | <u>3500</u> | | | | 6100 | <u>2950.0</u> |
| Test Example D534 | Bal. | 1 | 0.5 | <u>18</u> | 1 | 0 | <u>10000</u> | | | | 10055 | <u>1005400.0</u> |
| Test Example D535 | Bal. | 1 | 0.5 | 18 | <u>25000</u> | 25000 | 100 | | | | 50154 | <u>0.3</u> |
| Test Example D536 | Bal. | 1 | 0.5 | 18 | <u>50000</u> | 0 | 100 | | | | 50154 | 0.3 |
| Test Example D537 | Bal. | 1 | 0.5 | 18 | 0 | <u>50000</u> | 100 | | | | 50154 | 0.3 |
| Test Example D538 | Bal. | 1 | 0.5 | 300 | 0 | 0 | 3000 | | | | 3900 | — |
| Test Example D539 | Bal. | 1 | 0.5 | <u>100</u> | <u>100</u> | 25000 | 0 | | | | 25400 | <u>1.2</u> |
| Test Example D540 | Bal. | 2 | 0.5 | <u>0</u> | 100 | 100 | 100 | | | | 300 | 50.0 |
| Test Example D541 | Bal. | 2 | 0.5 | 18 | 25 | 25 | 25 | | | | <u>129</u> | 158.0 |
| Test Example D542 | Bal. | 2 | 0.5 | 300 | 50 | 50 | 500 | | | | <u>1500</u> | 1400.0 |
| Test Example D543 | Bal. | 2 | 0.5 | <u>350</u> | 25 | 25 | 1150 | | | | 2250 | <u>4400.0</u> |
| Test Example D544 | Bal. | 2 | 0.5 | <u>800</u> | 100 | 100 | 800 | | | | 3400 | <u>1600.0</u> |
| Test Example D545 | Bal. | 2 | 0.5 | <u>250</u> | 1 | 0 | 4800 | | | | 5551 | <u>555000.0</u> |
| Test Example D546 | Bal. | 2 | 0.5 | <u>800</u> | 100 | 100 | <u>3500</u> | | | | 6100 | <u>2950.0</u> |
| Test Example D547 | Bal. | 2 | 0.5 | <u>18</u> | 1 | 0 | <u>10000</u> | | | | 10055 | <u>1005400.0</u> |
| Test Example D548 | Bal. | 2 | 0.5 | 18 | <u>25000</u> | 25000 | 100 | | | | 50154 | <u>0.3</u> |
| Test Example D549 | Bal. | 2 | 0.5 | 18 | <u>50000</u> | 0 | 100 | | | | 50154 | 0.3 |
| Test Example D550 | Bal. | 2 | 0.5 | 18 | 0 | <u>50000</u> | 100 | | | | 50154 | 0.3 |

| | | | Evaluation items | | | |
|---|---|---|---|---|---|---|
| | Formula (5) | Formula (6) | Change over time | ΔT | Wettability | Comprehensive evaluation |
| Test Example D526 | — | 0 | ○ | X | ○ | X |
| Test Example D527 | — | 0 | X | ○ | ○ | X |
| Test Example D528 | — | 0 | X | ○ | ○ | X |
| Test Example D529 | — | 0 | ○ | ○ | X | X |
| Test Example D530 | — | 0 | ○ | ○ | X | X |
| Test Example D531 | — | 0 | ○ | ○ | X | X |
| Test Example D532 | — | 0 | ○ | ○ | X | X |
| Test Example D533 | — | 0 | ○ | ○ | X | X |
| Test Example D534 | — | 0 | ○ | ○ | X | X |
| Test Example D535 | — | 0 | ○ | X | ○ | X |
| Test Example D536 | — | 0 | ○ | X | ○ | X |
| Test Example D537 | — | 0 | ○ | X | ○ | X |
| Test Example D538 | — | 0 | ○ | ○ | X | X |
| Test Example D539 | — | 0 | ○ | X | ○ | X |
| Test Example D540 | — | 0 | X | ○ | ○ | X |
| Test Example D541 | — | 0 | X | ○ | ○ | X |
| Test Example D542 | — | 0 | ○ | ○ | X | X |

TABLE 42-continued

| | | | | | | |
|---|---|---|---|---|---|---|
| Test Example D543 | — | 0 | ◯ | ◯ | X | X |
| Test Example D544 | — | 0 | ◯ | ◯ | X | X |
| Test Example D545 | — | 0 | ◯ | ◯ | X | X |
| Test Example D546 | — | 0 | ◯ | ◯ | X | X |
| Test Example D547 | — | 0 | ◯ | ◯ | X | X |
| Test Example D548 | — | 0 | ◯ | X | ◯ | X |
| Test Example D549 | — | 0 | ◯ | X | ◯ | X |
| Test Example D550 | — | 0 | ◯ | X | ◯ | X |

TABLE 43

| | Alloy composition (As, Bi, Pb, Sb: mass ppm, Ag, Cu: % by mass) | | | | | | | | | | Formula | Formula |
|---|---|---|---|---|---|---|---|---|---|---|---|---|
| | Sn | Ag | Cu | As | Bi | Pb | Sb | Ni | Fe | In | (3) | (4) |
| Test Example D551 | Bal. | 2 | 0.5 | 300 | 0 | 0 | 3000 | | | | 3900 | — |
| Test Example D552 | Bal. | 2 | 0.5 | 100 | 100 | 25000 | 0 | | | | 25400 | 1.2 |
| Test Example D553 | Bal. | 3 | 0.5 | 0 | 100 | 100 | 100 | | | | 300 | 50.0 |
| Test Example D554 | Bal. | 3 | 0.5 | 18 | 25 | 25 | 25 | | | | 129 | 158.0 |
| Test Example D555 | Bal. | 3 | 0.5 | 300 | 50 | 50 | 500 | | | | 1500 | 1400.0 |
| Test Example D556 | Bal. | 3 | 0.5 | 350 | 25 | 25 | 1150 | | | | 2250 | 4400.0 |
| Test Example D557 | Bal. | 3 | 0.5 | 800 | 100 | 100 | 800 | | | | 3400 | 1600.0 |
| Test Example D558 | Bal. | 3 | 0.5 | 250 | 1 | 0 | 4800 | | | | 5551 | 555000.0 |
| Test Example D559 | Bal. | 3 | 0.5 | 800 | 100 | 100 | 3500 | | | | 6100 | 2950.0 |
| Test Example D560 | Bal. | 3 | 0.5 | 18 | 1 | 0 | 10000 | | | | 10055 | 1005400.0 |
| Test Example D561 | Bal. | 3 | 0.5 | 18 | 25000 | 25000 | 100 | | | | 50154 | 0.3 |
| Test Example D562 | Bal. | 3 | 0.5 | 18 | 50000 | 0 | 100 | | | | 50154 | 0.3 |
| Test Example D563 | Bal. | 3 | 0.5 | 18 | 0 | 50000 | 100 | | | | 50154 | 0.3 |
| Test Example D564 | Bal. | 3 | 0.5 | 300 | 0 | 0 | 3000 | | | | 3900 | — |
| Test Example D565 | Bal. | 3 | 0.5 | 100 | 100 | 25000 | 0 | | | | 25400 | 1.2 |
| Test Example D566 | Bal. | 3.5 | 0.5 | 0 | 100 | 100 | 100 | | | | 300 | 50.0 |
| Test Example D567 | Bal. | 3.5 | 0.5 | 18 | 25 | 25 | 25 | | | | 129 | 158.0 |
| Test Example D568 | Bal. | 3.5 | 0.5 | 300 | 50 | 50 | 500 | | | | 1500 | 1400.0 |
| Test Example D569 | Bal. | 3.5 | 0.5 | 350 | 25 | 25 | 1150 | | | | 2250 | 4400.0 |
| Test Example D570 | Bal. | 3.5 | 0.5 | 800 | 100 | 100 | 800 | | | | 3400 | 1600.0 |

| | | | Evaluation items | | | |
|---|---|---|---|---|---|---|
| | Formula (5) | Formula (6) | Change over time | ΔT | Wettability | Comprehensive evaluation |
| Test Example D551 | — | 0 | ◯ | ◯ | X | X |
| Test Example D552 | — | 0 | ◯ | X | ◯ | X |
| Test Example D553 | — | 0 | X | ◯ | ◯ | X |
| Test Example D554 | — | 0 | X | ◯ | ◯ | X |
| Test Example D555 | — | 0 | ◯ | ◯ | X | X |
| Test Example D556 | — | 0 | ◯ | ◯ | X | X |
| Test Example D557 | — | 0 | ◯ | ◯ | X | X |
| Test Example D558 | — | 0 | ◯ | ◯ | X | X |
| Test Example D559 | — | 0 | ◯ | ◯ | X | X |
| Test Example D560 | — | 0 | ◯ | ◯ | X | X |
| Test Example D561 | — | 0 | ◯ | X | ◯ | X |
| Test Example D562 | — | 0 | ◯ | X | ◯ | X |
| Test Example D563 | — | 0 | ◯ | X | ◯ | X |
| Test Example D564 | — | 0 | ◯ | ◯ | X | X |
| Test Example D565 | — | 0 | ◯ | X | ◯ | X |
| Test Example D566 | — | 0 | X | ◯ | ◯ | X |
| Test Example D567 | — | 0 | X | ◯ | ◯ | X |
| Test Example D568 | — | 0 | ◯ | ◯ | X | X |
| Test Example D569 | — | 0 | ◯ | ◯ | X | X |
| Test Example D570 | — | 0 | ◯ | ◯ | X | X |

TABLE 44

| | Alloy composition (As, Bi, Pb, Sb: mass ppm, Ag, Cu: % by mass) | | | | | | | | | | Formula | Formula |
|---|---|---|---|---|---|---|---|---|---|---|---|---|
| | Sn | Ag | Cu | As | Bi | Pb | Sb | Ni | Fe | In | (3) | (4) |
| Test Example D571 | Bal. | 3.5 | 0.5 | 250 | 1 | 0 | 4800 | | | | 5551 | 555000.0 |
| Test Example D572 | Bal. | 3.5 | 0.5 | 800 | 100 | 100 | 3500 | | | | 6100 | 2950.0 |
| Test Example D573 | Bal. | 3.5 | 0.5 | 18 | 1 | 0 | 10000 | | | | 10055 | 1005400.0 |

TABLE 44-continued

| | | | | | | | | | |
|---|---|---|---|---|---|---|---|---|---|
| Test Example D574 | Bal. | 3.5 | 0.5 | 18 | 25000 | 25000 | 100 | 50154 | 0.3 |
| Test Example D575 | Bal. | 3.5 | 0.5 | 18 | <u>50000</u> | 0 | 100 | 50154 | 0.3 |
| Test Example D576 | Bal. | 3.5 | 0.5 | 18 | 0 | <u>50000</u> | 100 | 50154 | 0.3 |
| Test Example D577 | Bal. | 3.5 | 0.5 | <u>300</u> | 0 | 0 | 3000 | 3900 | — |
| Test Example D578 | Bal. | 3.5 | 0.5 | <u>100</u> | 100 | <u>25000</u> | 0 | 25400 | <u>1.2</u> |

| | | | Evaluation items | | | |
|---|---|---|---|---|---|---|
| | Formula (5) | Formula (6) | Change over time | ΔT | Wettability | Comprehensive evaluation |
| Test Example D571 | — | 0 | ○ | ○ | X | X |
| Test Example D572 | — | 0 | ○ | ○ | X | X |
| Test Example D573 | — | 0 | ○ | ○ | X | X |
| Test Example D574 | — | 0 | ○ | X | ○ | X |
| Test Example D575 | — | 0 | ○ | X | ○ | X |
| Test Example D576 | — | 0 | ○ | X | ○ | X |
| Test Example D577 | — | 0 | ○ | ○ | X | X |
| Test Example D578 | — | 0 | ○ | X | ○ | X |

In Tables 15 to 44, underlines indicate that the corresponding values are outside the scope of the present invention.

As a result, for the solder pastes for which the flux of each example shown in Table 1 to Table 12 and the solder alloy of each test example shown in Table 15 to Table 20 and each test example within the scope of the present invention shown in Table 21 to Table 44 were used, sufficient effects were obtained in terms of the thickening suppression effects (changes over time) of the solder pastes> and the solder wettability (wetting speed). In addition, in the solder alloy of each test example shown in Table 15 to Table 20 and each test example within the scope of the present invention shown in Table 21 to Table 44, narrowing of ΔT was shown.

INDUSTRIAL APPLICABILITY

According to the present invention, it is possible to provide a flux capable of enhancing the wettability of solder, having excellent temperature cycle reliability, and capable of suppressing scattering due to heating during reflow and a solder paste using the same.

What is claimed is:
1. A solder paste comprising:
a flux and a solder powder,
wherein the flux comprises an organic acid, an acrylic resin, a rosin, a thixotropic agent, and a solvent, and wherein the flux does not contain water,
the organic acid includes 1,2,3-propanetricarboxylic acid, and
a content of the 1,2,3-propanetricarboxylic acid is 0.1% by mass or more and 15% by mass or less with respect to a total amount of the entire flux,
wherein the solder powder comprises a solder alloy (x) having an alloy composition (x) or a solder alloy (y) having an alloy composition (y),
wherein the solder alloy (x) having the alloy composition (x) comprises As: 25 to 300 mass ppm, Pb: more than 0 mass ppm and 5100 mass ppm or less, at least one of Sb: more than 0 mass ppm and 3000 mass ppm or less and Bi: more than 0 mass ppm and 10000 mass ppm or less, and a balance of Sn and satisfying the following formula (1) and formula (2),

$$275 \leq 2As+Sb+Bi+Pb \tag{1}$$

$$0.01 \leq (2As+Sb)/(Bi+Pb) \leq 10.00 \tag{2}$$

in the formula (1) and the formula (2), As, Sb, Bi, and Pb each represent the content, in mass ppm, in the alloy composition (x),
the solder alloy (y) having the alloy composition (y) comprises As: 10 mass ppm or more and less than 25 mass ppm, at least one of Bi: more than 0 mass ppm and 10000 mass ppm or less and Pb: more than 0 mass ppm and 5100 mass ppm or less, Sb: more than 0 mass ppm and 3000 mass ppm or less, and a balance of Sn and satisfying the following formula (3) and formula (4), $$300 \leq 3As+Sb+Bi+Pb \tag{3}$$

$$0.1 \leq \{(3As+Sb)/(Bi+Pb)\} \times 100 \leq 200 \tag{4}$$

in the formula (3) and the formula (4), As, Sb, Bi, and Pb each represent a content, in mass ppm, in the alloy composition (y).
2. The solder paste according to claim 1, wherein a mass ratio of a content of the rosin to a content of the acrylic resin is 1 or more and 9 or less.
3. The solder paste according to claim 1, wherein a total content of the organic acid is 0.1% by mass or more and 15% by mass or less with respect to the total amount of the entire flux.
4. The solder paste according to claim 1, further comprising:
azoles,
wherein a content of the azoles is 0.1% by mass or more and 10% by mass or less with respect to the total amount of the entire flux.
5. The solder paste according to claim 4, wherein a mass ratio of a total content of the organic acid to the content of the azoles is 0.6 or more and 100 or less.
6. The solder paste according to claim 1, further comprising:
a resin other than the acrylic resin and the rosin,
wherein a content of the resin other than the acrylic resin and the rosin is more than 0% by mass and 10% by mass or less with respect to the total amount of the entire flux.
7. The solder paste according to claim 1, further comprising:
a halogen compound,
wherein a content of the halogen compound is more than 0% by mass and 5% by mass or less with respect to the total amount of the entire flux.

8. The solder paste according to claim 1, further comprising:
an antioxidant,
wherein a content of the antioxidant is more than 0% by mass and 5% by mass or less with respect to the total amount of the entire flux.

9. The solder paste according to claim 1,
wherein the solder powder comprises the solder alloy (x), and
the alloy composition (x) further satisfies the following formula (1a), $$275 \leq 2As+Sb+Bi+Pb \leq 25200 \quad (1a)$$

in the formula (1a), As, Sb, Bi, and Pb each represent a content, in mass ppm, in the alloy composition (x).

10. The solder paste according to claim 1,
wherein the solder powder comprises the solder alloy (x), and
the alloy composition (x) further satisfies the following formula (1b), $$275 \leq 2As+Sb+Bi+Pb \leq 5300 \quad (1b)$$

in the formula (1b), As, Sb, Bi, and Pb each represent the content, in mass ppm, in the alloy composition (x).

11. The solder paste according to claim 1,
wherein the solder powder comprises the solder alloy (x), and
the alloy composition (x) further satisfies the following formula (2a), $$0.31 \leq (2As+Sb)/(Bi+Pb) \leq 10.00 \quad (2a)$$

in the formula (2a), As, Sb, Bi, and Pb each represent the content, in mass ppm, in the alloy composition (x).

12. The solder paste according to claim 1,
wherein the solder powder comprises the solder alloy (y), and
the alloy composition (y) further contains Ni: more than 0 mass ppm and 600 mass ppm or less.

13. The solder paste according to claim 1,
wherein the solder powder comprises the solder alloy (y), and
the alloy composition (y) further contains Fe: more than 0 mass ppm and 100 mass ppm or less.

14. The solder paste according to claim 1,
wherein the solder powder comprises the solder alloy (y), and
the alloy composition (y) further contains In: more than 0 mass ppm and 1200 mass ppm or less.

15. The solder paste according to claim 1,
wherein the solder powder comprises the solder alloy (y), and
the alloy composition (y) further contains at least two of Ni: more than 0 mass ppm and 600 mass ppm or less, Fe: more than 0 mass ppm and 100 mass ppm or less and In: more than 0 mass ppm and 1200 mass ppm or less and satisfies the following formula (6), $$0 < Ni+Fe \leq 680 \quad (6)$$

in the formula (6), Ni and Fe each represent a content, in mass ppm, in the alloy composition (y).

16. The solder paste according to claim 1,
wherein the solder powder comprises the solder alloy (y), and
the alloy composition (y) further contains Ni: 0 mass ppm or more and 600 mass ppm or less and Fe: more than 0 mass ppm and 100 mass ppm or less and satisfies the following formula (5) and the following formula (6), $$0 \leq Ni/Fe \leq 50 \quad (5)$$

$$0 < Ni+Fe \leq 680 \quad (6)$$

in the formula (5) and the formula (6), Ni and Fe each represent a content, in mass ppm, in the alloy composition (y).

17. The solder paste according to claim 1,
wherein the solder powder comprises the solder alloy (y), and
the alloy composition (y) further satisfies the following formula (3a), $$300 \leq 3As+Sb+Bi+Pb \leq 18214 \quad (3a)$$

in the formula (3a), As, Sb, Bi, and Pb each represent the content, in mass ppm, in the alloy composition (y).

18. The solder paste according to claim 1,
wherein the solder powder comprises the solder alloy (y), and
the alloy composition (y) further satisfies the following formula (4a), $$0.1 \leq \{(3As+Sb)/(Bi+Pb)\} \times 100 \leq 158.5 \quad (4a)$$

in the formula (4a), As, Sb, Bi, and Pb each represent the content, in mass ppm, in the alloy composition (y).

19. The solder paste according to claim 1,
wherein the solder powder comprises the solder alloy (y), and
the alloy composition (y) further contains at least one of Ag: more than 0% by mass and 4% by mass or less and Cu: more than 0% by mass and 0.9% by mass or less.

* * * * *